(12) United States Patent
Simmons et al.

(10) Patent No.: US 8,100,996 B2
(45) Date of Patent: Jan. 24, 2012

(54) PROCESS FOR UPGRADING A CARBONACEOUS MATERIAL USING MICROCHANNEL PROCESS TECHNOLOGY

(75) Inventors: Wayne W. Simmons, Dublin, OH (US); Robert Dwayne Litt, Westerville, OH (US); Anna Lee Tonkovich, Dublin, OH (US); Laura J. Silva, Dublin, OH (US); Daniel Francis Ryan, Brewster, MA (US); Bruce Stangeland, Berkeley, CA (US); John Brophy, Bath (GB); Jeffrey S. McDaniel, Worthington, OH (US)

(73) Assignee: Velocys, Inc., Plain City, OH (US)

( * ) Notice: Subject to any disclaimer, the term of this patent is extended or adjusted under 35 U.S.C. 154(b) by 428 days.

(21) Appl. No.: 12/421,007

(22) Filed: Apr. 9, 2009

(65) Prior Publication Data

US 2009/0293359 A1 Dec. 3, 2009

Related U.S. Application Data

(60) Provisional application No. 61/043,465, filed on Apr. 9, 2008, provisional application No. 61/104,432, filed on Oct. 10, 2008, provisional application No. 61/152,645, filed on Feb. 13, 2009.

(51) Int. Cl.
*B09B 3/00* (2006.01)
*C01B 3/34* (2006.01)
*C10J 3/46* (2006.01)

(52) U.S. Cl. ............ 48/197 R; 48/201; 48/209; 48/210; 48/197 A; 252/373; 423/650; 423/651

(58) Field of Classification Search ........ 48/197 R, 48/201, 209, 210, 197 A; 252/373; 423/650, 423/651
See application file for complete search history.

(56) References Cited

U.S. PATENT DOCUMENTS

| | | | |
|---|---|---|---|
| 3,882,049 A | 5/1975 | Bertolacini et al. | |
| 3,972,837 A | 8/1976 | Acres et al. | |
| 4,089,810 A | 5/1978 | Diwell et al. | |
| 4,096,095 A | 6/1978 | Cairns | |
| 4,122,110 A | 10/1978 | Sugier et al. | ............... 260/449.5 |
| 4,130,575 A | 12/1978 | Jorn | ............... 260/449 |
| 4,289,652 A | 9/1981 | Hunter et al. | |

(Continued)

FOREIGN PATENT DOCUMENTS

DE 246257 6/1987

(Continued)

OTHER PUBLICATIONS

Iglesia; "Design, synthesis, and use of cobalt-based Fischer-Tropsch synthesis catalysts"; Applied Catalysis A: General 161 (1997); pp. 59-78.
International Search Report and Written Opinion, Application No. PCT/US2009/040005, mailed Dec. 17, 2009.

(Continued)

*Primary Examiner* — Timothy Vanoy
(74) *Attorney, Agent, or Firm* — Renner, Otto, Boisselle & Sklar, LLP

(57) ABSTRACT

This invention relates to a process for converting a carbonaceous material to a desired product comprising one or more hydrocarbons or one or more alcohols, the process comprising: (A) gasifying the carbonaceous material at a temperature in excess of about 700° C. to form synthesis gas; and (B) flowing the synthesis gas in a microchannel reactor in contact with a catalyst to convert the synthesis gas to the desired product.

94 Claims, 17 Drawing Sheets

U.S. PATENT DOCUMENTS

| | | | |
|---|---|---|---|
| 4,298,354 A | 11/1981 | Hardman et al. | 44/56 |
| 4,342,643 A | 8/1982 | Kyan | 208/134 |
| 4,348,487 A | 9/1982 | Goldstein et al. | 518/704 |
| 4,423,272 A | 12/1983 | Forbus et al. | 585/640 |
| 4,492,773 A | 1/1985 | Ball et al. | 518/713 |
| 4,525,482 A | 6/1985 | Ohsaki et al. | 518/707 |
| 4,540,714 A | 9/1985 | Pedersen et al. | 518/714 |
| 4,588,560 A | 5/1986 | Degnan et al. | 422/211 |
| 4,675,344 A | 6/1987 | Conway et al. | 518/714 |
| 4,752,622 A | 6/1988 | Stevens | 518/714 |
| 4,752,623 A | 6/1988 | Stevens et al. | 518/714 |
| 4,762,858 A | 8/1988 | Hucul et al. | 518/714 |
| 4,795,841 A | 1/1989 | Elliott et al. | 585/240 |
| 4,843,101 A | 6/1989 | Klier et al. | 518/713 |
| 5,180,868 A | 1/1993 | Baker et al. | 585/240 |
| 5,248,251 A | 9/1993 | Dalla Betta et al. | |
| 5,492,617 A | 2/1996 | Trimble et al. | 208/148 |
| 5,525,311 A | 6/1996 | Girod et al. | 422/200 |
| 5,538,700 A | 7/1996 | Koves | 422/200 |
| 5,540,899 A | 7/1996 | Koves | 422/200 |
| 5,600,053 A | 2/1997 | Girod et al. | 585/654 |
| 5,660,715 A | 8/1997 | Trimble et al. | 208/148 |
| 5,703,133 A | 12/1997 | Vanderspurt et al. | 518/707 |
| 5,948,240 A | 9/1999 | Mulvaney, III et al. | 208/79 |
| 6,040,266 A | 3/2000 | Fay, III et al. | |
| 6,159,358 A | 12/2000 | Mulvaney, III et al. | 208/46 |
| 6,248,796 B1 | 6/2001 | Jackson et al. | 518/714 |
| 6,274,101 B1 | 8/2001 | Sechrist | 422/198 |
| 6,312,586 B1 | 11/2001 | Kalnes et al. | 208/80 |
| 6,326,326 B1 | 12/2001 | Feng et al. | 502/62 |
| 6,334,994 B1 | 1/2002 | Wendelbo et al. | 423/700 |
| 6,409,072 B1 | 6/2002 | Breuer et al. | 228/111.5 |
| 6,432,369 B1 | 8/2002 | Mulvaney, III et al. | 422/213 |
| 6,440,895 B1 | 8/2002 | Tonkovich et al. | 502/439 |
| 6,488,838 B1 | 12/2002 | Tonkovich et al. | 208/108 |
| 6,531,224 B1 | 3/2003 | Fryxell et al. | 428/405 |
| 6,534,677 B1 | 3/2003 | White et al. | 562/486 |
| 6,555,725 B1 | 4/2003 | Wittenbrink et al. | 585/734 |
| 6,570,047 B1 | 5/2003 | Mart et al. | 585/899 |
| 6,579,343 B2 | 6/2003 | Brennecke et al. | 95/51 |
| 6,620,398 B2 | 9/2003 | Kindig et al. | 423/359 |
| 6,663,681 B2 | 12/2003 | Kindig et al. | 48/127.5 |
| 6,682,714 B2 | 1/2004 | Kindig et al. | 423/657 |
| 6,685,754 B2 | 2/2004 | Kindig et al. | 48/210 |
| 6,703,429 B2 | 3/2004 | O'Rear et al. | 518/706 |
| 6,713,036 B1 | 3/2004 | Vanden Bussche | 423/584 |
| 6,733,835 B2 | 5/2004 | Fryxell et al. | 427/299 |
| 6,743,962 B2 | 6/2004 | O'Rear et al. | 585/717 |
| 6,753,038 B2 | 6/2004 | Fryxell et al. | 427/337 |
| 6,768,035 B2 | 7/2004 | O'Rear et al. | 585/331 |
| 6,846,554 B2 | 1/2005 | Fryxell et al. | 428/307.3 |
| 6,969,506 B2 | 11/2005 | Tonkovich et al. | 423/652 |
| 7,012,104 B2 | 3/2006 | Espinoza et al. | 518/715 |
| 7,019,038 B2 | 3/2006 | Espinoza et al. | 518/700 |
| 7,045,114 B2 | 5/2006 | Tonkovich et al. | 423/659 |
| 7,067,560 B2 | 6/2006 | Bowe | 518/700 |
| 7,067,561 B2 | 6/2006 | Bowe | 518/706 |
| 7,071,239 B2 | 7/2006 | Ortego, Jr. et al. | 518/715 |
| 7,084,180 B2 | 8/2006 | Wang et al. | 518/712 |
| 7,087,651 B2 | 8/2006 | Lee-Tuffnell et al. | 518/700 |
| 7,108,070 B2 | 9/2006 | Hall et al. | 166/357 |
| 7,109,248 B2 | 9/2006 | Bowe | 518/700 |
| 7,122,106 B2 | 10/2006 | Lin et al. | 205/109 |
| 7,183,329 B2 | 2/2007 | Green et al. | 518/715 |
| 7,226,574 B2 * | 6/2007 | Long et al. | 423/650 |
| 7,232,472 B2 | 6/2007 | Kindig et al. | 48/127.5 |
| 7,294,734 B2 | 11/2007 | Brophy et al. | 558/317 |
| 7,304,012 B2 | 12/2007 | Green et al. | 502/180 |
| 2002/0028164 A1 | 3/2002 | Schutte et al. | 422/198 |
| 2002/0192118 A1 | 12/2002 | Zech et al. | 422/99 |
| 2003/0007904 A1 | 1/2003 | Tonkovich et al. | 422/180 |
| 2003/0225169 A1 | 12/2003 | Yetman | 518/726 |
| 2004/0034111 A1 | 2/2004 | Tonkovich et al. | 518/726 |
| 2004/0134660 A1 | 7/2004 | Hall et al. | 166/357 |
| 2004/0180971 A1 | 9/2004 | Inoue et al. | |
| 2004/0188326 A1 | 9/2004 | Tonkovich et al. | 208/139 |
| 2004/0229752 A1 | 11/2004 | Long et al. | 502/303 |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |
| 2005/0203195 A1 | 9/2005 | Wang et al. | |
| 2005/0282918 A1 | 12/2005 | Bowe | 518/726 |
| 2006/0020155 A1 | 1/2006 | Beech, Jr. et al. | 585/639 |
| 2006/0036106 A1 | 2/2006 | Mazanec et al. | 549/533 |
| 2006/0041029 A1 | 2/2006 | Bowe et al. | 518/700 |
| 2006/0074134 A1 | 4/2006 | O'Rear et al. | 518/726 |
| 2006/0135630 A1 | 6/2006 | Bowe | 518/702 |
| 2006/0142400 A1 | 6/2006 | Bowe | 518/703 |
| 2006/0251552 A1 | 11/2006 | Wang et al. | 422/190 |
| 2006/0251558 A1 | 11/2006 | Chinn et al. | 423/230 |
| 2007/0004810 A1 | 1/2007 | Wang et al. | 518/718 |
| 2007/0017633 A1 | 1/2007 | Tonkovich et al. | |
| 2007/0197801 A1 | 8/2007 | Bolk et al. | 549/229 |
| 2007/0197808 A1 | 8/2007 | Bolk et al. | 549/536 |
| 2007/0244000 A1 | 10/2007 | Molinier et al. | 502/300 |
| 2011/0147665 A1 * | 6/2011 | Neagle et al. | 252/373 |

FOREIGN PATENT DOCUMENTS

| | | |
|---|---|---|
| DE | 3926466 | 2/1991 |
| EP | 1 434 652 B1 | 2/2005 |
| EP | 1 248 675 B1 | 8/2005 |
| EP | 1 559 475 A1 | 8/2005 |
| EP | 1 567 616 B1 | 8/2006 |
| EP | 1102628 | 11/2006 |
| GB | 1531134 | 11/1978 |
| GB | 2077136 | 12/1981 |
| WO | 9421372 | 9/1994 |
| WO | 9700442 | 1/1997 |
| WO | 9828073 | 7/1998 |
| WO | 9838147 | 9/1998 |
| WO | 9916542 | 4/1999 |
| WO | 0006301 | 2/2000 |
| WO | 01/93976 | 12/2001 |
| WO | 02/34863 | 5/2002 |
| WO | 02/064248 | 8/2002 |
| WO | 03006149 | 1/2003 |
| WO | 03/049835 | 6/2003 |
| WO | 03/048035 | 12/2003 |
| WO | 03/106386 | 12/2003 |
| WO | 2004/037418 | 5/2004 |
| WO | 2004/091771 | 10/2004 |
| WO | 2004/096952 | 11/2004 |
| WO | 2005/003025 | 1/2005 |
| WO | 2005/003632 | 2/2005 |
| WO | 2005/102511 | 3/2005 |
| WO | 2005/090521 | 9/2005 |
| WO | 2005/090522 | 9/2005 |
| WO | 2005/123883 | 12/2005 |
| WO | 2006/033025 | 3/2006 |
| WO | 2006/079848 | 3/2006 |
| WO | 2006/043111 | 4/2006 |
| WO | 2006/075130 | 7/2006 |
| WO | 2006/075193 | 7/2006 |
| WO | 2006075130 | 7/2006 |
| WO | 2006075193 | 7/2006 |
| WO | 2006/090189 | 8/2006 |
| WO | 2006079848 | 8/2006 |
| WO | 2006090189 | 8/2006 |
| WO | 2006/095204 | 9/2006 |
| WO | 2006095204 | 9/2006 |
| WO | 2006/127889 | 11/2006 |
| WO | 2007/008495 | 1/2007 |
| WO | 2007008495 | 1/2007 |
| WO | 2007/071737 | 6/2007 |
| WO | 2007/071741 | 6/2007 |
| WO | 2007/071744 | 6/2007 |
| WO | 2007/076393 | 7/2007 |
| WO | 2007/076394 | 7/2007 |
| WO | 2007/076395 | 7/2007 |
| WO | 2007/076397 | 7/2007 |
| WO | 2007/076400 | 7/2007 |
| WO | 2007/076402 | 7/2007 |
| WO | 2007/076404 | 7/2007 |
| WO | 2007/076406 | 7/2007 |
| WO | 2007/027767 | 8/2007 |
| WO | 2008/030467 | 3/2008 |

| | | |
|---|---|---|
| WO | 2008030467 | 3/2008 |
| WO | 2008/104793 | 4/2008 |
| ZA | 855317 | 7/1985 |

OTHER PUBLICATIONS

Cybulski et al.; "Monoliths in Heterogeneous Catalysis"; Catal. Rev.—Sci. Eng., 36(2), 179-270 (1994).

Bennett et al.; "Microchannel cooled heatsinks for high average power laser diode arrays"; SPIE, vol. 1865; 1993; pp. 144-153.

"Smaller Scale GTL Plants Solve Associated Gas, Remote Location Problems"; *Syngas Refiner*; Dec. 1, 2006; pp. 15, 17.

Miller et al.; "Selection of a Hydrogen Separation Process"; presented at the 1989 NPRA Annual Meeting held Mar. 19-21, San Francisco; pp. 1-27.

Iglesia; "Design, synthesis, and use of cobalt-based Fischer-Tropsch synthesis catalysts"; *Applied Catalysis A*: General 161 (1997); pp. 59-78.

Subramani et al.; "A Review of Recent Literature to Search for an Efficient Catalytic Process for the Conversion of Syngas to Ethanol"; *Energy & Fuels*, vol. xxx, No. xx, XXX. Published on Web Jan. 31, 2008.

Elliott; "Historical Developments in Hydroprocessing Bio-oils"; *Energy & Fuels*, 2007, 21, pp. 1792-1815.

Green Car Congress, Energy, Technologies, Issues and Policies for Sustainable Mobility, www.greencarcongress.com, Jan. 16, 2008.

Kandlikar; Exploring Roughness Effect on Laminar Internal Flow— Are We Ready for Change?; *Nanoscale and Microscale Thermophysical Engineering*, 12; 2008; pp. 61-82.

Technology Review: Fuel from Waste; Technology Review published by MIT; Dec. 21, 2007; www.technologyreview.com/Energy/ 19974.

U.S. Department of Energy, Energy Efficiency and Renewable Energy, Biomass Program; "Pyrolysis and Other Thermal Processing"; www.eere.energy.gov/biomass/pyrolysis.html; content last updated Oct. 13, 2005.

Holmen; Direct conversion of methane to fuels and chemicals;; *Catalysis Today*, 142 (2009); pp. 2-8.

International Preliminary Report on Patentability, Application No. PCT/US2009/040005, mailed Oct. 21, 2010.

* cited by examiner

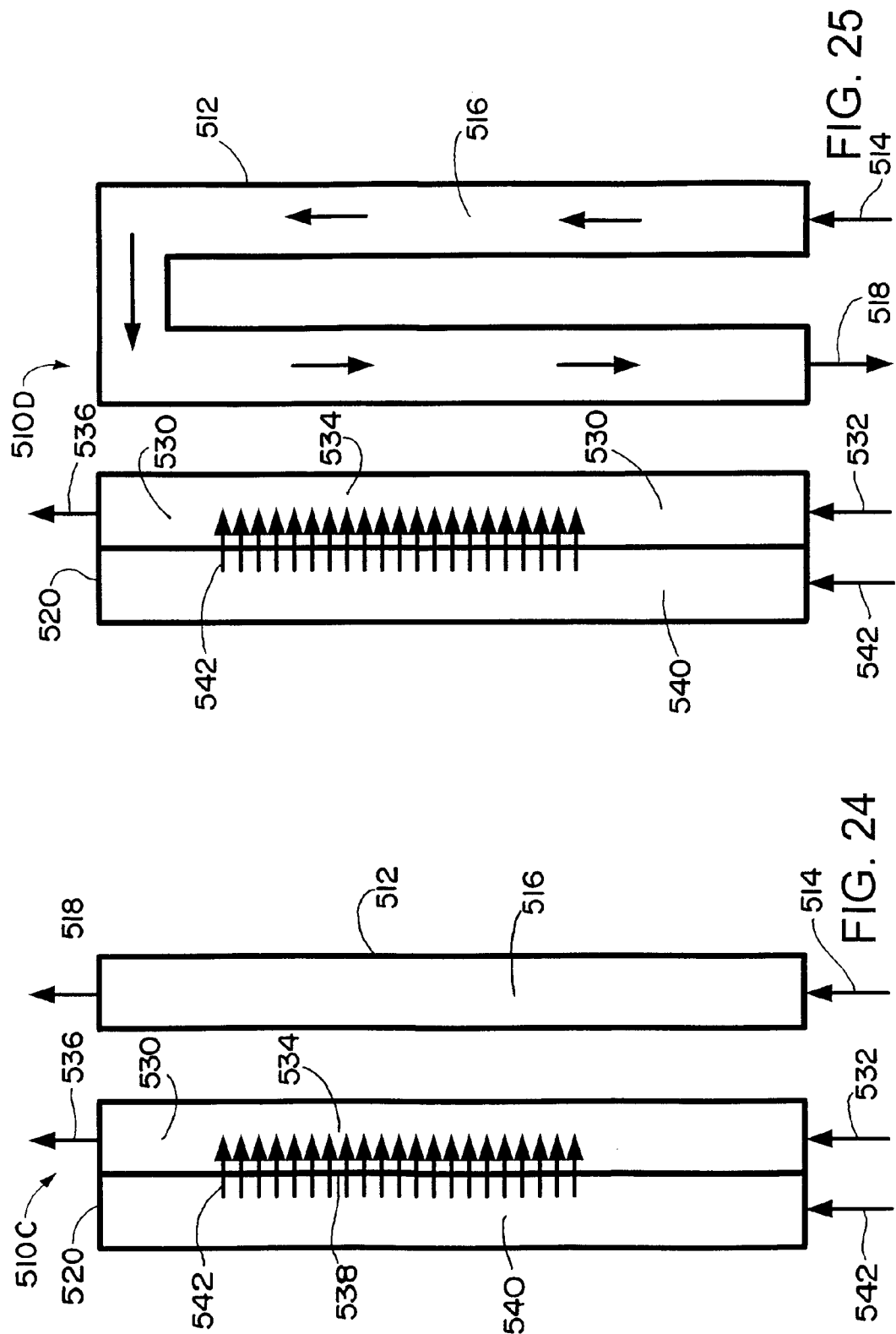

PROCESS FOR UPGRADING A CARBONACEOUS MATERIAL USING MICROCHANNEL PROCESS TECHNOLOGY

This application claims priority under 35 U.S.C. §119(e) to U.S. Provisional Application Ser. No. 61/043,465, filed Apr. 9, 2008, U.S. Provisional Application Ser. No. 61/104,432, filed Oct. 10, 2008, and to U.S. Provisional Application Ser. No. 61/152,645, filed Feb. 13, 2009. These prior applications are incorporated herein by reference.

TECHNICAL FIELD

This invention relates to a process for upgrading carbonaceous materials using microchannel process technology. The process may be used to convert a carbonaceous material (e.g., biomass, solid waste, etc.) to one or more hydrocarbons or alcohols. The hydrocarbons and alcohols may be used as synthetic fuels.

BACKGROUND

The U.S. military uses billions of gallons of petroleum-based fuels every year. Transporting these fuels to remote military bases is costly and time consuming, and the fuel is often a prime target for terrorists. The problem, therefore, is to provide cheaper and more secure sources of fuel.

SUMMARY

This invention provides a solution to this problem. The present invention relates to a process for converting carbonaceous materials such as biomass, solid-waste, and the like, to hydrocarbons and alcohols that may be used as synthetic fuel (e.g., automotive fuel, diesel fuel, aviation fuel, etc.). The inventive process employs the use of microchannel reactors which are compact and readily transportable. As such, the inventive process may be adapted for use in apparatus that can be readily transported to remote locations, such as military bases, and the like. With the inventive process it is possible to convert waste products generated at such military bases into fuels such as automotive fuel, diesel fuel, aviation fuel, and the like. For example, the inventive process may be adapted to produce from about 50 to about 500 barrels per day of synthetic fuel at such a base. The inventive process may also be adaptable for use with larger scale operations wherein carbonaceous material sources such as municipal solid waste are converted to useful products such as synthetic fuel.

This invention relates to a process for converting a carbonaceous material to a desired product comprising one or more hydrocarbons or one or more alcohols, the process comprising: (A) gasifying the carbonaceous material at a temperature of at least about 700° C. to form synthesis gas; and (B) flowing the synthesis gas in a microchannel reactor in contact with a catalyst to convert the synthesis gas to the desired product. The products have various uses including use as synthetic fuels.

BRIEF DESCRIPTION OF THE DRAWINGS

In the annexed drawings like parts and features have like references. A number of the drawings are schematic illustrations which may not necessarily be drawn to scale.

In FIGS. 9 and 10, five Fischer-Tropsch or alcohol-forming microchannel reactors, five SMR microchannel reactors, or five hydrocracking microchannel reactors are shown.

Figure 15:
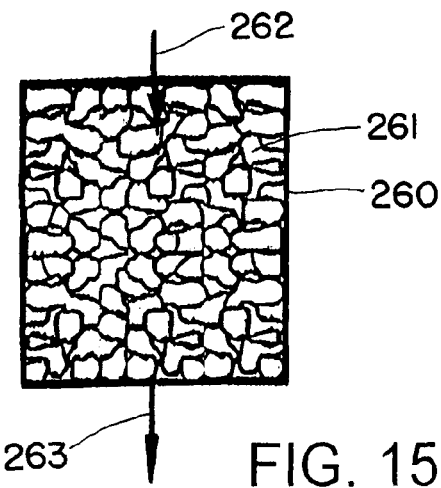
Figure 16:
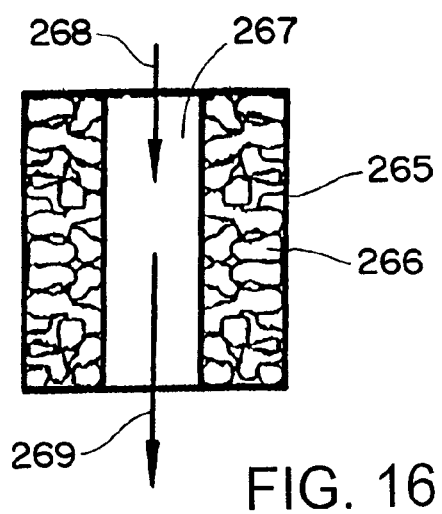
Figure 17:
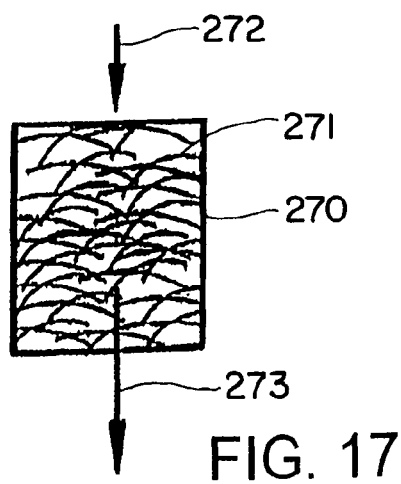
Figure 18:
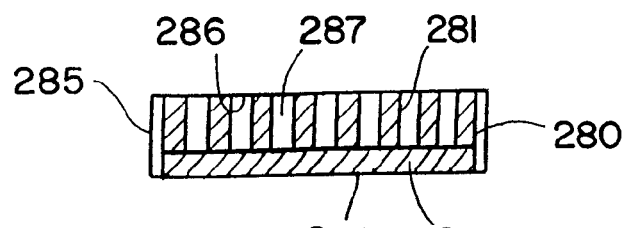
Figure 19:
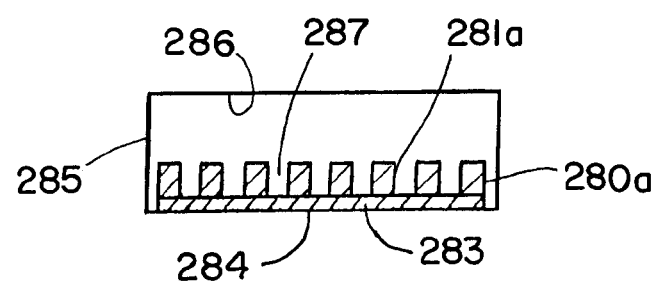
Figure 20:
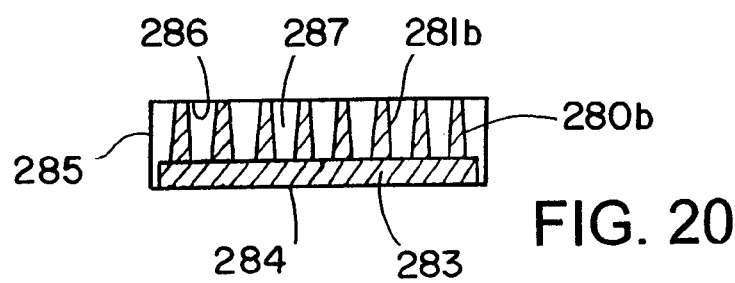

FIGS. 15-20 are schematic illustrations of catalysts or catalyst supports that may be used in the SMR process microchannels, combustion channels or Fischer-Tropsch or alcohol-forming process microchannels. The catalyst illustrated in FIG. 15 is in the form of a bed of particulate solids. The catalyst illustrated in FIG. 16 has a flow-by design. The catalyst illustrated in FIG. 17 is a flow-through structure. FIGS. 18-20 are schematic illustrations of fin assemblies that may be used for supporting the catalyst.

Figure 22:
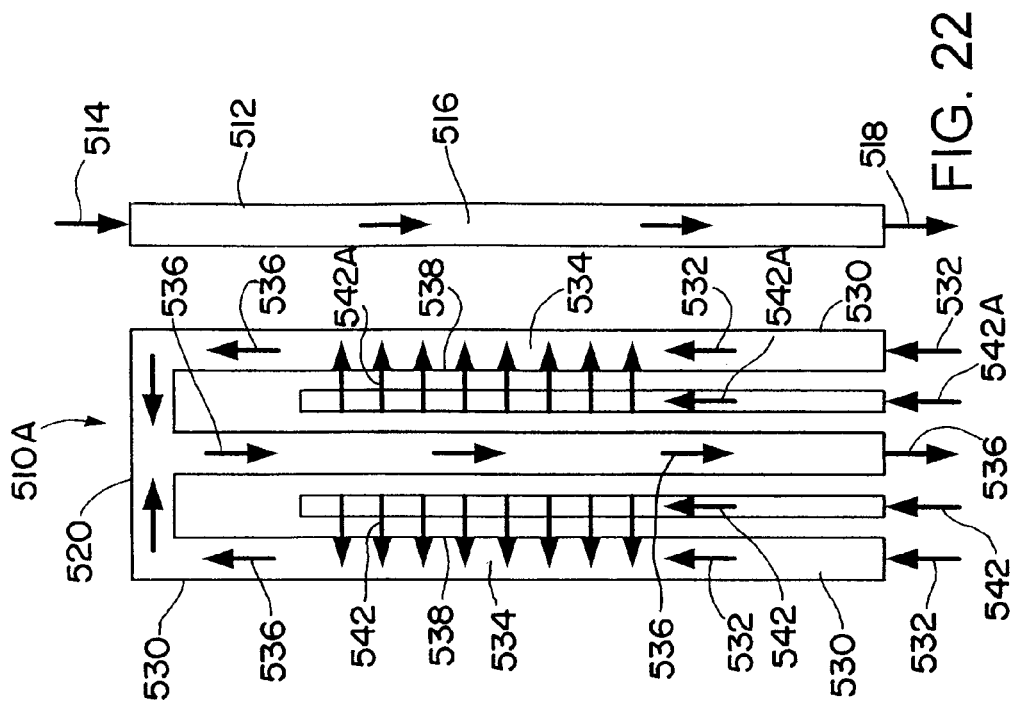
Figure 21:
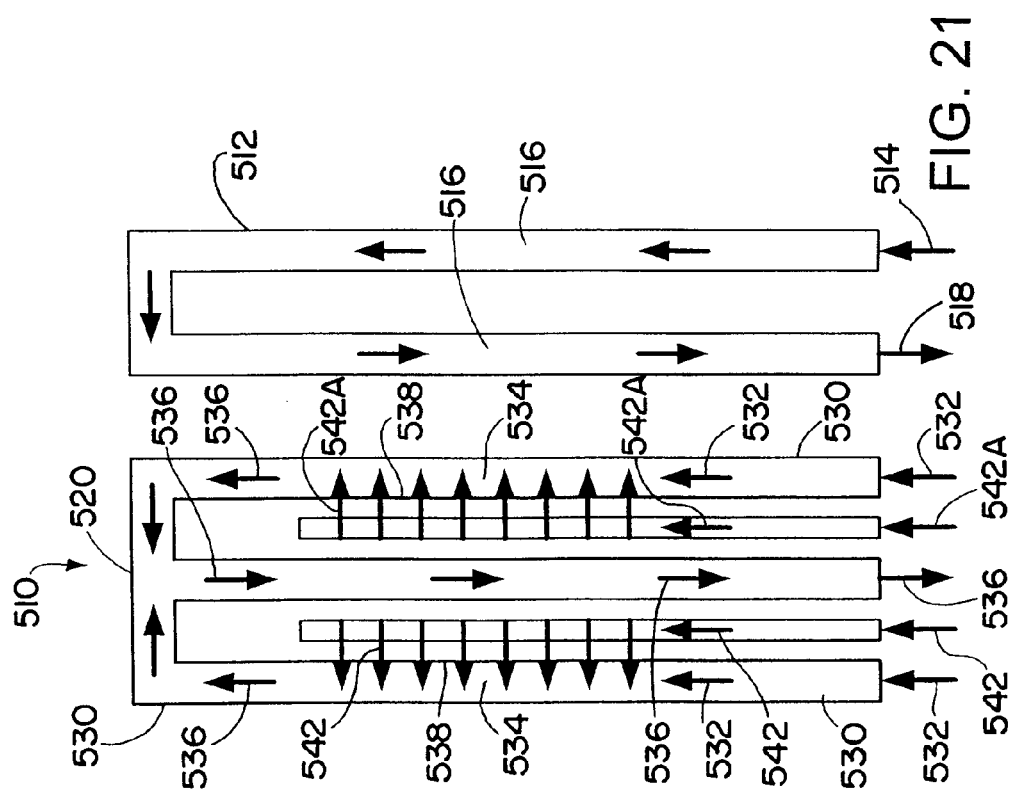
Figure 23:
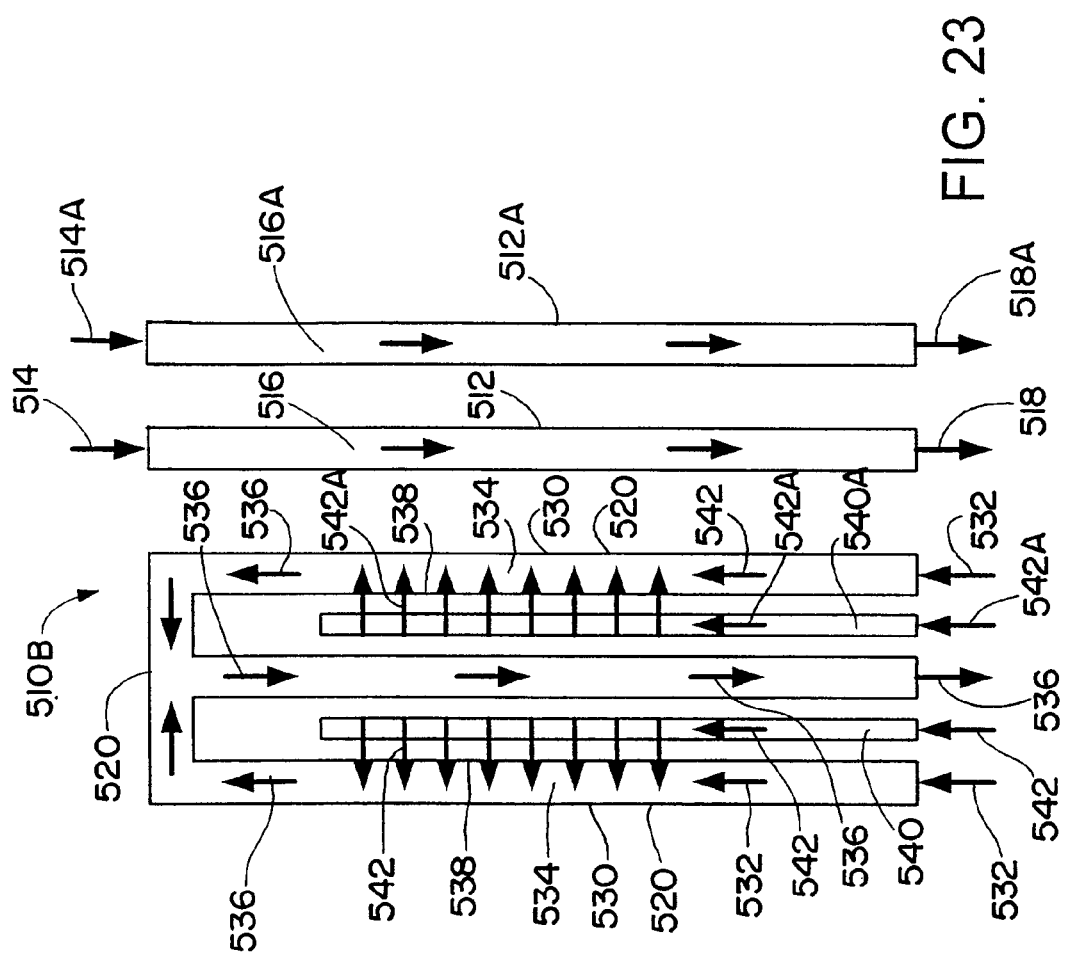

FIGS. 21-25 are schematic illustrations of microchannel repeating units that may be used in the SMR microchannel reactor. Each of these repeating units comprises a combustion channel and one or more SMR process microchannels. The combustion channels illustrated in FIGS. 21-25 include staged addition channels for flowing oxygen or a source of oxygen into the combustion channels. FIG. 21 illustrates an upside down U-shaped SMR process microchannel adjacent an M-shaped combustion channel. FIG. 22 illustrates a single SMR process microchannel adjacent an M-shaped combustion channel. FIG. 23 illustrates two SMR process microchannels and an M-shaped combustion channel, one of the SMR process microchannels being adjacent to the M-shaped combustion channel and the other SMR process microchannel being adjacent the first-named SMR process microchannel, both of the SMR process microchannels being in thermal contact with the combustion channel. FIG. 24 illustrates a single combustion channel, a staged addition channel positioned on one side of the combustion channel and an SMR process channel positioned on the other side of the combustion channel. FIG. 25 illustrates a repeating unit that is similar to the repeating unit illustrated in FIG. 24 with the exception that the SMR process microchannel in the repeating unit illustrated in FIG. 25 is in the shape of an upside down U-shaped microchannel. In FIGS. 21-25 the channels are illustrated as being spaced from each other for purposes of clarification, however, in actual practice the channels would be stacked on top of each other or positioned side-by-side with no spacing between the channels. The channels may share common walls at the channel interfaces.

Figure 26:
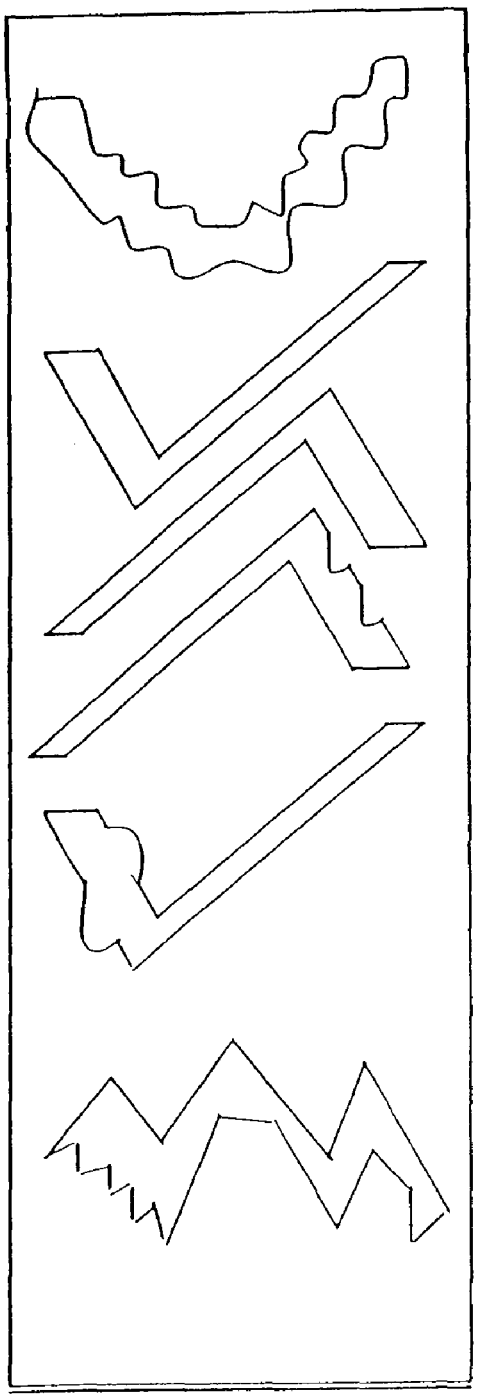
Figure 27:
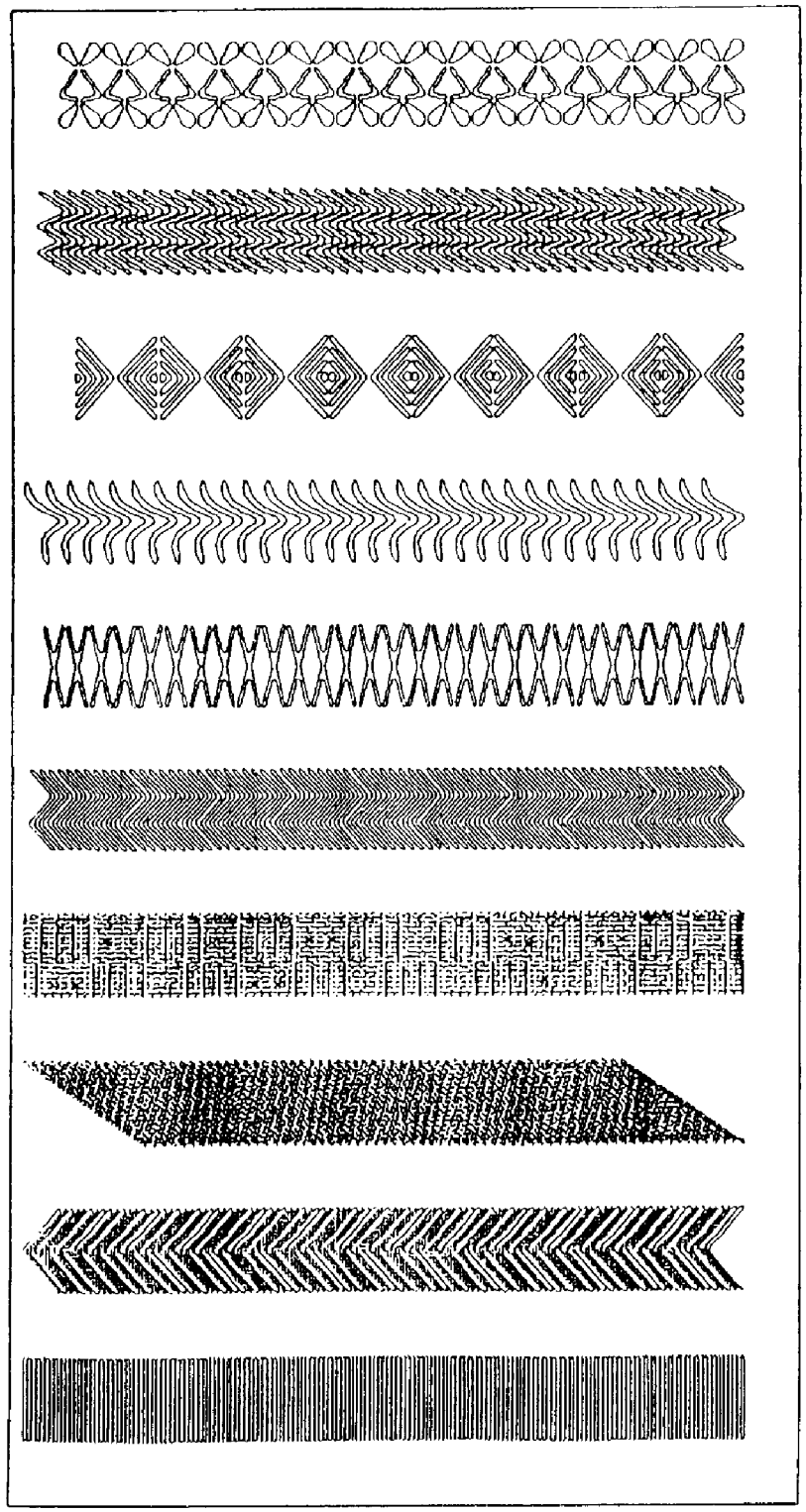

FIGS. 26 and 27 are schematic illustrations of surface features that may be used in the channels employed in the Fischer-Tropsch or alcohol-forming microchannel reactor and/or in the SMR microchannel reactor used in the inventive process.

Figure 28:
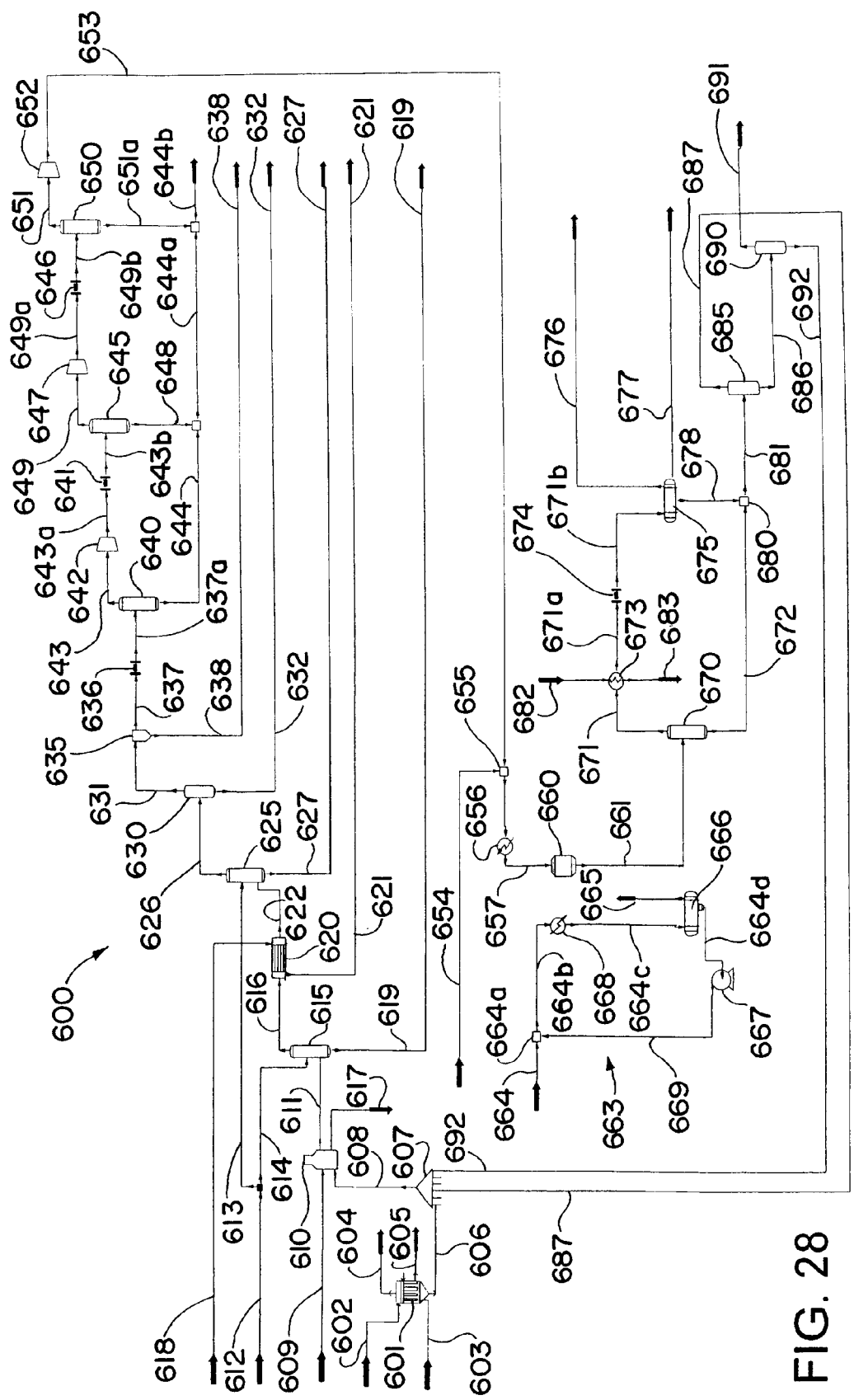

FIG. 28 is a flow sheet of the process described in Example 1.

Figure 29:
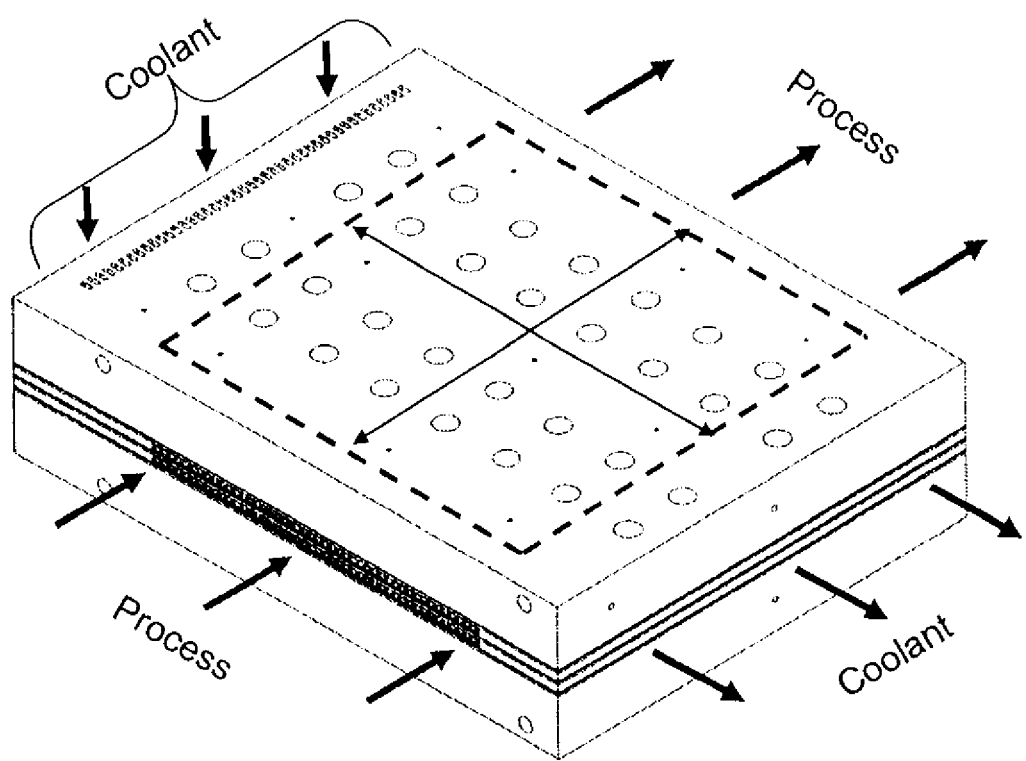

FIG. 29 is a schematic illustration of the microchannel reactor described in Example 2.

Figure 30:
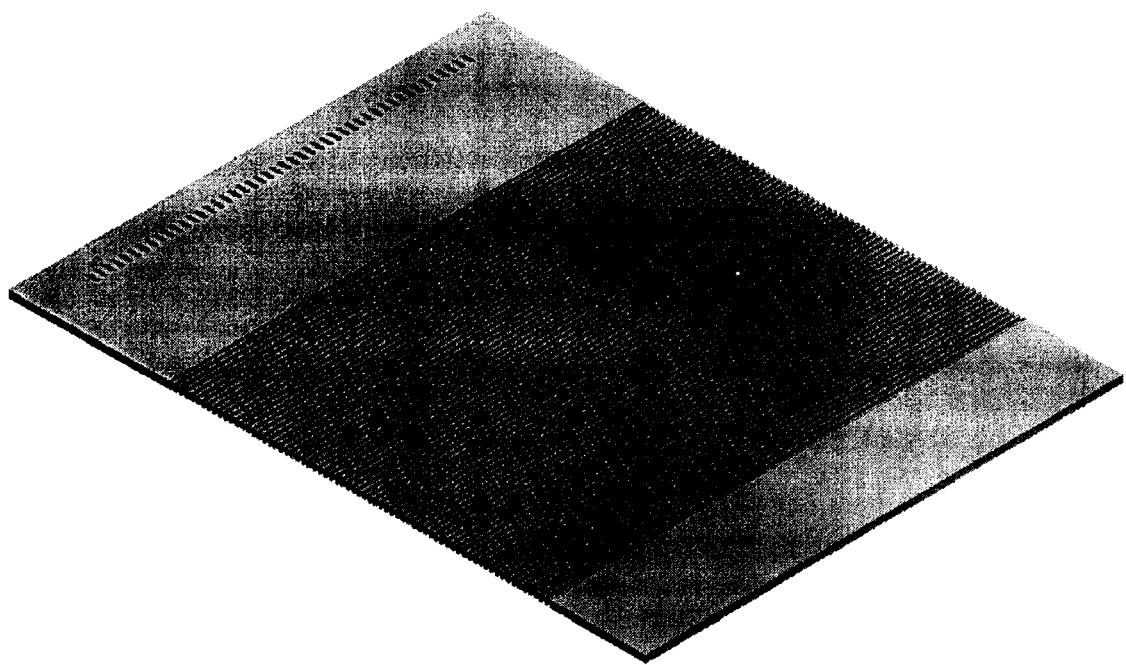

FIG. 30 is a schematic illustration of a waveform used to make the microchannel reactor described in Example 2.

DETAILED DESCRIPTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The term "microchannel" may refer to a channel having at least one internal dimension of height or width of up to about 10 millimeters (mm), and in one embodiment up to about 5 mm, and in one embodiment up to about 2 mm, and in one embodiment up to about 1 mm. The microchannel may comprise at least one inlet and at least one outlet wherein the at least one inlet is distinct from the at least one outlet. The microchannel may not be merely an orifice. The microchannel may not be merely a channel through a zeolite or a mesoporous material. The length of the microchannel may be at least about two times the height or width, and in one embodiment at least about five times the height or width, and in one embodiment at least about ten times the height or width. The internal height or width of the microchannel may be in the range of about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment from about 0.05 to about 0.75 mm, and in one embodiment from about 0.05 to about 0.5 mm. The other internal dimension of height or width may be of any dimension, for example, up to about 3 meters, and in one embodiment about 0.01 to about 3 meters, and in one embodiment about 0.1 to about 3 meters. The length of the microchannel may be of any dimension, for example, up to about 10 meters, and in one embodiment from about 0.1 to about 10 meters, and in one embodiment from about 0.2 to about 10 meters, and in one embodiment from about 0.2 to about 6 meters, and in one embodiment from 0.2 to about 3 meters. The microchannel may have a cross section having any shape, for example, a square, rectangle, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" may refer to an apparatus comprising one or more process microchannels wherein a reaction process is conducted. The process may be a Fischer-Tropsch or alcohol-forming reaction process or an SMR reaction process. When two or more process microchannels are used, the process microchannels may be operated in parallel. The microchannel reactor may include a header or manifold assembly for providing for the flow of fluid into the one or more process microchannels, and a footer or manifold assembly providing for the flow of fluid out of the one or more process microchannels. The microchannel reactor may comprise one or more heat exchange channels adjacent to and/or in thermal contact with the one or more process microchannels. The heat exchange channels provide heating and/or cooling for the fluids in the process microchannels. When used in the SMR microchannel reactor, the heat exchange channels may be combustion channels. The heat exchange channels and/or combustion channels may be microchannels. The microchannel reactor may include a header or manifold assembly for providing for the flow of heat exchange fluid into the heat exchange channels, and a footer or manifold assembly providing for the flow of heat exchange fluid out of the heat exchange channels.

The term "process microchannel" may refer to a microchannel wherein a process is conducted. The process may relate to conducting a Fischer-Tropsch (FT) or alcohol-forming reaction or an SMR reaction.

The term "volume" with respect to volume within a process microchannel may include all volume in the process microchannel a process fluid may flow through or flow by. This volume may include volume within surface features that may be positioned in the process microchannel and adapted for the flow of fluid in a flow-through manner or in a flow-by manner.

The term "adjacent" when referring to the position of one channel relative to the position of another channel may mean directly adjacent such that a wall or walls separate the two channels. In one embodiment, the two channels may have a common wall. The common wall may vary in thickness. However, "adjacent" channels may not be separated by an intervening channel that may interfere with heat transfer between the channels. One channel may be adjacent to another channel over only part of the dimension of the another channel. For example, a process microchannel may be longer than and extend beyond one or more adjacent heat exchange channels.

The term "thermal contact" may refer to two bodies, for example, two channels, that may or may not be in physical contact with each other or adjacent to each other but still exchange heat with each other. One body in thermal contact with another body may heat or cool the other body.

The term "fluid" may refer to a gas, a liquid, a mixture of a gas and a liquid, or a gas or a liquid containing dispersed solids, liquid droplets and/or gaseous bubbles. The droplets and/or bubbles may be irregularly or regularly shaped and may be of similar or different sizes.

The terms "gas" and "vapor" may have the same meaning and are sometimes used interchangeably.

The term "residence time" or "average residence time" may refer to the internal volume of a space within a channel occupied by a fluid flowing in the space divided by the average volumetric flow rate for the fluid flowing in the space at the temperature and pressure being used.

The terms "upstream" and "downstream" may refer to positions within a channel (e.g., a process microchannel) or in a process flow sheet that is relative to the direction of flow of a fluid in the channel or process flow sheet. For example, a position within a channel or process flow sheet not yet reached by a portion of a fluid stream flowing toward that position would be downstream of that portion of the fluid stream. A position within the channel or process flow sheet already passed by a portion of a fluid stream flowing away from that position would be upstream of that portion of the fluid stream. The terms "upstream" and "downstream" do not necessarily refer to a vertical position since the channels used herein may be oriented horizontally, vertically or at an inclined angle.

The term "shim" may refer to a planar or substantially planar sheet or plate. The thickness of the shim may be the smallest dimension of the shim and may be up to about 4 mm, and in one embodiment in the range from about 0.05 to about 2 mm, and in one embodiment in the range of about 0.05 to about 1 mm, and in one embodiment in the range from about 0.05 to about 0.5 mm. The shim may have any length and width.

The term "surface feature" may refer to a depression in a channel wall and/or a projection from a channel wall that disrupts flow within the channel. Examples of surface feature designs that may be used are illustrated in FIGS. 26 and 27. The surface features may be in the form of circles, spheres, frustrums, oblongs, squares, rectangles, angled rectangles, checks, chevrons, vanes, air foils, wavy shapes, and the like, and combinations of two or more thereof. The surface features may contain subfeatures where the major walls of the surface features further contain smaller surface features that may take the form of notches, waves, indents, holes, burrs, checks, scallops, and the like. The surface features may have a depth, a width, and for non-circular surface features a length. The surface features may be formed on or in one or more of the interior walls of the process microchannels, heat exchange channels and/or combustion channels used in accordance with the disclosed process. The surface features may be referred to as passive surface features or passive mixing features. The surface features may be used to disrupt flow (for example, disrupt laminar flow streamlines) and create advective flow at an angle to the bulk flow direction.

The term "heat exchange channel" may refer to a channel having a heat exchange fluid in it that provides heat and/or absorbs heat. The heat exchange channel may absorb heat from or provide heat to an adjacent channel (e.g., process microchannel) and/or one or more channels in thermal contact with the heat exchange channel. The heat exchange channel may absorb heat from or provide heat to channels that are adjacent to each other but not adjacent to the heat exchange channel. In one embodiment, one, two, three or more channels may be adjacent to each other and positioned between two heat exchange channels.

The term "heat transfer wall" may refer to a common wall between a process microchannel and an adjacent heat exchange channel where heat transfers from one channel to the other through the common wall.

The term "heat exchange fluid" may refer to a fluid that may give off heat and/or absorb heat.

The term "waveform" may refer to a contiguous piece of thermally conductive material that is transformed from a planar object to a three-dimensional object. The waveform may be used to form one or more microchannels. The waveform may comprise a right angled corrugated insert which may be sandwiched between opposed planar sheets or shims. The right angled corrugated insert may have rounded edges. In this manner one or more microchannels may be defined on three sides by the waveform and on the fourth side by one of the planar sheets or shims. The waveform may be made of any of the thermally conductive materials disclosed herein as being useful for making the microchannel reactor. These may include copper, aluminum, stainless steel, and the like. The thermal conductivity of the waveform may be about 1 W/m-K or higher.

The term "bulk flow direction" may refer to the vector through which fluid may travel in an open path in a channel.

The term "bulk flow region" may refer to open areas within a microchannel. A contiguous bulk flow region may allow rapid fluid flow through a microchannel without significant pressure drops. In one embodiment, the flow in the bulk flow region may be laminar. A bulk flow region may comprise at least about 5% of the internal volume and/or cross-sectional area of a microchannel, and in one embodiment from about 5% to about 100%, and in one embodiment from about 5% to about 99%, and in one embodiment about 5% to about 95%, and in one embodiment from about 5% to about 90%, and in one embodiment from about 30% to about 80% of the internal volume and/or cross-sectional area of the microchannel.

The terms "open channel" or "flow-by channel" or "open path" may refer to a channel (e.g., a microchannel) with a gap of at least about 0.01 mm that extends all the way through the channel such that fluid may flow through the channel without encountering a barrier to flow. The gap may extend up to about 10 mm.

The term "cross-sectional area" of a channel (e.g., process microchannel) may refer to an area measured perpendicular to the direction of the bulk flow of fluid in the channel and may include all areas within the channel including any surface features that may be present, but does not include the channel walls. For channels that curve along their length, the cross-sectional area may be measured perpendicular to the direction of bulk flow at a selected point along a line that parallels the length and is at the center (by area) of the channel. Dimensions of height and width may be measured from one channel wall to the opposite channel wall. These dimensions may not be changed by application of a coating to the surface of the wall. These dimensions may be average values that account for variations caused by surface features, surface roughness, and the like.

The term "open cross-sectional area" of a channel (e.g., process microchannel) may refer to an area open for bulk fluid flow in a channel measured perpendicular to the direction of the bulk flow of fluid flow in the channel. The open cross-sectional area may not include internal obstructions such as surface features and the like which may be present.

The term "superficial velocity" for the velocity of a fluid flowing in a channel may refer to the velocity resulting from dividing the volumetric flow rate of the fluid at the inlet temperature and pressure of the channel divided by the cross-sectional area of the channel.

The term "free stream velocity" may refer to the velocity of a stream flowing in a channel at a sufficient distance from the sidewall of the channel such that the velocity is at a maximum value. The velocity of a stream flowing in a channel is zero at the sidewall if a no slip boundary condition is applicable, but increases as the distance from the sidewall increases until a constant value is achieved. This constant value is the "free stream velocity."

The term "process fluid" may be used herein to refer to reactants, product and any diluent or other fluid that may flow in a process microchannel.

The term "reaction zone" may refer to the space within a microchannel wherein a chemical reaction occurs or wherein a chemical conversion of at least one species occurs. The reaction zone may contain one or more catalysts.

The term "yield" may refer to the number of moles of product exiting a microchannel reactor divided by the number of moles of a reactant entering the microchannel reactor.

The term "cycle" may refer to a single pass of the reactants through a microchannel reactor.

The term "graded catalyst" may refer to a catalyst with one or more gradients of catalytic activity. The graded catalyst may have a varying concentration or surface area of a catalytically active metal. The graded catalyst may have a varying turnover rate of catalytically active sites. The graded catalyst may have physical properties and/or a form that varies as a function of distance. For example, the graded catalyst may have an active metal concentration that is relatively low at the entrance to a process microchannel and increases to a higher concentration near the exit of the process microchannel, or vice versa; or a lower concentration of catalytically active metal nearer the center (i.e., midpoint) of a process microchannel and a higher concentration nearer a process microchannel wall, or vice versa, etc. The thermal conductivity of a graded catalyst may vary from one location to another within a process microchannel. The surface area of a graded catalyst may be varied by varying size of catalytically active metal sites on a constant surface area support, or by varying the surface area of the support such as by varying support type or particle size. A graded catalyst may have a porous support where the surface area to volume ratio of the support is higher or lower in different parts of the process microchannel followed by the application of the same catalyst coating everywhere. A combination of two or more of the preceding embodiments may be used. The graded catalyst may have a single catalytic component or multiple catalytic components (for example, a bimetallic or trimetallic catalyst). The graded catalyst may change its properties and/or composition gradually as a function of distance from one location to another within a process microchannel. The graded catalyst may comprise rimmed particles that have "eggshell" distributions of catalytically active metal within each particle. The graded catalyst may be graded in the axial direction along the length of a process microchannel or in the lateral direction. The graded catalyst may have different catalyst compositions, different loadings and/or numbers of active catalytic sites that may vary from one position to another position within a process microchannel. The number of catalytically active sites may be changed by altering the porosity of the catalyst structure. This may be accomplished using a washcoating process that deposits varying amounts of catalytic material. An example may be the use of different porous catalyst thicknesses along the process microchannel length, whereby a thicker porous structure may be left where more activity is required. A change in porosity for a fixed or variable porous catalyst thickness may also be used. A first pore size may be used adjacent to an open area or gap for flow and at least one second pore size may be used adjacent to the process microchannel wall.

The term "biomass" may refer to living and recently dead biological material that can be used as fuel. The term biomass may refer to plant matter grown for use as biofuel. The term biomass may include plant or animal matter used for production of fibers, chemicals or heat. Biomass may include biodegradable wastes that can be burnt as fuel. Biomass may comprise plants such as switchgrass, hemp, corn, poplar, willow, sugarcane, oil palm, and the like.

The term "char" may refer to a solid material that remains after gases have been driven out or released from a carbonaceous material. Char may be formed during the combustion of a carbonaceous material.

The term "tar" may refer to a viscous black liquid derived from the destructive distillation of a carbonaceous material.

The term "ash" may refer to the solid residue that remains after a carbonaceous material is burned.

The term "chain growth" may refer to the growth in a molecule resulting from a reaction in which the molecule grows with the addition of new molecular structures (e.g., the addition of methylene groups to a hydrocarbon chain in a Fischer-Tropsch synthesis).

The term "hydrocarbon" may refer to purely hydrocarbon compounds; that is, aliphatic compounds, (e.g., alkane, alkene or alkyne), alicyclic compounds (e.g., cycloalkane, cycloalkylene), aromatic compounds, aliphatic- and alicyclic-substituted aromatic compounds, aromatic-substituted aliphatic compounds, aromatic-substituted alicyclic compounds, and the like. Examples may include methane, ethane, propane, cyclohexane, ethyl cyclohexane, toluene, ethyl benzene, etc. The term "hydrocarbon" may refer to substituted hydrocarbon compounds; that is, hydrocarbon compounds containing non-hydrocarbon substituents. Examples of the non-hydrocarbon substituents may include hydroxyl, acyl, nitro, etc. The term "hydrocarbon" may refer to hetero substituted hydrocarbon compounds; that is, hydrocarbon compounds which contain atoms other than carbon in a chain or ring otherwise containing carbon atoms. The hetero atoms may include, for example, nitrogen, oxygen, sulfur, and the like. The hydrocarbon compound may comprise about 10 carbon atoms or more for each non-hydrocarbon substituent or hetero atom.

The term "higher molecular weight hydrocarbon" may refer to a hydrocarbon having 2 or more carbon atoms, and in one embodiment 3 or more carbon atoms, and in one embodiment 4 or more carbon atoms, and in one embodiment 5 or more carbon atoms, and in one embodiment 6 or more carbon atoms. The higher molecular weight hydrocarbons may have up to about 100 carbon atoms, and in one embodiment up to about 90 carbon atoms, and in one embodiment up to about 80 carbon atoms, and in one embodiment up to about 70 carbon atoms, and in one embodiment up to about 60 carbon atoms, and in one embodiment up to about 50 carbon atoms, and in one embodiment up to about 40 carbon atoms, and in one embodiment up to about 30 carbon atoms. The higher molecular weight hydrocarbons may be aliphatic hydrocarbons. Examples may include ethane, propane, butane, pentane, hexane, octane, decane, dodecane, and the like.

The term "Fischer-Tropsch" or "FT" may refer to a chemical reaction represented by the equation:

$$nCO + 2nH_2 \rightarrow (CH_2)_n + nH_2O$$

This reaction is an exothermic reaction which may be conducted in the presence of a Fischer-Tropsch catalyst. n may be any number, for example from 1 to about 10, and in one embodiment from 2 to about 10, and in one embodiment from 2 to about 8.

The term "Fischer-Tropsch product" or "FT product" may refer to a hydrocarbon product made by a Fischer-Tropsch process. The FT product may have a boiling point at or above about 30° C. at atmospheric pressure.

The term "FT tail gas" may refer to a gaseous product made by a Fischer-Tropsch process. The tail gas may have a boiling point below about 30° C. at atmospheric pressure.

The term "alcohol forming reaction" may refer to the synthesis reaction represented by the equation:

$$nCO + H_2 \rightarrow C_nH_{2n+1}OH + (n-1)H_2O$$

This reaction is an exothermic reaction which may be conducted in the presence of an alcohol forming catalyst. n may be any number, for example from 1 to about 10, and in one embodiment from 2 to about 10, and in one embodiment from 2 to about 8.

The term "Co loading" may refer to the weight of Co in a catalyst divided by the total weight of the catalyst, that is, the total weight of the Co plus any co-catalyst or promoter as well as any support. If the catalyst is supported on an engineered support structure such as a foam, felt, wad or fin, the weight of such engineered support structure may not be included in the calculation. Similarly, if the catalyst is adhered to a channel wall, the weight of the channel wall may not be included in the calculation.

The term "steam methane reforming" or "SMR" may refer to the reaction:

$$H_2O + CH_4 \rightarrow CO + 3H_2$$

This reaction is endothermic, and may be conducted in the presence of an SMR catalyst. The product mixture of $CO+H_2$ may be referred to as synthesis gas or syn gas. The heat required to effect this reaction may be provided by the combustion reaction of a mixture of a fuel (e.g., $H_2$) and oxygen or a source of oxygen (e.g., air or oxygen enriched air). The combustion reaction is exothermic and may be conducted in the presence of a combustion catalyst.

The term "hydrocracking process" refers to a process wherein one or more C—C bonds in a hydrocarbon reactant are ruptured to yield a product comprising two or more hydrocarbon products having lower molecular weights than the hydrocarbon reactant. For example, a $C_{12}$ alkane may be converted to a $C_7$ alkane and a $C_5$ alkane The term "mm" may refer to millimeter. The term "nm" may refer to nanometer. The term "ms" may refer to millisecond. The term "μs" may refer to microsecond. The term "μm" may refer to micron or micrometer. The terms "micron" and "micrometer" have the same meaning and may be used interchangeably.

Unless otherwise indicated, all pressures are expressed in terms of absolute pressure.

The carbonaceous material that may be used in the inventive process may comprise any organic or carbon-containing material that can be gasified to produce synthesis gas. The carbonaceous material may comprise a food resource such as corn, soybean, and the like. The carbonaceous material may comprise a non-food resource. The non-food resource may be referred to as a second generation biofuel. The non-food resource may comprise any carbonaceous material not generally used as a food. The non-food resource may be referred to as a non-food carbonaceous material. Examples of the non-food carbonaceous materials that may be used may comprise coal (e.g., low grade coal, high grade coal, and the like), oil (e.g., crude oil, heavy oil, tar sand oil, and the like), biomass, solid wastes, or a mixture of two or more thereof. The non-food carbonaceous material may comprise municipal solid waste (MSW), hazardous waste, refuse derived fuel (RDF), tires, petroleum coke, trash, garbage, biogas from a digester, sewage sludge, animal waste (e.g., chicken manure, turkey manure, cow manure, horse manure, as well as other animal waste), agricultural waste, corn stover, switch grass, timber, wood cuttings, grass clippings, construction demolition materials, plastic materials (e.g., plastic waste), cotton gin waste, landfill gas, natural gas, and the like. The non-food carbonaceous material may comprise polyethylene or polyvinyl chloride. Mixtures of two or more of any of the foregoing may be used.

The carbonaceous material may be in the form of relatively large solid pieces and prior to step (A) these relatively large pieces may be shredded into smaller pieces using, for example, an auger.

The carbonaceous material may comprise water, and in at least one embodiment of the invention, it may be advantageous to remove some or all of the water prior to the gasification step (A) of the inventive process. This may be accomplished using conventional drying techniques.

The term "synthesis gas" refers to a gaseous mixture that contains CO and $H_2$. Synthesis gas is sometimes referred to as syngas. The synthesis gas that is formed in the gasification step (A) of the inventive process may comprise a gaseous mixture that contains varying amounts of CO and $H_2$. In at least one embodiment of the inventive process, it is advantageous to use a synthesis gas during step (B) with a molar ratio of $H_2$ to CO that may be in the range from about 0.5 to about 4, and in one embodiment in the range from about 1 to about 3, and in one embodiment in the range from about 1.5 to about 2.5, and in one embodiment in the range from about 1.8 to about 2.2. If the amount of $H_2$ produced during step (A) is not sufficient to provide for the $H_2$ to CO ratio specified above, additional amounts of $H_2$ may be added to the synthesis gas prior to step (B) of the inventive process. The synthesis gas may also contain varying amounts of $CO_2$ and water as well as particulate solids and other contaminants. The $CO_2$, water, particulate solids and other contaminants may be separated out, or at least substantially separated out from the synthesis gas, prior to conducting step (B) of the inventive process.

Figure 1:
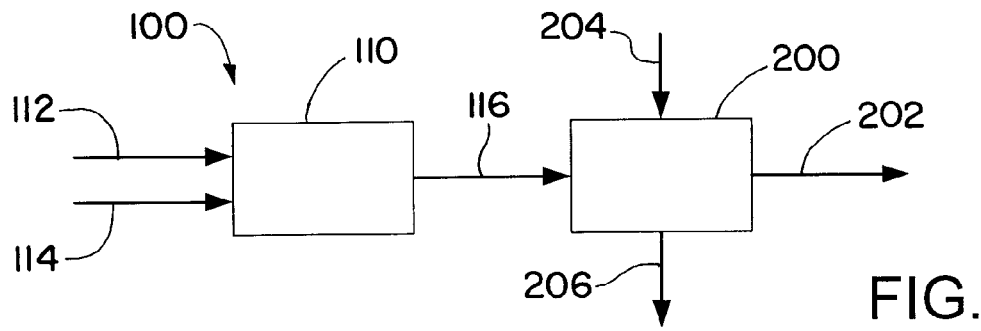
FIG. 1 is a flow sheet illustrating the inventive process in a particular form, the process comprising converting a carbonaceous material to one or more hydrocarbons or one or more alcohols using a gasifier in combination with a Fischer-Tropsch (FT) or alcohol-forming microchannel reactor. The carbonaceous material is converted to synthesis gas in the gasifier. The synthesis gas is converted to one or more hydrocarbons or alcohols in the microchannel reactor.

The inventive process, in its illustrated embodiments, will be described initially with respect to FIGS. 1-8. Referring to FIG. 1, the process 100 employs the use of gasifier 110 and microchannel reactor 200. The microchannel reactor 200 may be referred to as a Fischer-Tropsch microchannel reactor when employed to convert synthesis gas to one or more hydrocarbons. The microchannel reactor 200 may be referred to as an alcohol-forming microchannel reactor when used to convert synthesis gas to one or more alcohols. In operation, the carbonaceous material enters the gasifier 110 through line 112. A gasification agent (e.g. steam, oxygen and/or air) enters the gasifier 110 through line 114. In the gasifier 110, the carbonaceous material and the gasification agent are heated and undergo a gasification reaction to form synthesis gas. The synthesis gas flows from the gasifier 110 into the microchannel reactor 200 through line 116. The synthesis gas flowing out of the gasifier 110 may be at an elevated temperature, for example, in excess of about 700° C., and as such it may be advantageous to reduce the temperature of the synthesis gas prior to entering the microchannel reactor 200. This temperature comparable to the desired operating temperature in the microchannel reactor 200 as discussed below using one or more heat exchangers in the line between the gasifier 110 and the microchannel reactor 200. These heat exchangers may be microchannel heat exchangers. The synthesis gas flowing out of the gasifier 110 may contain undesirable levels of water, particulate solids, contaminants (e.g., sulfur, halogen, selenium, phosphorus, arsenic, nitrogen, carbon dioxide, and the like), and the like. The concentrations of these may be reduced using one or more gas-liquid sorption devices (which may employ the use of one or more ionic liquid sorbents), temperature swing adsorption (TSA) devices, pressure swing adsorption (PSA) devices, microchannel devises containing layers of nanofibers or nano-composite films, cyclones, condensers, and the like, in the line between the gasifier 110 and the microchannel reactor 200. In the microchannel reactor 200, the synthesis gas flows through one or more process microchannels in contact with a catalyst to form the desired product. The catalyst may be a Fischer-Tropsch catalyst and the product formed by contacting the Fischer-Tropsch catalyst may comprise one or more hydrocarbons. Alternatively, the catalyst may be an alcohol-forming catalyst and the product resulting from contacting the catalyst may comprise one or more alcohols. Both of these reactions are exothermic reactions. These reactions may be controlled using a heat exchange fluid which flows through the microchannel reactor 200 as indicated by arrows 204 and 206. In one embodiment, the heat exchange fluid comprises steam. The resulting product flows out of the microchannel reactor 200 through line 202.

Figure 2:
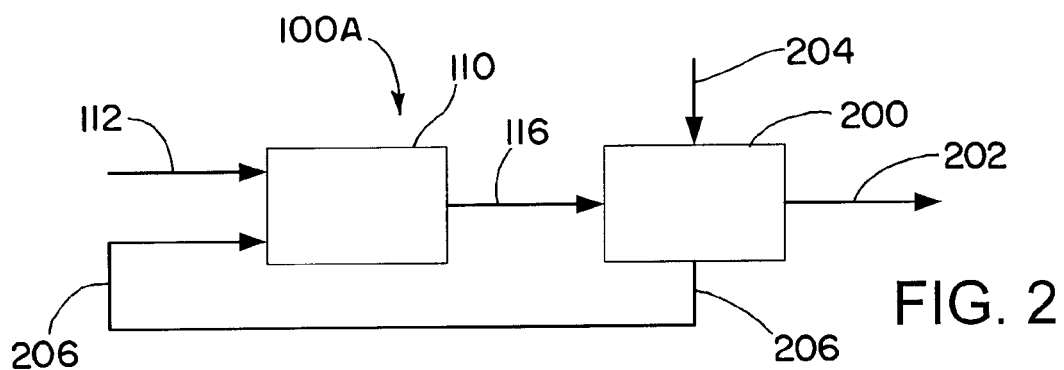
FIG. 2 is a flow sheet of a process that is the same as the process illustrated in FIG. 1 with the exception that steam, which is used as a heat exchange fluid in the microchannel reactor, is also used as a gasification agent in the gasifier.

The process 100A illustrated in FIG. 2 is the same as the process 100 illustrated in FIG. 1, with the exception that steam, which is used as the heat exchange fluid in the microchannel reactor 200 is also used as the gasification agent in the gasifier 110. The steam flows from the microchannel reactor 200 through line 206 to the gasifier 110. In the gasifier 110, the steam functions as a gasification agent during the gasification of the carbonaceous material.

Figure 3:
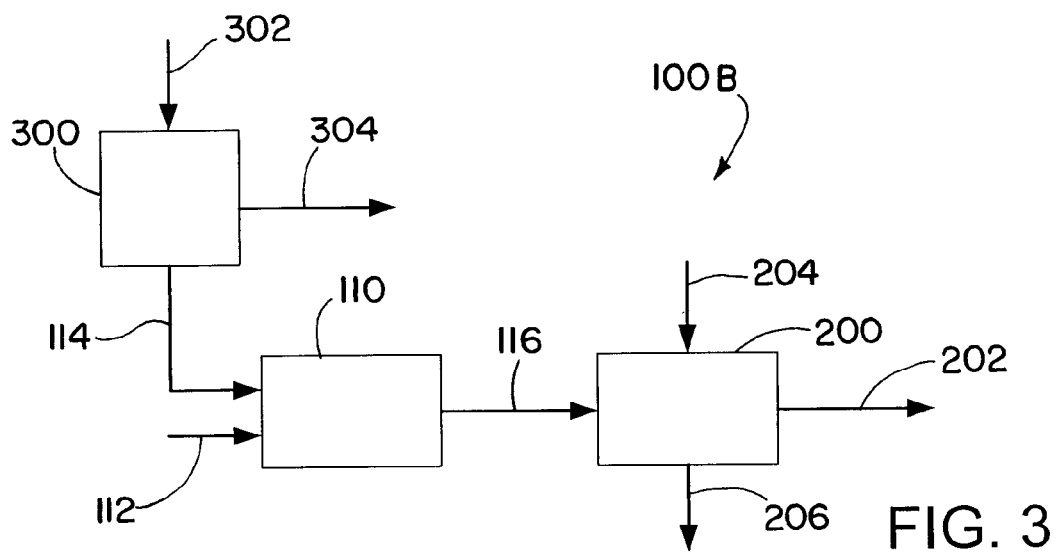
FIG. 3 is a flow sheet of a process that is the same as the process illustrated in FIG. 1 with the exception that the process includes the use of a nitrogen separator upstream of the gasifier. Nitrogen is separated from air in the nitrogen separator. The remaining oxygen is used as the gasification agent in the gasifier.

The process 100B illustrated in FIG. 3 is the same as the process 100 illustrated in FIG. 1 with the exception that the process 100B includes a nitrogen separator 300. The nitrogen separator 300 may comprise any device suitable for separating nitrogen from air. For example, the nitrogen separator 300 may comprise an ionic liquid separator, a temperature swing adsorption (TSA) device or a pressure swing adsorption (PSA) device. In operation, air enters the nitrogen separator 300 through line 302 where it undergoes a separation process with the nitrogen being separated from the air. This results in the formation of oxygen enriched air or purified oxygen. The nitrogen flows out of the nitrogen separator 300 through line 304. The oxygen enriched air or purified oxygen flows from the nitrogen separator 300 through line 114 into the gasifier 110. The oxygen enriched air or purified oxygen functions as a gasification agent in the gasifier 110. The carbonaceous material and the gasification agent undergo a gasification reaction to form synthesis gas. The synthesis gas flows from the gasifier 110 through line 116 to the microchannel reactor 200 where it undergoes a reaction to form one or more hydrocarbons or one or more alcohols as discussed above.

Figure 4:
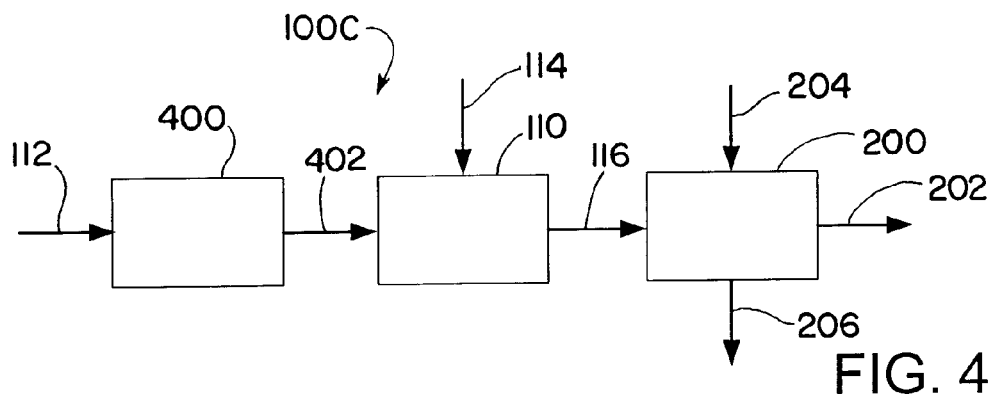
FIG. 4 is a flow sheet of a process that is the same as the process illustrated in FIG. 1 with the exception that the process illustrated in FIG. 4 employs the use of a pyrolysis reactor. The carbonaceous material is converted to pyrolytic oil in the pyrolysis reactor. The pyrolytic oil is used as the carbonaceous feed for the gasifier.

The process 100C illustrated in FIG. 4 is the same as the process 100 illustrated in FIG. 1, with the exception that the process 100C employs the use of pyrolysis reactor 400. In operation, the carbonaceous material enters the pyrolysis reactor 400 through line 112. In the pyrolysis reactor 400, the carbonaceous material undergoes a pyrolysis reaction with the result being the formation of a pyrolytic oil. The pyrolytic oil flows from the pyrolysis reactor 400 through line 402 to gasifier 110. A gasification agent enters the gasifier 110 through line 114. In the gasifier 110, the pyrolytic oil and the gasification agent are heated and undergo a gasification reaction to form synthesis gas. Synthesis gas flows from the gasifier 110 through line 116 to the microchannel reactor 200 where it undergoes a reaction to form one or more hydrocarbons or one or more alcohols as described above.

Figure 5:
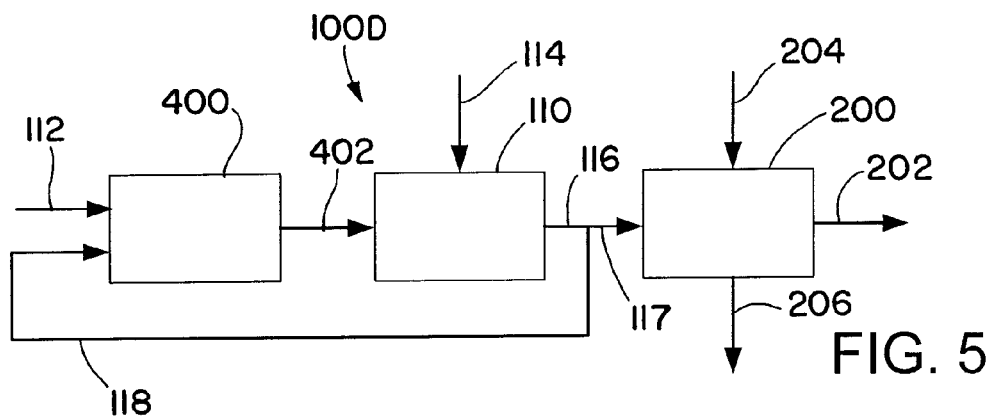
FIG. 5 is a flow sheet of a process that is the same as the process illustrated in FIG. 4 with the exception that liquid hydrocarbons, such as tar, are separated from the synthesis gas flowing out of the gasifier and recycled to the pyrolysis reactor.

The process 100D illustrated in FIG. 5 is the same as the process 100C illustrated in FIG. 4, with the exception that liquid hydrocarbons, such as tar, are separated from the synthesis gas flowing out of the gasifier 110. These liquid hydrocarbons are recycled back to the pyrolysis reactor 400 from line 116 through line 118. The recycled liquid hydrocarbons and the carbonaceous material entering the pyrolysis reactor 400 through line 112 are combined and subjected to pyrolysis in the pyrolysis reactor 400 resulting in the formation of pyrolytic oil. The pyrolytic oil flows from the pyrolysis reactor 400 through line 402 to the gasifier 110 wherein it is combined with a gasification agent which enters the gasifier 110 through line 114. The pyrolytic oil and gasification agent are heated in the gasifier 110 and undergo a gasification reaction to form synthesis gas. The synthesis gas flows from the gasifier 110 through line 116 to the microchannel reactor 200. In the microchannel reactor 200, the synthesis gas is converted to one or more hydrocarbons or one or more alcohols as described above.

Figure 6:
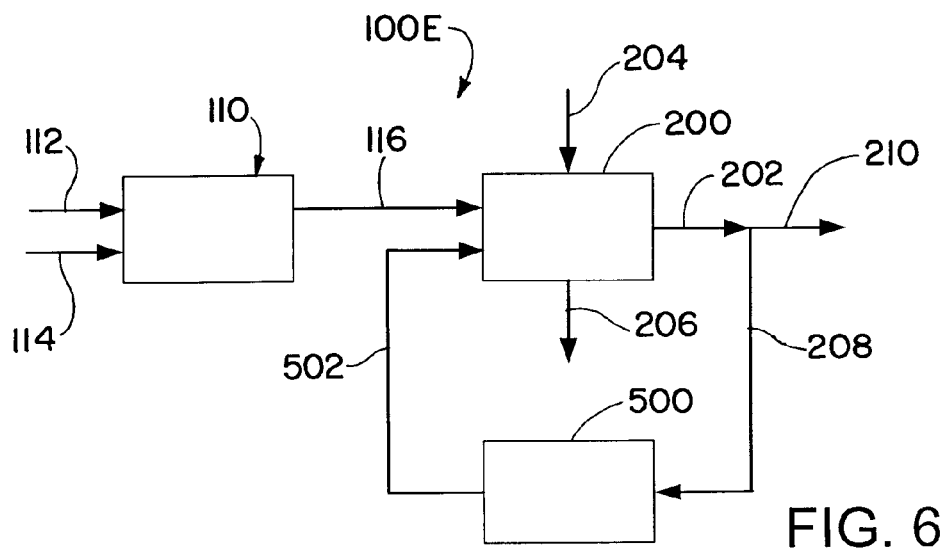
FIG. 6 is a flow sheet of a process which employs the use of the gasifier and microchannel reactor illustrated in FIG. 1 in combination with a steam methane reforming (SMR) microchannel reactor. The SMR microchannel reactor is used to convert tail gas flowing out of the microchannel reactor to synthesis gas which is recycled to the microchannel reactor.

The process 100E illustrated in FIG. 6 employs the use of the gasifier 110 and microchannel reactor 200 discussed above in combination with a steam methane reforming (SMR) microchannel reactor 500. In the SMR microchannel reactor 500, an SMR reaction is conducted wherein a tail gas comprising methane reacts with steam in an endothermic reaction to form synthesis gas. The SMR microchannel reactor 500 may comprise a plurality of SMR process microchannels in thermal contact with a plurality of combustion channels. A combustion reaction may be conducted in the combustion channels to provide the required heat for the endothermic SMR reaction. In the operation of the process 100E, a carbonaceous material enters the gasifier 110 through line 112 wherein it is combined with a gasification agent which enters the gasifier 110 through line 114. The carbonaceous material and the gasification agent are heated and undergo a gasification reaction to form synthesis gas. The synthesis gas flows through line 116 to the microchannel reactor 200 wherein it contacts a catalyst and reacts to form one or more hydrocarbons or one or more alcohols as discussed above. The product flows out of the microchannel reactor 200 through line 202. A tail gas, which comprises methane, is separated from the product and flows from line 202 through line 208 to the SMR microchannel reactor 500. The remainder of the product (that is, the product less the tail gas) flows out of the system through line 210. The tail gas along with steam flows through the SMR microchannel reactor 500. The tail gas and steam undergo an SMR reaction and are converted to synthesis gas. The synthesis gas flows from the SMR microchannel reactor 500 through line 502 to the microchannel reactor 200 where it is combined with the synthesis gas flowing from the gasifier 110. The combined synthesis gas mixture flows in the microchannel reactor 200 and undergoes reaction as described above.

Figure 7:
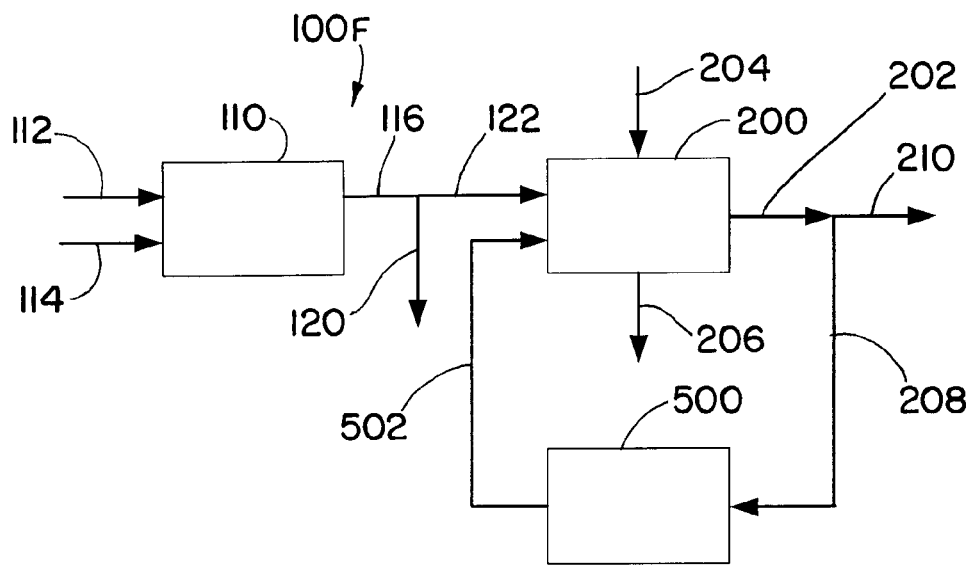
FIG. 7 is a flow sheet of a process that is the same as the process illustrated in FIG. 6 with the exception that carbon dioxide is separated from the synthesis gas flowing out of the gasifier. The resulting carbon dioxide lean synthesis gas then flows into the microchannel reactor.

The process 100F illustrated in FIG. 7 is the same as the process 100E illustrated in FIG. 6 with the exception that carbon dioxide is separated from the synthesis gas flowing out of the gasifier 110 through line 116 as indicated by arrow 120. The carbon dioxide lean synthesis gas (that is, the synthesis gas less carbon dioxide) flows through line 122 into microchannel reactor 200 wherein it is combined with the synthesis gas from line 502. The combined synthesis gas mixture undergoes reaction in the microchannel reactor 200 to form one or more hydrocarbons or one or more alcohols as described above.

Figure 8:
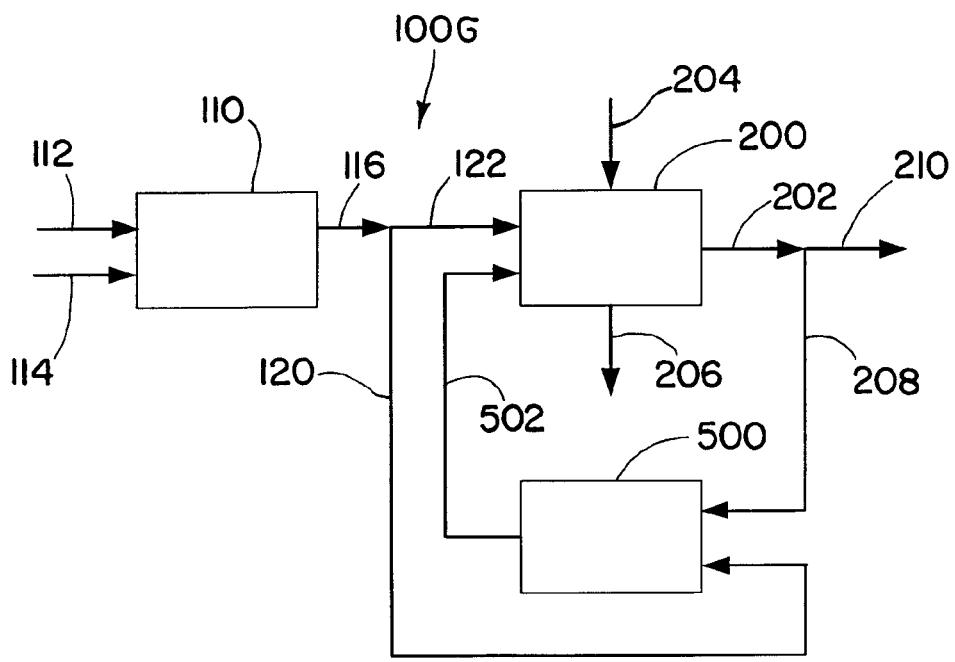
FIG. 8 is a flow sheet of a process that is the same as the process illustrated in FIG. 7 with the exception that the carbon dioxide that is separated from the synthesis gas flowing out of the gasifier flows to the SMR microchannel reactor where it is combined with tail gas from the microchannel reactor and converted to synthesis gas.

The process 100G illustrated in FIG. 8 is the same as the process 100F illustrated in FIG. 7 with the exception that the carbon dioxide that is separated from the synthesis gas flowing out of the gasifier 110 through line 116 flows through line 120 to the SMR microchannel reactor 500 wherein it is combined with the tail gas and reacts to form synthesis gas. This synthesis gas flows out of the SMR microchannel reactor 500 through line 502 to the microchannel reactor 200. In the microchannel reactor 200, the synthesis gas from line 502 is combined with the synthesis gas from line 122 and undergoes reaction to form one or more hydrocarbons or one or more alcohols as discussed above.

Figure 8A:
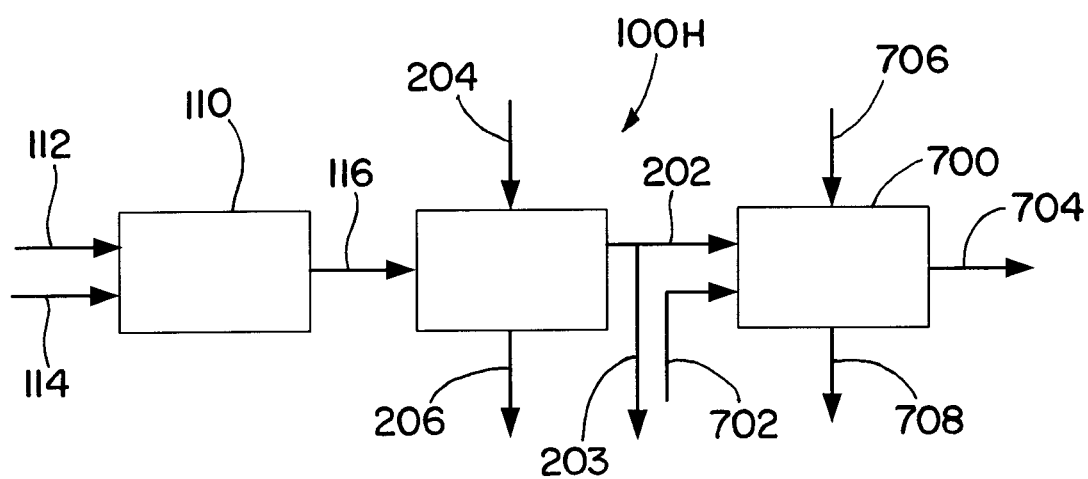
FIG. 8A is a flow sheet of a process that is the same as the process illustrated in FIG. 1 wherein the microchannel reactor is a Fischer-Tropsch microchannel reactor except that the product flowing out of the Fischer-Tropsch microchannel reactor undergoes a hydrocracking reaction in a hydrocracking microchannel reactor.

The process 100H illustrated in FIG. 8A is the same as the process 100 illustrated in FIG. 1 with the exception that the product flowing out of the microchannel reactor 200 through line 202 comprises a Fischer-Tropsch product. The Fischer-Tropsch product may comprise a mixture of liquid and gas. The gaseous Fischer-Tropsch product may be separated from the liquid Fischer-Tropsch product as indicated by arrow 203. The liquid Fischer-Tropsch product may then undergo a hydrocracking reaction in hydrocracking microchannel reactor 700. Optionally, the Fischer-Tropsch liquid product may be separated into a light fraction and a heavy fraction in a separation unit or a distillation unit. The heavy fraction may be fed to the hydrocracking microchannel reactor 700. The light fraction may be taken as a final product or processed separately. Alternatively, the light fraction may be introduced into the hydrocracking microchannel reactor 700 that is processing the heavy fraction. The light fraction may be hydrocracked in a separate hydrocracking microchannel reactor. The liquid Fischer-Tropsch product flowing from line 202 may enter hydrocracking microchannel reactor 700 where it may be combined with a hydrogen feed stream. The hydrogen feed stream enters the hydrocracking microchannel reactor 700 as indicated by arrow 702. In the hydrocracking microchannel reactor 700, the Fischer-Tropsch product and hydrogen contact a hydrocracking catalyst and react to form the desired hydrocracked product. The hydrocracked product flows out of the hydrocracking microchannel reactor 700 as indicated by arrow 704. In an alternate embodiment, the liquid Fischer-Tropsch product may be separated into a light fraction and a heavy fraction, and then just the heavy fraction would be hydrocracked in the hydrocracking microchannel reactor 700. The hydrocracking process is exothermic. This reaction may be controlled using a heat exchange fluid which flows through the microchannel reactor 700 as indicated by arrows 706 and 708. However, the use of the heat exchange fluid may be optional due to the fact that the hydrocracking reaction may be only slightly exothermic.

In an alternate embodiment, the hydrocracking reaction may be conducted in the same microchannel reactor used to conduct the Fischer-Tropsch reaction. In this embodiment, the microchannel reactor 200 used to conduct the Fischer-Tropsch reaction may be modified to include a hydrocracking reaction zone downstream of the Fischer-Tropsch reaction zone. The hydrogen feed would flow into the hydrocracking reaction zone. The microchannel reactor 200 may also be modified to permit removal of gaseous Fischer-Tropsch products and, optionally, light fraction liquid Fischer-Tropsch products, downstream of the Fischer-Tropsch reaction zone but upstream of the hydrocracking reaction zone.

The gasification step (A) of the inventive process involves converting the carbonaceous material to synthesis gas by reacting the carbonaceous material at a temperature of at least about 700° C. with a gasification agent. The gasification agent may comprise oxygen, air and/or steam. The gasification step (A) may be conducted at a temperature of at least about 800° C., and in one embodiment at a temperature of at least about 900° C., and in one embodiment at a temperature of at least about 1000° C., and in one embodiment at a temperature of at least about 1100° C., and in one embodiment at a temperature of at least about 1200° C. The gasification step (A) may be conducted at a temperature in the range from about 700° C. to about 2500° C., and in one embodiment in the range from about 800° C. to about 2200° C., and in one embodiment in the range from about 900° C. to about 2000° C., and in one embodiment in the range from about 1000° C. to about 1800° C., and in one embodiment in the range from about 1100° C. to about 1800° C., and in one embodiment in the range from about 1200° C. to about 1800° C., and in one embodiment in the range from about 1300° C. to about 1500° C. The elevated temperatures used during step(A) distinguish it from biological processes such as anaerobic digestion that produce biogas.

While not wishing to be bound by theory, it is believed that during step (A) of the inventive process, the carbonaceous material may undergo the following processes:

1. A pyrolysis (or devolatilization) process may occur as the carbonaceous material heats up. Volatiles may be released and char may be produced, resulting in, for example, up to about 70% by weight loss. The process may be dependent on the properties of the carbonaceous material. These properties may determine the structure and composition of the char.

2. A combustion process may occur as the volatile products and some of the char reacts with oxygen to form carbon dioxide and carbon monoxide. This may provide heat for the subsequent gasification reactions.

3. Reaction of the char with carbon dioxide and steam to produce carbon monoxide and hydrogen.

4. A reversible gas phase water gas shift reaction may reach equilibrium at the temperatures in the gasifier. This may result in balancing the concentrations of carbon monoxide, steam, carbon dioxide and hydrogen $$CO+H_2O \leftrightarrow CO_2+H_2$$

With these processes, a limited amount of oxygen may be introduced into the gasifier to allow some of the carbonaceous material to be burned to produce carbon monoxide and energy in a first reaction. The molar ratio of oxygen to carbon may be in the range from about 0.01:1 to about 5:1, and in one embodiment in the range from about 0.2:1 to about 2:1, and in one embodiment in the range from about 0.5:1 to about 1.5:1, and in one embodiment in the range from about 0.5:1 to about 1.2:1, and in one embodiment about 1:1. This reaction may be used to drive a second reaction that converts further carbonaceous material to hydrogen and additional carbon monoxide.

The gasification step (A) may be conducted in a counter-current fixed bed gasifier, a co-current fixed bed gasifier, a fluidized bed gasifier, or an entrained flow gasifier. The counter-current fixed bed gasifier may comprise a fixed bed of carbonaceous material through which the gasification agent (e.g., steam, oxygen and/or air) flows in counter-current configuration. Ash may be removed either dry or as a slag. The slagging gasifiers may require a higher ratio of steam and oxygen to carbon in order to reach temperatures higher than the ash fusion temperature. The carbonaceous material may require a high mechanical strength and a non-caking composition so that it may form a permeable bed. The throughput for this type of gasifier may be relatively low. Thermal efficiency may be high as the gas exit temperature may be relatively low. Tar and methane may be produced with this process.

The co-current fixed bed gasifier is similar to the counter-current type, with the exception that the gasification agent flows in co-current configuration with the carbonaceous material. Heat may need to be added to the upper part of the bed, either by combusting small amounts of the carbonaceous material or from external heat sources. The synthesis gas may leave the gasifier at a high temperature. Most of this heat may be transferred to the gasification agent added in the top of the bed to provide for energy efficiency. Tars may pass through a hot bed of char in this configuration. However, the tar levels may be lower than with the counter-current type.

In the fluidized bed gasifier, the carbonaceous material may be fluidized in the gasification agent. Ash may be removed dry or as heavy agglomerates that defulidize. The temperature may be relatively low in dry ash gasifiers and, as such, the carbonaceous material may be relatively highly reactive; low-grade coals may be particularly suitable. The agglomerating gasifiers may operate at slightly higher temperatures, and may be suitable for higher rank coals. Carbonaceous material throughput may be higher than for the fixed bed, but not as high as for the entrained flow gasifier. The conversion efficiency may be rather low due to elutriation of carbonaceous material. Recycle or subsequent combustion of solids may be used to increase conversion. Fluidized bed gasifiers may be useful for carbonaceous materials that form highly corrosive ash that may damage the walls of slagging gasifiers.

In the entrained flow gasifier a dry pulverized solid carbonaceous material, an atomized liquid carbonaceous material, or a slurry of the carbonaceous material may be gasified with oxygen or air in co-current flow. The gasification reactions may take place in a dense cloud of very fine particles. Most coals may be suitable for this type of gasifier because of the high operating temperatures and because the coal particles may be well separated from one another. The high temperatures and pressures may also mean that a higher throughput may be achieved, however thermal efficiency may be somewhat lower as the gas may be cooled before it can be cleaned. The high temperatures may also mean that tar and methane may not be present in the product synthesis gas; however the oxygen requirement may be higher than for the other types of gasifiers. Entrained flow gasifiers may remove a major part of the ash as a slag as the operating temperature may be above the ash fusion temperature. A smaller fraction of the ash may be produced either as a very fine dry fly ash or as a black colored fly ash slurry. Some carbonaceous materials, in particular certain types of biomasses, may form slag that is corrosive for ceramic inner walls that may serve to protect the gasifier outer wall. However, some entrained bed types of gasifiers may not possess a ceramic inner wall but may have an inner water or steam cooled wall covered with partially solidified slag. These types of gasifiers may not suffer from corrosive slags. Some carbonaceous materials may have ashes with very high ash fusion temperatures. In this case limestone may be mixed with the fuel prior to gasification. Addition of limestone may suffice for lowering the fusion temperatures. The carbonaceous material particles may be smaller than for other types of gasifiers. This may mean that the carbonaceous material may be pulverized, which may require more energy than for the other types of gasifiers.

The gasification step (A) may be conducted in a molten metal reactor. In the molten metal reactor, the carbonaceous material and steam contact molten metal and react to form the synthesis gas. The molten metal may comprise a reactive metal (Me) that reacts with a first portion of the steam entering the reactor according to the following equation:

$$x\text{Me} + y\text{H}_2\text{O} \rightarrow y\text{H}_2 + \text{Me}_x\text{O}_y$$

The carbonaceous material may react with a second portion of the steam to form carbon monoxide and hydrogen. The reactive metal may have an oxygen affinity that is similar to the oxygen affinity of hydrogen. The reactive metal may comprise one or more of the following metals or their alloys: germanium, iron, zinc, tungsten, molybdenum, indium, tin, cobalt or antimony. The reactive metal may be at least partially dissolved in a second metal or mixture of metals. The metal into which the reactive metal is dissolved may be referred to as a diluent metal. The diluent metal may also be reactive with steam, in which case it may be selected from the reactive metals disclosed above, provided that the diluent metal is less reactive than the reactive metal. The diluent metal may comprise one or more of nickel, copper, ruthenium, rhodium, palladium, silver, cadmium, rhenium, osmium, iridium, platinum, gold, mercury, lead, bismuth, selenium or tellurium. More than one diluent metal may be utilized in the molten metal mixture. In one embodiment, the reactive metal may comprise iron, and the diluent metal may comprise tin. Molten metal reactors that may be used to convert the carbonaceous material to synthesis gas may include the molten metal reactors disclosed in U.S. Pat. Nos. 7,232,472 B2; 6,685,754 B2; 6,682,714 B2; and 6,663,681 B2; which are incorporated herein by reference.

The gasification step (A) may be conducted in a plasma based gasification system. With such a system, the carbonaceous material may be fed into a plasma converter which may comprise a sealed, stainless steel vessel filled with either nitrogen or ordinary air. An electric current (e.g., a 650-volt electrical current) may be passed between two electrodes; this removes electrons from the nitrogen or air and creates plasma.

A constant flow of electricity through the plasma maintains a field of intense energy powerful enough to disintegrate the carbonaceous material into its component elements. The byproducts may comprise a glass-like substance, which may be used as a raw material for high-strength asphalt or household tiles, and synthesis gas. The synthesis gas may leave the plasma converter at a high temperature, e.g., about 2200° F. (1204° C.). The synthesis gas may then be fed into a cooling system which generates steam. This steam may be used to drive turbines which produce electricity, part of which may be used to power the plasma converter, while the rest may be used for the plant's heating or electrical needs, or sold back to the utility grid. The synthesis gas may then be advanced to the microchannel reactor 200.

Figure 9:
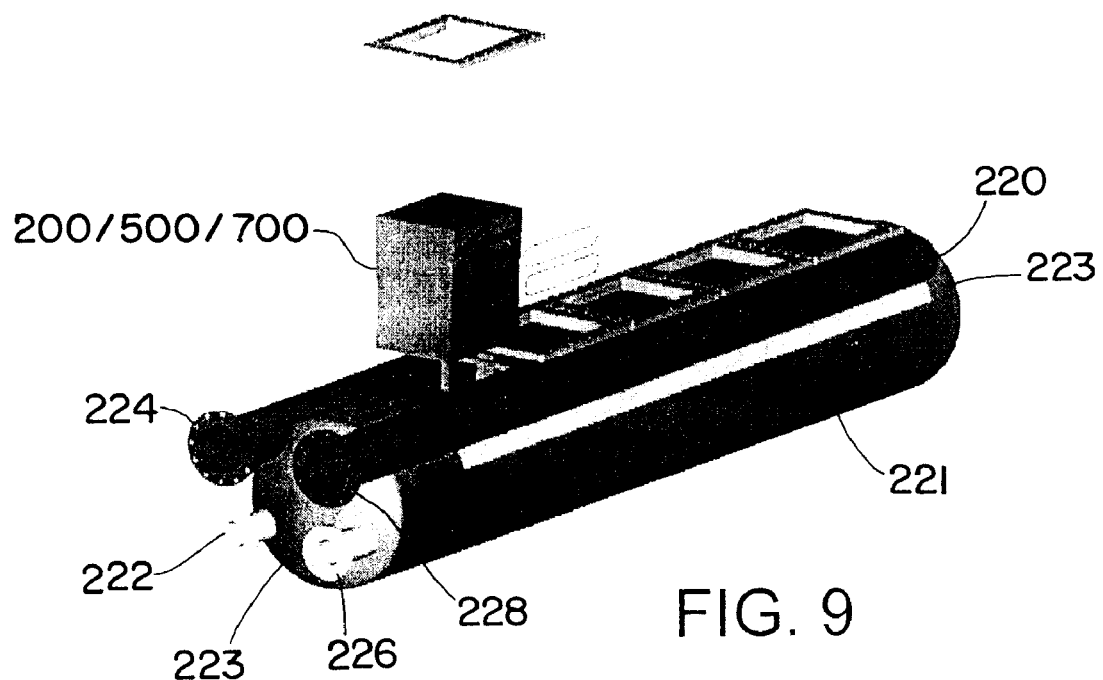
FIGS. 9 and 10 are schematic illustrations of a vessel used for housing a plurality of Fischer-Tropsch or alcohol-forming or microchannel reactors, or a plurality of SMR microchannel reactors, or a plurality of hydrocracking microchannel reactors.
Figure 10:
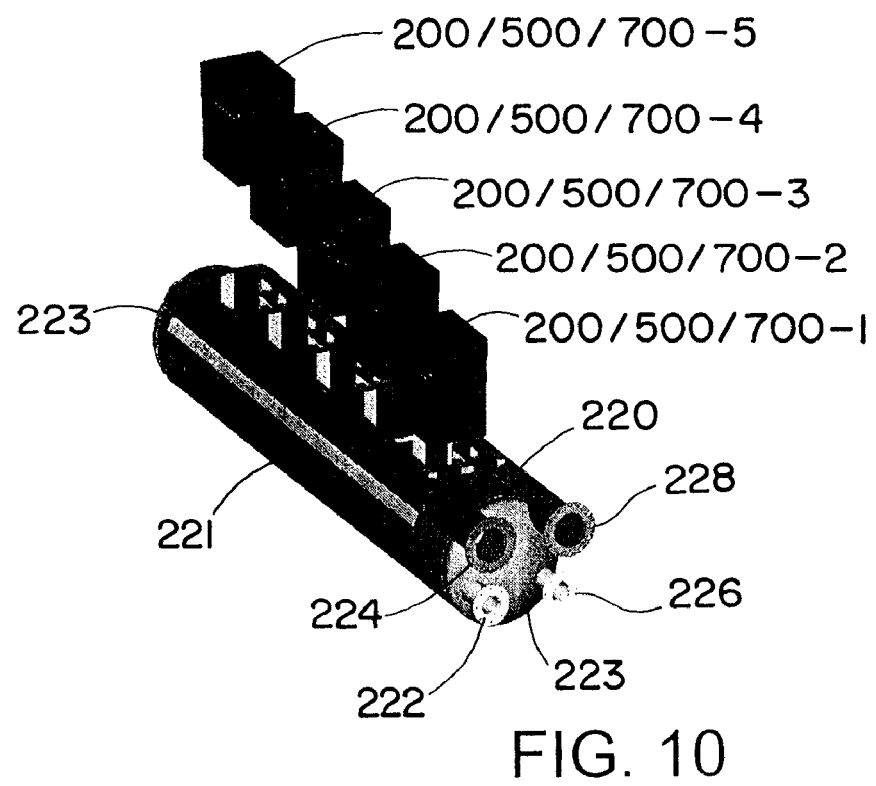

One or more of the Fischer-Tropsch (FT) or alcohol-forming microchannel reactors 200, or one or more of the SMR microchannel reactors 500, or one or more of the hydrocracking microchannel reactors 700 may be housed in vessel 220. Vessel 220 has the construction illustrated in FIGS. 9 and 10. Referring to FIGS. 9 and 10, the vessel 220 contains five Fischer-Tropsch or alcohol-forming microchannel reactors 200, or five SMR microchannel reactors 500, or five hydrocracking microchannel reactors 700. These are identified in the drawings as microchannel reactors 200/500/700. These are identified in FIG. 10 as Fischer-Tropsch or alcohol-forming microchannel reactors, SMR microchannel reactors, or hydrocracking microchannel reactors 200/500/700-1, 200/500/700-2, 200/500/700-3, 200/500/700-4 and 200/500/700-5. Although five microchannel reactors are disclosed in the drawings, it will be understood that any desired number of Fischer-Tropsch or alcohol-forming microchannel reactors, or SMR microchannel reactors, or hydrocracking microchannel reactors may be positioned in vessel 220. For example, the vessel 220 may contain from about 1 to about 1000 microchannel reactors 200, 500 or 700, and in one embodiment from 1 to about 750, and in one embodiment from 1 to about 500, and in one embodiment from 1 to about 250, and in one embodiment from 1 to about 100, and in one embodiment from about 1 to about 50, and in one embodiment from 1 to about 20 microchannel reactors 200, 500 or 700. The vessel 220 may be a pressurizable vessel. The vessel 220 includes inlets 224 and 228, and outlets 222 and 226.

When the vessel 220 is used with the Fischer-Tropsch or alcohol forming microchannel reactors 200, inlet 224 is connected to a manifold which is provided for flowing synthesis gas to Fischer-Tropsch or alcohol forming process microchannels in the microchannel reactors 200. The inlet 228 is connected to a manifold which is provided for flowing heat exchange fluid (e.g., steam) to heat exchange channels in the microchannel reactors 200. The outlet 222 is connected to a manifold which provides for the flow of product from the Fischer-Tropsch or alcohol forming process microchannels in the microchannel reactors 200. The outlet 226 is connected to a manifold to provide for the flow of the heat exchange fluid out of the heat exchange channels in the microchannel reactors 200.

When vessel 220 is used with the SMR microchannel reactors 500, the vessel 220 includes outlet 222 and inlets 224, 226 and 228. The inlet 224 is connected to a manifold which is provided for flowing the SMR feed (e.g., FT tail gas and steam) to the SMR process microchannels in the SMR microchannel reactors 500. The inlet 228 is connected to a manifold which is provided for flowing fuel (e.g., natural gas) to the combustion channels in the SMR microchannel reactors 500. The outlet 222 is connected to a manifold which provides for the flow of synthesis gas from the SMR microchannel reactors 500 out of the vessel 220. The inlet 226 is connected to a manifold to provide for the flow of the oxygen or source of oxygen (e.g., air) to staged addition channels in the SMR microchannel reactors 500. The vessel 220 also includes an outlet (not shown in the drawings) providing for the flow of exhaust gas from the SMR microchannel reactors 500.

When the vessel 220 is used with the hydrocracking microchannel reactors 700, inlet 224 is connected to a manifold which is provided for flowing the Fischer-Tropsch product from line 202 to hydrocracking process microchannels in the microchannel reactors 700. The vessel 220 also includes an inlet (not shown in the drawings) for flowing hydrogen through a manifold into the process microchannels of the microchannel reactor 700. The inlet 228 may be connected to a manifold which is provided for flowing heat exchange fluid to heat exchange channels in the microchannel reactors 700. The outlet 222 is connected to a manifold which provides for the flow of a hydrocracked Fischer-Tropsch product out of the process microchannels in the microchannel reactors 700. The outlet 226 may be connected to a manifold to provide for the flow of heat exchange fluid out of the heat exchange channels in the microchannel reactors 700. The hydrocracking reaction involving the Fischer-Tropsch product may be only slightly exothermic and, as such, the use of heat exchange channels in the microchannel reactor 700 may not be necessary and thus may be considered to be optional. The microchannel reactor 700 may be used advantageously, with or without the heat exchange channels, to hydrocrack the Fischer-Tropsch product due to the fact that when using the microchannel reactor 700, enhanced mass transfer between the hydrogen feed gas and the Fischer-Tropsch product may be achieved.

The vessel 220 may be constructed using any suitable material sufficient for operating under the pressures and temperatures required for operating the Fischer-Tropsch or alcohol-forming microchannel reactors 200, the SMR microchannel reactors 500, or the hydrocracking microchannel reactors 700. For example, the shell 221 and heads 223 of the vessel 220 may be constructed of cast steel. The flanges, couplings and pipes may be constructed of 316 stainless steel. The vessel 220 may have any desired diameter, for example, from about 10 to about 1000 cm, and in one embodiment from about 50 to about 300 cm. The axial length of the vessel 220 may be of any desired value, for example, from about 0.5 to about 50 meters, and in one embodiment from about 1 to about 20 meters.

The Fischer-Tropsch or alcohol-forming microchannel reactors 200 may comprise a plurality of Fischer-Tropsch or alcohol-forming process microchannels and heat exchange channels stacked one above the other or positioned side-by-side. The Fischer-Tropsch or alcohol-forming microchannel reactors 200 may be in the form of cubic blocks. Each of these cubic blocks may have a length, width and height, the length being in the range from about 10 to about 1000 cm, and in one embodiment in the range from about 20 to about 200 cm. The width may be in the range from about 10 to about 1000 cm, and in one embodiment in the range from about 20 to about 200 cm. The height may be in the range from about 10 to about 1000 cm, and in one embodiment in the range from about 20 to about 200 cm.

The microchannel reactors 200 as well as the vessels 220 may be sufficiently small and compact so as to be readily transportable. As such, these reactors and vessels along with the other equipment used in the inventive process may be readily transported to remote locations, such as military bases, and used to convert carbonaceous waste products such as solid waste, biomass, etc. to synthetic fuels such as automotive fuel, diesel fuel, aviation fuel, and the like.

The Fischer-Tropsch or alcohol-forming microchannel reactors 200 may each comprise a plurality of repeating units, each of which includes one or more Fischer-Tropsch or alcohol-forming process microchannels and one or more heat exchange channels. The repeating units that may be used include repeating units 230, 230A, 230B and 230C illustrated in FIGS. 11-14, respectively. The Fischer-Tropsch or alcohol-forming microchannel reactors 200 may comprise from about 1 to about 1000 of the repeating units 230, 230A, 230B or 230C, and in one embodiment from about 10 to about 500 of such repeating units. The catalyst used in the repeating units 230-230D may be in any form including the various catalyst structured forms described below.

Figure 11:
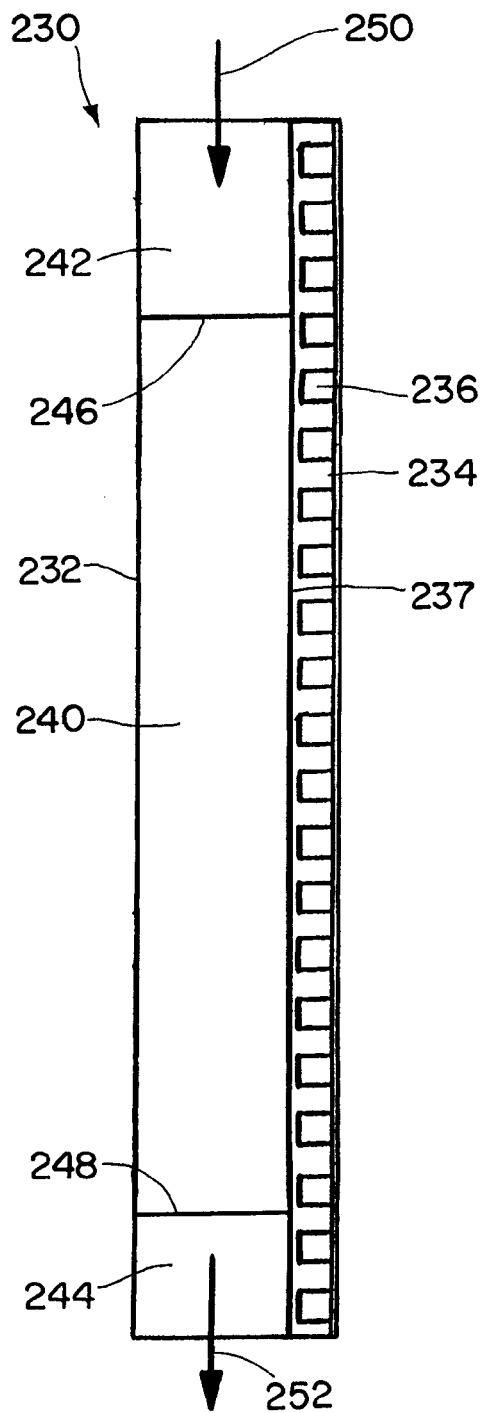
FIGS. 11-14 are schematic illustrations of repeating units that may be used in the Fischer-Tropsch or alcohol-forming microchannel reactors. Each of the repeating units illustrated in FIGS. 11-14 includes a Fischer-Tropsch or alcohol-forming process microchannel that contains a reaction zone containing a catalyst and adjacent heat exchange channels. Heat exchange fluid flowing in the heat exchange channels illustrated in FIG. 11 flows in a direction that is cross-current relative to the flow of process fluids in the Fischer-Tropsch or alcohol-forming process microchannel. Heat exchange fluid flowing in the heat exchange channel illustrated in FIG. 12 may flow in a direction that is co-current or counter-current to the flow of process fluid in the Fischer-Tropsch or alcohol-forming process microchannel. The heat exchange channels illustrated in FIGS. 13 and 14 provide for the flow of heat exchange fluid in a direction that is cross-current relative to the flow of process fluid in the Fischer-Tropsch or alcohol-forming process microchannels. The heat exchange channels illustrated in FIGS. 13 and 14 provide for heat exchange zones that cover only part of the length of the reaction zones in the Fischer-Tropsch or alcohol-forming process microchannels. Tailored heat exchange profiles may be provided with each of these embodiments by controlling the number of heat exchange channels in thermal contact with different sections of the process microchannels. With these tailored heat exchange profiles more cooling channels may be provided in some parts of the process microchannels as compared to other parts of the process microchannels. For example, more cooling channels may be provided at or near the entrances to the reaction zones as compared to downstream parts of the reaction zones. The heat exchange profile may be tailored by controlling the flow rate of heat exchange fluid in the heat exchange channels. For example, a relatively high rate of flow of heat exchange fluid in the heat exchange channels in thermal contact with the entrances to the reaction zones may be used in combination with relatively low rates of flow of heat exchange fluid in heat exchange channels in thermal contact with downstream sections of the reaction zones.

Repeating unit 230 is illustrated in FIG. 11. Referring to FIG. 11, Fischer-Tropsch or alcohol-forming process microchannel 232 is positioned adjacent to heat exchange layer 234 which contains heat exchange channels 236. The heat exchange channels 236 may be microchannels. A common wall 237 separates the process microchannel 232 from the heat exchange layer 234. A catalyst is positioned in reaction zone 240 of the process microchannel 232. In one embodiment, the length of heat exchange layer 234 is up to about 200% of the length of the reaction zone 240, and in one embodiment the length of heat exchange layer 234 is from about 50 to about 175% of the length of the reaction zone 240, and in one embodiment the length of the heat exchange layer 234 is from about 75 to about 150% of the length of the reaction zone 240. The reactant composition (i.e., synthesis gas) flows into the reaction zone 240 in process microchannel 232 in the direction indicated by arrow 250, contacts the catalyst in the reaction zone, and reacts to form the desired product. The product (i.e., one or more hydrocarbons or one or more alcohols) flows out of the process microchannel 232 as indicated by arrow 252. Heat exchange fluid flows through the heat exchange channels 236 in a direction that is cross-current to the flow of reactant composition and product in the process microchannel 232. The Fischer-Tropsch or alcohol-forming reactions conducted in the process microchannel 232 are exothermic and the heat exchange fluid provides cooling for the reaction.

Figure 12:
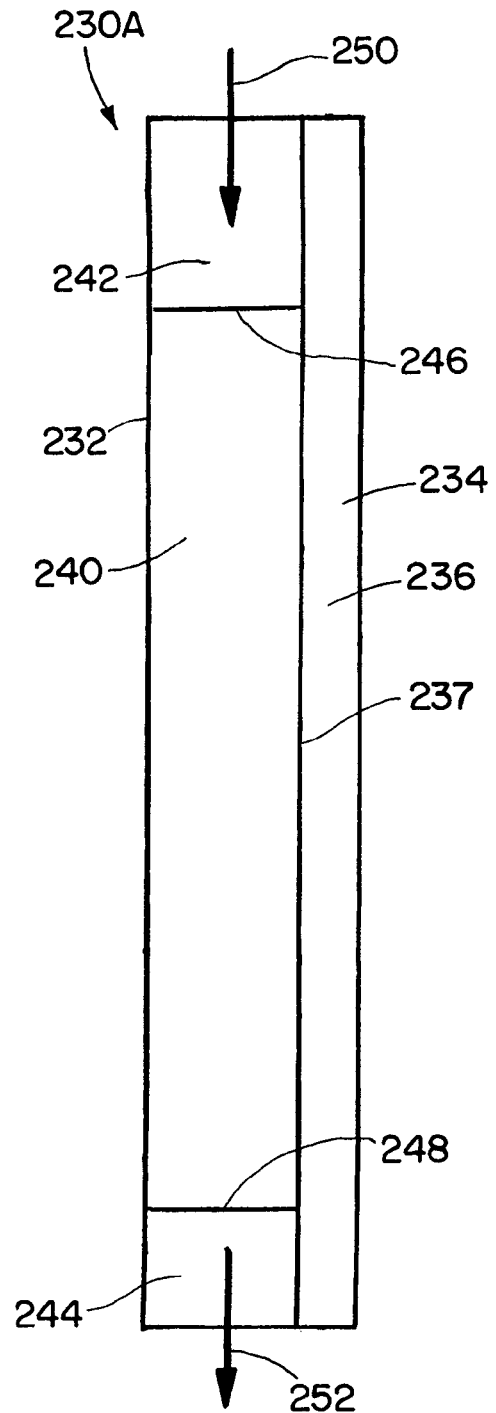

Alternatively, the process microchannels and heat exchange channels may be aligned as provided for in repeating unit 230A. Repeating unit 230A, which is illustrated in FIG. 12, is identical to the repeating unit 230 illustrated in FIG. 11 with the exception that the heat exchange channels 236 are rotated 90° and the heat exchange fluid flowing through the heat exchange channels 236 flows in a direction that may be countercurrent to the flow of reactant and product in the process microchannel 232 or cocurrent relative to the direction of reactant and product in the process microchannel 232.

Figure 13:
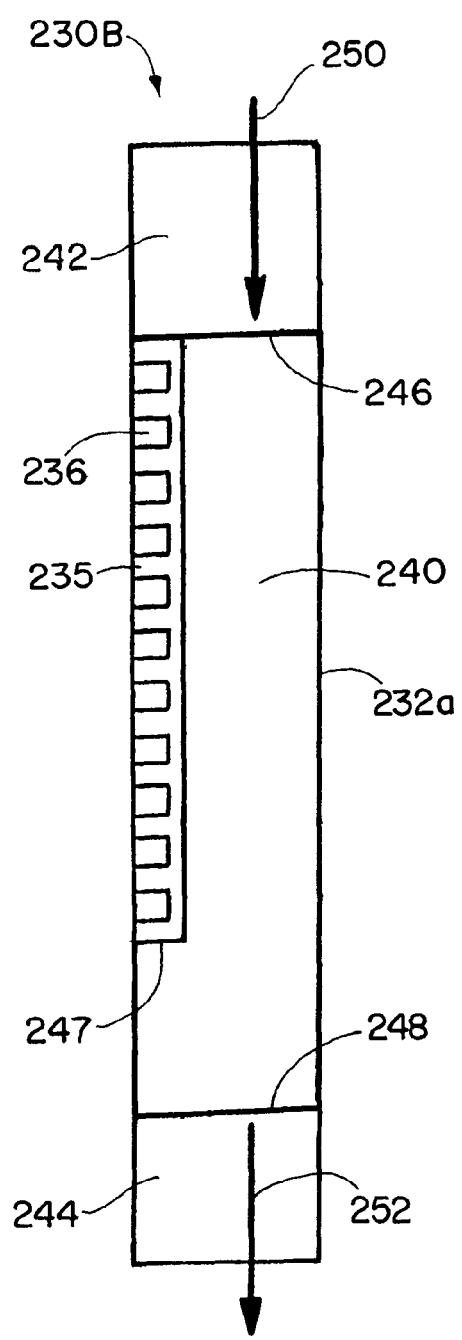

Alternatively, the process microchannels and heat exchange channels may be aligned as provided for in repeating unit 230B. Repeating unit 230B is illustrated in FIG. 13. Referring to FIG. 13, process microchannel 232a is positioned adjacent to heat exchange layer 235. Heat exchange layer 235 contains a plurality of heat exchange channels 236 aligned in parallel relative to one another, each heat exchange channel 236 extending lengthwise at a right angle relative to the lengthwise direction of the process microchannel 232a. Heat exchange layer 235 is shorter in length than process microchannel 232a. Heat exchange layer 235 extends lengthwise from or near the entrance 246 to the reaction zone 240 of process microchannel 232a to a point 247 along the length of the process microchannel 232a short of the outlet 248 of the reaction zone 240. In one embodiment, the length of heat exchange layer 235 is up to about 90% of the length of the reaction zone 240, and in one embodiment the length of heat exchange layer 235 is from about 5 to about 90% of the length of the reaction zone 240, and in one embodiment the length of the heat exchange layer 235 is from about 5 to about 50% of the length of the reaction zone 240, and in one embodiment the length of the heat exchange layer 235 is from about 50% to about 90% of the length of the reaction zone 240. The width of the process microchannel 232a is expanded or extended in the area downstream of the end 247 of the heat exchange layer 235.

Figure 14:
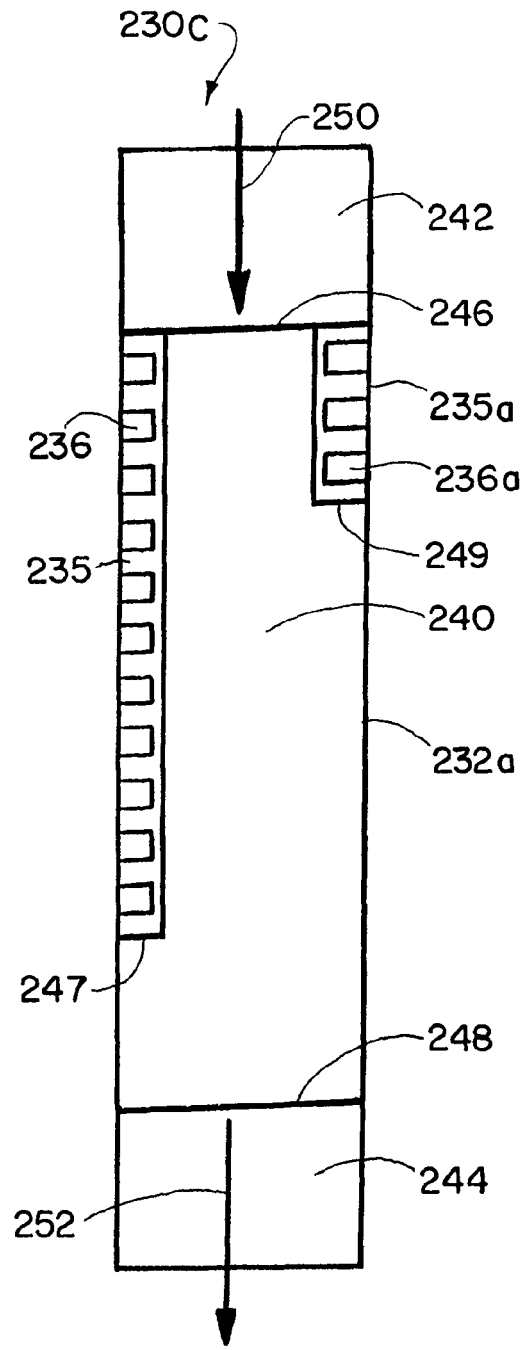

Alternatively, the process microchannels and heat exchange channels may be aligned as provided for in repeating unit 230C. Repeating unit 230C, which is illustrated in FIG. 14, is identical to the repeating unit 230B illustrated in FIG. 13 with the exception that repeating unit 230C includes heat exchange layer 235a adjacent to process microchannel 232a on the opposite side of the process microchannel 232a from the heat exchange layer 235. Heat exchange layer 235a contains a plurality of parallel heat exchange channels 236a which are the same as or similar in size and design to the heat exchange channels 236 discussed above. Heat exchange layer 235a extends lengthwise from or near the entrance 246 to the reaction zone 240 of process microchannel 232a to a point 249 along the length of process microchannel 232a short of the end 247 of heat exchange layer 235. The length of the heat exchange layer 235a may be up to about 90% of the length of the heat exchange layer 235, and in one embodiment the length of the heat exchange layer 235a may be from about 5 to about 90% of the length of the heat exchange layer 235, and in one embodiment the length of the heat exchange layer 235a may be from about 5 to about 50% of the length of the heat exchange layer 235, and in one embodiment the length of the heat exchange layer 235a may be from about 50% to about 90% of the length of the heat exchange layer 235. The width of the process microchannel 232a is expanded in the areas downstream of the ends 247 and 249 of the heat exchange layers 235 and 235a, respectively.

The process microchannels 232 and 232a may have cross sections having any shape, for example, square, rectangle, circle, semi-circle, etc. The internal height of each process microchannel 232 and 232a may be considered to be the smaller of the internal dimensions normal to the direction of flow of reactants and product through the process microchannel. Each of the process microchannels 232 and 232a may have an internal height of up to about 10 mm, and in one embodiment up to about 6 mm, and in one embodiment up to about 4 mm, and in one embodiment up to about 2 mm. In one embodiment, the height may be in the range of about 0.05 to about 10 mm, and in one embodiment about 0.05 to about 6 mm, and in one embodiment about 0.05 to about 4 mm, and in one embodiment about 0.05 to about 2 mm. The width of each process microchannel 232 and 232a may be considered to be the other internal dimension normal to direction of flow of reactants and product through the process microchannel. The width of each process microchannel 232 and 232a may be of any dimension, for example, up to about 3 meters, and in one embodiment about 0.01 to about 3 meters, and in one embodiment about 0.1 to about 3 meters. The length of each process microchannel 232 and 232a may be of any dimension, for example, up to about 10 meters, and in one embodiment about 0.2 to about 10 meters, and in one embodiment from about 0.2 to about 6 meters, and in one embodiment from 0.2 to about 3 meters.

The heat exchange channels 236 may be microchannels or they may have larger dimensions that would classify them as not being microchannels. Each of the heat exchange channels 236 may have a cross section having any shape, for example, a square, rectangle, circle, semi-circle, etc. The internal height of each heat exchange channel 236 may be considered to be the smaller of the internal dimensions normal to the direction of flow of heat exchange fluid in the heat exchange channels. Each of the heat exchange channels 236 may have an internal height of up to about 2 mm, and in one embodiment in the range of about 0.05 to about 2 mm, and in one embodiment about 0.05 to about 1.5 mm. The width of each of these channels, which would be the other internal dimension normal to the direction of flow of heat exchange fluid through the heat exchange channel, may be of any dimension, for example, up to about 3 meters, and in one embodiment from about 0.01 to about 3 meters, and in one embodiment about 0.1 to about 3 meters. The length of each of the heat exchange channels 236 may be of any dimension, for example, up to about 10 meters, and in one embodiment from about 0.2 to about 10 meters, and in one embodiment from about 0.2 to about 6 meters, and in one embodiment from 0.2 to about 3 meters.

The number of repeating units 230-230C in the microchannel reactor 200 may be an desired number, for example, one, two, three, four, six, eight, ten, hundreds, thousands, tens of thousands, hundreds of thousands, millions, etc.

In the design and operation of a Fischer-Tropsch or alcohol-forming microchannel reactor it may be advantageous to provide a tailored heat exchange profile along the length of the process microchannels in order to optimize the reaction. This may be accomplished by matching the local release of heat given off by the Fischer-Tropsch or alcohol-forming reaction conducted in the process microchannels with heat removal or cooling provided by heat exchange fluid in heat exchange channels in the microchannel reactor. The extent of the Fischer-Tropsch or alcohol-forming reaction and the consequent heat release provided by the reaction may be higher in the front or upstream sections of the reaction zones in the process microchannels as compared to the back or downstream sections of the reaction zones. Consequently, the matching cooling requirements may be higher in the upstream section of the reaction zones as compared to the downstream sections of the reaction zones. Tailored heat exchange may be accomplished by providing more heat exchange or cooling channels, and consequently the flow of more heat exchange or cooling fluid, in thermal contact with upstream sections of the reaction zones in the process microchannels as compared to the downstream sections of the reaction zones. This is shown in FIGS. 13 and 14 wherein the heat exchange layers 235 and 235a extend lengthwise from the entrance 246 to the reaction zone 240 along the length of the process microchannels 230B and 230C to points 247 and 249 short of the outlet 248 of the reaction zone 240. Alternatively or additionally, a tailored heat exchange profile may be provided by varying the flow rate of heat exchange fluid in the heat exchange channels. In areas where additional heat exchange or cooling is desired, the flow rate of the heat exchange fluid may be increased as compared to areas where less heat exchange or cooling is required. For example, a higher rate of flow of heat exchange fluid may be advantageous in the heat exchange channels in thermal contact with the upstream sections of the reaction zones in the process microchannels as compared to the heat exchange channels in thermal contact with the downstream sections of the reaction zones. Thus, in referring to FIG. 11, for example, a higher rate of flow in the heat exchange channels 236 near the inlet to the process microchannel 232 or reaction zone 240 may be used as compared to the heat exchange channels 236 near the outlet of the process microchannel 232 or reaction zone 240 where the flow rate may be less. Heat transfer from the process microchannels to the heat exchange channels may be designed for optimum performance by selecting optimum heat exchange channel dimensions and/or the rate of flow of heat exchange fluid per individual or groups of heat exchange channels. Additional design alternatives for tailoring heat exchange may relate to the selection and design of the Fischer-Tropsch or alcohol-forming catalyst (such as, particle size, catalyst formulation, packing density, use of a graded catalyst, or other chemical or physical characteristics) at specific locations within the process microchannels. These design alternatives may impact both heat release from the process microchannels as well as heat transfer to the heat exchange fluid. Temperature differentials between the process microchannels and the heat exchange channels, which may provide the driving force for heat transfer, may be constant or may vary along the length of the process microchannels.

The SMR microchannel reactors 500 may comprise a plurality of SMR process microchannels, combustion channels and staged addition channels stacked one above the other or positioned side-by-side. The SMR microchannel reactors 500 may be in the form of cubic blocks as illustrated in FIGS. 9 and 10. Each of these cubic blocks may have a length, width and height, the length being in the range from about 10 to about 1000 cm, and in one embodiment in the range from about 50 to about 200 cm. The width may be in the range from about 10 to about 1000 cm, and in one embodiment in the range from about 50 to about 200 cm. The height may be in the range from about 10 to about 1000 cm, and in one embodiment in the range from about 50 to about 200 cm.

The SMR microchannel reactors 500 may comprise a plurality of repeating units, each of which includes one or more SMR process microchannels, combustion channels and staged addition channels. The repeating units that may be used include repeating units 510, 510A, 510B, 510C and 510D illustrated in FIGS. 21-25, respectively. The SMR microchannel reactors 500 may comprise from about 1 to about 1000 of the repeating units 510, 510A, 510B, 510C or 510D, and in one embodiment from about 3 to about 750, and in one embodiment from about 5 to about 500, and in one embodiment from about 5 to about 250, and in one embodiment from about 10 to about 100 of such repeating units.

The repeating unit 510 illustrated in FIG. 21 includes SMR process microchannel 512 and heating section 520. Heating section 520 comprises combustion channel 530 and staged addition channels 540 and 540A. The process microchannel 510 is in the form of an upside down U and includes reaction zone 516 where an SMR catalyst (not shown in the drawing) is positioned. The SMR feed (e.g., FT tail gas in combination with steam) enters the SMR process microchannel 512 as indicated by arrow 514, flows through the SMR process microchannel, contacts the SMR catalyst in the reaction zone 516, undergoes a steam methane reforming reaction with the result being the formation of synthesis gas comprising CO and $H_2$. The synthesis gas flows out of the SMR process microchannel as indicated by arrow 518. The combustion channel 530 is an M-shaped combustion channel which includes reaction zones 534 wherein a combustion catalyst (not shown in the drawing) is positioned. The combustion channel 530 also includes apertured sections 538 in its sidewalls to permit oxygen or source of oxygen to flow from the staged addition channels 540 and 540A into the combustion channel 530. A fuel enters the combustion channel 530 as indicated by arrows 532 and flows into the reaction zones 534. The oxygen or source of oxygen enters the staged addition channels 540 and 540A as indicated by arrows 542 and 542A and flows through the apertured sections 538 and into the reaction zones 534 in the combustion channels 530. The fuel is mixed with the oxygen or source of oxygen, contacts the combustion catalyst, and undergoes a combustion reaction which generates heat and combustion exhaust. The combustion exhaust flows out of the combustion channel 530 as indicated by arrows 536.

The repeating unit 510A illustrated in FIG. 22 is the same as the repeating unit 510 with the exception that the SMR process microchannel 512 in repeating unit 510A is a straight-run, flow-through microchannel, rather than an upside down U-shaped microchannel.

The repeating unit 510B illustrated in FIG. 23 is the same as the repeating unit 510A with the exception that the repeating unit 510B includes two adjacent SMR process microchannels, namely, SMR process microchannels 512 and 512A. The SMR process microchannel 512 is adjacent to the combustion channel 530. The SMR process microchannel 512A is adjacent to the SMR process microchannel 512 and in thermal contact with the combustion channel 530.

The repeating unit 510C illustrated in FIG. 24 is the same as the repeating unit 510A illustrated in FIG. 22 with the exception that the combustion channel 530 illustrated in FIG. 24 is a straight run channel, rather than a M-shaped channel, and only one staged addition channel 540 is used.

The repeating unit 510D illustrated in FIG. 25 is the same as the repeating unit 510C illustrated in FIG. 24 with the exception that the SMR process microchannel 512 in repeating unit 510D is an upside down U-shaped microchannel, rather than a straight run microchannel.

The microchannel reactor 700 may comprise a plurality of hydrocracking process microchannels and heat exchange channels stacked one above the other. However, as indicated above, the heat exchange channels may not be necessary for the hydrocracking microchannel reactor 700, and thus the use of the heat exchange channels may be considered to be optional. The hydrocracking microchannel reactor 700 may be in the form of a cubic block as illustrated in FIGS. 9 and 10. The cubic block may have a length in the range from about 10 to about 1000 cm, and in one embodiment in the range from about 20 to about 200 cm. The cubic block may have a width in the range from about 10 to about 1000 cm, and in one embodiment in the range from about 20 to about 200 cm. The cubic block may have a height in the range from about 10 to about 1000 cm, and in one embodiment in the range from about 20 to about 200 cm. The Fischer-Tropsch product, or at least the liquid or heavy liquid portion of the Fischer-Tropsch product, and hydrogen may enter the hydrocracking process microchannels, and a hydrocracked product may flow out of the hydrocracking process microchannels. Heat exchange fluid, when used, may flow through the heat exchange channels. The microchannel reactor 700 may have a feed stream header or manifold to provide for the flow of the reactants into the process microchannels, a product footer or manifold to provide for the flow of product out of the process microchannels. When heat exchange channels are employed with the microchannel heat exchanger 700, a heat exchange inlet manifold may be used to provide for the flow of heat exchange fluid into the heat exchange channels, and a heat exchange outlet manifold may be used to provide for the flow of heat exchange fluid out of the heat exchange channels.

The hydrocracking microchannel reactor 700 may contain one or more repeating units. Each repeating unit may contain one or more process microchannels and, optionally, one or more heat exchange channels. Each of the process microchannels may contain one or more reaction zones wherein the reactants react to form the desired product. A catalyst in solid form may be present in the one or more reaction zones. The catalyst may comprise a homogeneous catalyst immobilized on a solid. In one embodiment, each process microchannel may be combined with one or more adjacent reactant stream channels to provide for the staged addition of hydrogen into the process microchannel. The process microchannel and the adjacent reactant stream channel may have a common wall with a plurality of openings in the common wall. These openings may be used to provide for the flow of hydrogen from the adjacent reactant stream channel into the process microchannel. The feed stream header may comprise one or more manifolds for distributing mixtures of the reactants to the process microchannels. Alternatively, the feed stream header may comprise separate manifolds for distributing the reactants separately to the process microchannels and to the adjacent reactant stream channels.

The heat exchange channels in the Fischer-Tropsch or alcohol-forming microchannel reactor 200, the combustion channels and staged addition channels in the SMR microchannel reactor 500, and the adjacent reactant stream channels and heat exchange channels, when used, in the hydrocracking microchannel reactor 700 may be microchannels or they may have dimensions that would characterize them as not being microchannels. For example, these channels may have internal heights or widths up to about 50 mm, and in one embodiment up to about 25 mm, and in one embodiment up to about 15 mm. The Fischer-Tropsch or alcohol-forming process microchannels, the SMR process microchannels, and the hydrocracking process microchannels are microchannels. Each of the microchannels may have a cross-section having any shape, for example, a square, rectangle, circle, semicircle, etc. Each microchannel may have an internal height of up to about 10 mm, and in one embodiment up to about 5 mm, and in one embodiment up to about 2 mm, and in one embodiment up to about 2 mm. The height of each of these microchannels may be in the range of about 0.05 to about 10 mm, and in one embodiment from about 0.05 to about 5 mm, and in one embodiment from about 0.05 to about 2 mm, and in one embodiment about 0.05 to about 1.5 mm. The width of each of these microchannels may be of any dimension, for example, up to about 3 meters, and in one embodiment from about 0.01 to about 3 meters, and in one embodiment about 0.1 to about 3 meters. The length of each microchannel may be of any dimension, for example, up to about 10 meters, and in one embodiment about 0.2 to about 10 meters, and in one embodiment from about 0.2 to about 6 meters, and in one embodiment from 0.2 to about 3 meters.

The Fischer-Tropsch or alcohol-forming process microchannels and heat exchange channels in the Fischer-Tropsch or alcohol-forming microchannel reactor 200, the SMR process microchannels, combustion channels and staged addition channels in the SMR microchannel reactor 500, and the hydrocracking process microchannels, adjacent reactant stream channels and heat exchange channels, when used, in the hydrocracking microchannel reactor 700, may have rectangular cross sections and be aligned in side-by-side vertically oriented planes or horizontally oriented stacked planes. These planes may be tilted at an inclined angle from the horizontal. These configurations may be referred to as parallel plate configurations. These channels may be arranged in modularized compact units for scale-up.

The Fischer-Tropsch or alcohol-forming microchannel reactor 200, the SMR microchannel reactor 500 and the hydrocracking microchannel 700 may be made of any material that provides sufficient strength, dimensional stability and heat transfer characteristics to permit operation of the desired process. These materials may include aluminum; titanium; nickel; platinum; rhodium; copper; chromium; alloys of any of the foregoing metals; brass; steel (e.g., stainless steel); quartz; silicon; or a combination of two or more thereof. Each microchannel reactor may be constructed of stainless steel with one or more copper or aluminum waveforms being used for forming the channels.

The Fischer-Tropsch or alcohol-forming microchannel reactor 200, the SMR microchannel reactor 500, and the hydrocracking microchannel 700 may be fabricated using known techniques including wire electrodischarge machining, conventional machining, laser cutting, photochemical machining, electrochemical machining, molding, water jet, stamping, etching (for example, chemical, photochemical or plasma etching) and combinations thereof.

The Fischer-Tropsch or alcohol-forming microchannel reactor 200, the SMR microchannel reactor 500 and the hydrocracking microchannel 700 may be constructed by forming shims with portions removed that allow flow passage. A stack of shims may be assembled via diffusion bonding, laser welding, diffusion brazing, and similar methods to form an integrated device. The microchannel reactors may be assembled using a combination of shims or laminae and partial sheets or strips. In this method, the channels or void areas may be formed by assembling strips or partial sheets to reduce the amount of material required.

The Fischer-Tropsch or alcohol-forming microchannel reactor 200, the SMR microchannel reactor 500 and the hydrocracking microchannel 700 may be constructed using waveforms in the form of right angled corrugated inserts. These right angled corrugated sheets may have rounded edges rather than sharp edges. These inserts may be sandwiched between opposing planar sheets or shims. In this manner the microchannels may be defined on three sides by the corrugated insert and on the fourth side by one of the planar sheets. The process microchannels as well as the heat exchange channels may be formed in this manner. Microchannel reactors made using waveforms are disclosed in WO 2008/030467, which is incorporated herein by reference.

The Fischer-Tropsch or alcohol-forming process microchannels, SMR process microchannels and/or combustion channels, and hydrocracking process microchannels may contain one or more surface features in the form of depressions in and/or projections from one or more interior walls of the process microchannels. Examples are shown in FIGS. 26 and 27. The heat exchange channels in the Fischer-Tropsch or alcohol-forming microchannel reactor 200 and, when used, in the hydrocracking microchannel reactor 700, as well as the adjacent reactant stream channels in the hydrocracking microchannel reactor 700, may also contain such surface features. The surface features may be used to disrupt the flow of fluid flowing in the channels. These disruptions in flow may enhance mixing and/or heat transfer. The surface features may be in the form of patterned surfaces. The Fischer-Tropsch or alcohol-forming, SMR and/or hydrocracking microchannel reactors may be made by laminating a plurality of shims together. One or both major surfaces of the shims may contain surface features. Alternatively, the Fischer-Tropsch or alcohol-forming, SMR and/or hydrocracking microchannel reactors may be assembled using some sheets or shims and some strips, or partial sheets to reduce the total amount of metal required to construct the device. A shim containing surface features may be paired (on opposite sides of a microchannel) with another shim containing surface features. Pairing may create better mixing or heat transfer enhancement as compared to channels with surface features on only one major surface. The patterning may comprise diagonal recesses that are disposed over substantially the entire width of a microchannel surface. The patterned surface feature area of a wall may occupy part of or the entire length of a microchannel surface. Surface features may be positioned over at least about 10%, and in one embodiment at least about 20%, and in one embodiment at least about 50%, and in one embodiment at least about 80% of the length of a channel surface. Each diagonal recesses may comprise one or more angles relative to the flow direction. Successive recessed surface features may comprise similar or alternate angles relative to other recessed surface features.

In embodiments wherein surface features may be positioned on or in more than one microchannel wall, the surface features on or in one wall may have the same (or similar) pattern as found on a second wall, but rotated about the centerline of the main channel mean bulk flow direction. In embodiments wherein surface features may be on or in opposite walls, the surface features on or in one wall may be approximately mirror images of the features on the opposite wall. In embodiments wherein surface features are on or in more than one wall, the surface features on or in one wall may be the same (or similar) pattern as found on a second wall, but rotated about an axis which is orthogonal to the main channel mean bulk flow direction. In other words, the surface features may be flipped 180 degrees relative to the main channel mean bulk flow direction and rotated about the centerline of the main channel mean bulk flow. The surface features on or in opposing or adjacent walls may or may not be aligned directly with one another, but may be repeated continuously along the wall for at least part of the length of the wall. Surface features may be positioned on three or more interior surfaces of a channel. For the case of channel geometries with three or fewer sides, such as triangular, oval, elliptical, circular, and the like, the surface features may cover from about 20% to about 100% of the perimeter of the microchannel.

A patterned surface may comprise multiple patterns stacked on top of each other. A pattern or array of holes may be placed adjacent to a heat transfer wall and a second pattern, such as a diagonal array of surface features may be stacked on top and adjacent to an open channel for flow. A sheet adjacent to an open gap may have patterning through the thickness of the sheet such that flow may pass through the sheet into an underlying pattern. Flow may occur as a result of advection or diffusion. As an example, a first sheet with an array of through holes may be placed over a heat transfer wall, and a second sheet with an array of diagonal through slots may be positioned on the first sheet. This may create more surface area for adhering a catalyst. The pattern may be repeated on at least one other wall of the process microchannel. The patterns may be offset on opposing walls. The innermost patterned surfaces (those surfaces bounding a flow channel) may contain a pattern such as a diagonal array. The diagonal arrays may be oriented both "with" the direction of flow or one side oriented with the direction of flow and the opposing side oriented "against" the direction of flow. By varying surface features on opposing walls, different flow fields and degrees of vorticity may be created in the fluid that travels down the center and open gap.

The surface features may be oriented at angles relative to the direction of flow through the channels. The surface features may be aligned at an angle from about 1° to about 89°, and in one embodiment from about 30° to about 75°, relative to the direction of flow. The angle of orientation may be an oblique angle. The angled surface features may be aligned toward the direction of flow or against the direction of flow. The flow of fluid in contact with the surface features may force some of the fluid into depressions in the surface features, while other fluids may flow above the surface features. Flow within the surface features may conform with the surface feature and be at an angle to the direction of the bulk flow in the channel. As fluid exits the surface features it may exert momentum in the x and y direction for an x,y,z coordinate system wherein the bulk flow is in the z direction. This may result in a churning or rotation in the flow of the fluids. This pattern may be helpful for mixing.

Two or more surface feature regions within the process microchannels may be placed in series such that mixing of the fluids may be accomplished using a first surface feature region, followed by at least one second surface feature region where a different flow pattern may be used.

The surface features may have two or more layers stacked on top of each other or intertwined in a three-dimensional pattern. The pattern in each discrete layer may be the same or different. Flow may rotate or advect in each layer or only in one layer. Sub-layers, which may not be adjacent to the bulk flow path of the channel, may be used to create additional surface area. The flow may rotate in the first level of surface features and diffuse molecularly into the second or more sublayers to promote reaction. Three-dimensional surface features may be made via metal casting, photochemical machining, laser cutting, etching, ablation, or other processes where varying patterns may be broken into discrete planes as if stacked on top of one another. Three-dimensional surface features may be provided adjacent to the bulk flow path within the microchannel where the surface features have different depths, shapes, and/or locations accompanied by sub-features with patterns of varying depths, shapes and/or locations.

An example of a three-dimensional surface feature structure may comprise recessed oblique angles or chevrons at the interface adjacent the bulk flow path of the microchannel. Beneath the chevrons there may be a series of three-dimensional structures that connect to the surface features adjacent to the bulk flow path but are made from structures of assorted shapes, depths, and/or locations. It may be further advantageous to provide sublayer passages that do not directly fall beneath an open surface feature that is adjacent to the bulk flow path within the microchannel but rather connect through one or more tortuous two-dimensional or three-dimensional passages. This approach may be advantageous for creating tailored residence time distributions in the microchannels, where it may be desirable to have a wider versus more narrow residence time distribution.

The length and width of a surface feature may be defined in the same way as the length and width of a channel. The depth may be the distance which the surface feature sinks into or rises above the microchannel surface. The depth of the surface features may correspond to the direction of stacking a stacked and bonded microchannel device with surface features formed on or in the sheet surfaces. The dimensions for the surface features may refer the maximum dimension of a surface feature; for example the depth of a rounded groove may refer to the maximum depth, that is, the depth at the bottom of the groove.

The surface features may have depths that are up to about 5 mm, and in one embodiment up to about 2 mm, and in one embodiment in the range from about 0.01 to about 5 mm, and in one embodiment in the range from about 0.01 to about 2 mm, and in one embodiment in the range from about 0.01 mm to about 1 mm. The width of the surface features may be sufficient to nearly span the microchannel width (for example, herringbone designs), but in one embodiment (such as fill features) may span about 60% or less of the width of the microchannel, and in one embodiment about 50% or less, and in one embodiment about 40% or less, and in one embodiment from about 0.1% to about 60% of the microchannel width, and in one embodiment from about 0.1% to about 50% of the microchannel width, and in one embodiment from about 0.1% to about 40% of the microchannel width. The width of the surface features may be in the range from about 0.05 mm to about 100 cm, and in one embodiment in the range from about 0.5 mm to about 5 cm, and in one embodiment in the range from about 1 to about 2 cm.

Multiple surface features or regions of surface features may be included within a channel, including surface features that recess at different depths into one or more microchannel walls. The spacing between recesses may be in the range from about 0.01 mm to about 10 mm, and in one embodiment in the range from about 0.1 to about 1 mm. The surface features may be present throughout the entire length of a microchannel or in portions or regions of the channel. The portion or region having surface features may be intermittent so as to promote a desired mixing or unit operation (for example, separation, cooling, etc.) in tailored zones. For example, a one-centimeter section of a channel may have a tightly spaced array of surface features, followed by four centimeters of a flat channel without surface features, followed by a two-centimeter section of loosely spaced surface features. The term "loosely spaced surface features" may be used to refer to surface features with a pitch or feature to feature distance that is more than about five times the width of the surface feature.

The surface features may be positioned in one or more surface feature regions that extend substantially over the entire axial length of a channel. In one embodiment, a channel may have surface features extending over about 50% or less of its axial length, and in one embodiment over about 20% or less of its axial length. In one embodiment, the surface features may extend over about 10% to about 100% of the axial length of the channel, and in one embodiment from about 20% to about 90%, and in one embodiment from about 30% to about 80%, and in one embodiment from about 40% to about 60% of the axial length of a channel.

Each surface feature leg may be at an oblique angle relative to the bulk flow direction. The feature span length or span may be defined as being normal to the feature orientation. As an example, one surface feature may be a diagonal depression at a 45 degree angle relative to a plane orthogonal to the mean direction of bulk flow in the main channel with a 0.38 mm opening or span or feature span length and a feature run length of 5.6 mm. The run length may be the distance from one end to the other end of the surface feature in the longest direction, whereas the span or feature span length may be in the shortest direction (that is not depth). The surface feature depth may be the distance way from the main channel. For surface features with a nonuniform width (span), the span may be the average span averaged over the run length.

A surface feature may comprise a recess or a protrusion based on the projected area at the base of the surface feature or the top of the surface feature. If the area at the top of the surface feature is the same or exceeds the area at the base of the surface feature, then the surface feature may be considered to be recessed. If the area at the base of the surface feature exceeds the area at the top of the surface feature, then it may be considered to be protruded. For this description, the surface features may be described as recessed although it is to be understood that by changing the aspect ratio of the surface feature it may be alternatively defined as a protrusion. For a process microchannel defined by walls that intersect only the tops of the surface features, especially for a flat channel, all surface features may be defined as recessed and it is to be understood that a similar channel could be created by protruding surface features from the base of a channel with a cross section that includes the base of the surface features.

The Fischer-Tropsch or alcohol-forming process microchannels, SMR process microchannels and/or combustion channels, and/or hydrocracking process microchannels may have at least about 20%, and in one embodiment at least about 35%, and in one embodiment at least about 50%, and in one embodiment at least about 70%, and in one embodiment at least about 90% of the interior surface of the channels (measured in cross-section perpendicular to length; i.e., perpendicular to the direction of net flow through the channel) that contains surface features. The surface features may cover a continuous stretch of at least about 1 cm, and in one embodiment at least about 5 cm. In the case of an enclosed channel, the percentage of surface feature coverage may be the portion of a cross-section covered with surface features as compared to an enclosed channel that extends uniformly from either the base or the top of the surface feature or a constant value in-between. The latter may be a flat channel. For example, if a channel has patterned top and bottom surfaces that are each 0.9 cm across (wide) and unpatterned side walls that are 0.1 cm high, then 90% of the surface of the channel would contain surface features.

The Fischer-Tropsch or alcohol-forming process microchannels, SMR process microchannels, and/or hydrocracking process microchannels may be enclosed on all sides, and in one embodiment the channels may have a generally square or rectangular cross-section (in the case of rectangular channel, surface feature patterning may be positioned on both major faces). For a generally square or rectangular channel, the channels may be enclosed on only two or three sides and only the two or three walled sides may be used in the above described calculation of percentage surface features. The surface features may be positioned on cylindrical channels with either constant or varying cross section in the axial direction.

Each of the surface feature patterns may be repeated along one face of the channel, with variable or regular spacing between the surface features in the channel bulk flow direction. Some embodiments may have only a single leg to each surface feature, while other embodiments may have multiple legs (two, three, or more). For a wide-width channel, multiple surface features or columns of repeated surface features may be placed adjacent to one another across the width of the channel. For each of the surface feature patterns, the feature depth, width, span, and spacing may be variable or constant as the pattern is repeated along the bulk flow direction in the main channel. Also, surface feature geometries having an apex connecting two legs at different angles may have alternate embodiments in which the surface feature legs may not be connected at the apex.

The Fischer-Tropsch catalyst may comprise any Fischer-Tropsch catalyst. The Fischer-Tropsch catalyst may comprise at least one catalytically active metal or oxide thereof. In one embodiment, the Fischer-Tropsch catalyst may further comprises a catalyst support. In one embodiment, the Fischer-Tropsch catalyst may further comprises at least one promoter. The catalytically active metal may comprise Co, Fe, Ni, Ru, Re, Os, or a combination of two or more thereof. The support material may comprise alumina, zirconia, silica, aluminum fluoride, fluorided alumina, bentonite, ceria, zinc oxide, silica-alumina, silicon carbide, a molecular sieve, or a combination of two or more thereof. The support material may comprise a refractory oxide. The promoter may comprise a Group IA, IIA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. Examples of catalysts that may be used include those disclosed in U.S. Pat. Nos. 4,585,798; 5,036,032; 5,733,839; 6,075,062; 6,136,868; 6,262,131 B1; 6,353,035B2; 6,368,997B2; 6,476,085B2; 6,451,864B1; 6,490,880B1; 6,537,945B2; 6,558,634B1; and U.S. Patent Publications 2002/0028853A1; 2002/0188031A1; and 2003/0105171A1; these patents and patent publications being incorporated herein by reference for their disclosures of Fischer-Tropsch catalysts and methods for preparing such catalysts.

The Fischer-Tropsch catalyst may comprise Co, and optionally a co-catalyst and/or promoter, supported on a support wherein the Co loading is at least about 5% by weight, and in one embodiment at least about 10% by weight, and in one embodiment at least about 15% by weight, and in one embodiment at least about 20% by weight, and in one embodiment at least about 25% by weight, and in one embodiment at least about 28% by weight, and in one embodiment at least about 30% by weight, and in one embodiment at least about 32% by weight, and in one embodiment at least about 35% by weight, and in one embodiment at least about 40% by weight. In one embodiment, the Co loading may be from about 5 to about 50% by weight, and in one embodiment about 10 to about 50% by weight, and in one embodiment about 15 to about 50% by weight, and in one embodiment about 20 to about 50% by weight, and in one embodiment about 25 to about 50% by weight, and in one embodiment about 28 to about 50% by weight, and in one embodiment about 30 to about 50% by weight, and in one embodiment about 32 to about 50% by weight. The metal dispersion for the catalytically active metal (i.e., Co, and optionally co-catalyst and/or promoter) of the catalyst may range from about 1 to about 30%, and in one embodiment about 2 to about 20%, and in one embodiment about 3 to about 20%. The co-catalyst may be Fe, Ni, Ru, Re, Os, or an oxide thereof, or a mixture of two or more thereof. The promoter may be a Group IA, IIA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. The co-catalyst may be employed at a concentration of up to about 10% by weight based on the total weight of the catalyst (i.e., the weight of catalyst, co-catalyst, promoter and support), and in one embodiment about 0.1 to about 5% by weight. The promoter may be employed at a concentration of up to about 10% by weight based on the total weight of the catalyst, and in one embodiment about 0.1 to about 5% by weight.

The Fischer-Tropsch catalyst may comprise Co supported by alumina; the loading of Co being at least about 25% by weight, and in one embodiment at least about 28% by weight, and in one embodiment at least about 30% by weight, and in one embodiment at least about 32% by weight; and the Co dispersion is at least about 3%, and in one embodiment at least about 5%, and in one embodiment at least about 7%.

The Fischer-Tropsch catalyst may comprise a composition represented by the formula

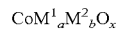

$$CoM^1_a M^2_b O_x$$

wherein: $M^1$ is Fe, Ni, Ru, Re, Os or a mixture thereof, and in one embodiment $M^1$ is Ru or Re or a mixture thereof; $M^2$ is Li, B, Na, K, Rb, Cs, Mg, Ca, Sr, Ba, Sc, Y, La, Ac, Ti, Zr, La, Ac, Ce or Th, or a mixture of two or more thereof; a is a number in the range of zero to about 0.5, and in one embodiment zero to about 0.2; b is a number in the range of zero to about 0.5, and in one embodiment zero to about 0.1; and x is the number of oxygens needed to fulfill the valency requirements of the elements present.

The Fischer-Tropsch catalyst may be made using multiple impregnation steps wherein intercalcination steps are conducted between each impregnation step. The use of such a procedure, at least in one embodiment, allows for the formation of catalysts with levels of loading of catalytic metal and optionally promoter that are higher than with procedures wherein such intercalcination steps are not employed. In one embodiment, a catalytic metal (e.g., Co) and optionally co-catalyst (e.g., Re or Ru) and/or promoter is loaded on a support (e.g., $Al_2O_3$) using the following sequence of steps: (A) impregnating the support with a composition comprising a catalytic metal and optionally a co-catalyst and/or promoter to provide an intermediate catalytic product; (B) calcining the intermediate catalytic product formed in step (A); (C) impregnating the calcined intermediate product formed in (B) with another composition comprising a catalytic metal and optionally a co-catalyst and/or promoter, to provide another intermediate catalytic product; and (D) calcining the another intermediate catalytic product formed in step (C) to provide the desired catalyst product. The catalytic metal and optional co-catalyst and/or promoter may be impregnated on the support using an incipient wetness impregnation process. Steps (C) and (D) may be repeated one or more additional times until the desired loading of catalytic metal, and optional co-catalyst and/or promoter, is achieved. The composition comprising the catalytic metal may be a nitrate solution of the metal, for example, a cobalt nitrate solution. The process may be continued until the catalytic metal (i.e., Co) achieves a loading level of about 20% by weight or more, and in one embodiment about 25% by weight or more, and in one embodiment about 28% by weight or more, and in one embodiment about 30% by weight or more, and in one embodiment about 32% by weight or more, and in one embodiment about 35% by weight or more, and in one embodiment about 37% by weight or more, and in one embodiment about 40% by weight or more. Each of the calcination steps may comprise heating the catalyst at a temperature in the range of about 100° C. to about 500° C., and in one embodiment about 100° C. to about 400° C., and in one embodiment about 250 to about 350° C. for about 0.5 to about 100 hours, and in one embodiment about 0.5 to about 24 hours, and in one embodiment about 2 to about 3 hours. The temperature may be ramped to the calcination temperature at a rate of about 1-20° C./min. The calcination steps may be preceded by drying steps wherein the catalyst is dried at a temperature of about 75 to about 200° C., and in one embodiment about 75° C. to about 150° C., for about 0.5 to about 100 hours, and in one embodiment about 0.5 to about 24 hours. In one embodiment, the catalyst may be dried for about 12 hours at about 90° C. and then at about 110-120° C. for about 1-1.5 hours, the temperature being ramped from 90° C. to 110-120° C. at a rate of about 0.5-1° C./min.

The Fischer-Tropsch catalyst may comprise a metal, metal oxide or mixed metal oxide. The metal may be cobalt, iron, ruthenium or a mixture of two or more thereof. The catalyst may comprise Co, or a carbide or oxide thereof. These catalysts may also comprise one or more alkali metals, alkaline earth metals, transition metals, rare earth metals, and/or lanthanides. This catalyst may be supported, and if so, useful support materials may include metal oxides, e.g., alumina, titania, zirconia, as well as silica, mesoporous materials, zeolites, refractory metals, or combinations of two or more thereof. The support may be modified through the addition of small quantities of one or more transition metal oxides. The catalyst may be any of the Fischer-Tropsch catalysts disclosed in WO 2008/104793 A2 which is incorporated herein by reference.

The Fischer-Tropsch catalyst may comprise cobalt in an amount of up to about 60% by weight, and in one embodiment from about 10% to about 60% by weight, and in one embodiment from about 20% to about 60% by weight, and in one embodiment from about 30% to about 60% by weight, and in one embodiment about 35% to about 60% by weight, and in one embodiment about 35% to about 50% by weight. These catalysts may comprise cobalt and a support.

The Fischer-Tropsch catalyst may comprise cobalt and a support. This catalyst may be activated using the process disclosed in U.S. Pat. No. 7,183,329 B2, which is incorporated herein by reference. This process comprises activating a catalyst precursor comprising a cobalt compound and a support with a gas comprising at least about 5 mol % of a hydrocarbon.

The term "catalyst" may be used herein to cover both the catalyst in active form and the catalyst in precursor form since it may undergo change in the reaction environment. The term "catalyst precursor" is to be construed widely, covering not only a freshly prepared catalyst precursor or a catalyst precursor which is unreduced or which has not been used in a reaction which it catalyzes, but also any precursor which can be used as a catalyst after activation, such as a catalyst which has already been used in a reaction which it catalyzes. Similarly the term "activation" is to be understood as not only including activating as unused or unreduced catalyst precursor but also activating a used or reduced catalyst. Therefore the term includes within its scope any activation, including regeneration of a used catalyst.

The Fischer-Tropsch catalyst may be prepared by activating a catalyst precursor with a hydrocarbon. The catalyst precursor may contain a cobalt compound and a support. The support may be any support which is capable of bearing the catalyst in the desired reaction. The support may be an inert support, or it may be an active support. Examples of supports that may be used include alumina, modified alumina, spinel oxides, silica, modified silica, magnesia, titania, zirconia, a zeolite, beta-aluminate and forms of carbon. The alumina or modified alumina may be, for example, alpha-alumina, beta-alumina or gamma-alumina. Beta-alumina and spinel oxides, such as barium hexaaluminate, may be advantageous due to their stability. The carbon may be in the form of active carbon or carbon nanotubes. A zeolite may be used. The support may contain pores or channels.

Any cobalt compound may be used with the catalyst precursor. The cobalt compound may be in the form of a salt, for example, an aqueous soluble salt, or an oxide. Examples of cobalt salts that may be used may include cobalt nitrate, acetate, benzoate, oxalate or acetylacetonate. It may be desirable to avoid the use of a cobalt halide since the halide may interfere with the support. An example of a cobalt oxide that may be used is $Co_3O_4$. One or more cobalt salts and/or oxides may be used.

The catalyst precursor may be formed using any known procedure. The catalyst precursor may be added to the support in solution using a solvent such as water or an organic solvent such as an alcohol. The alcohol may contain from 1 to about 4 carbon atoms. These may include methanol and ethanol. The solvent may be subsequently removed. The solvent may be removed by drying at room temperature or above room temperature, for example from about 50° C. to about 250° C., for about 1 to about 24 hours. A combination of drying steps may be used. The supported catalyst precursor may be dried at room temperature for about 2 to 10 about hours, and subsequently dried at an elevated temperature, for example from about 100° C. to about 200° C., and in one embodiment about 120° C., for about 2 to about 8 hours.

The solution comprising the catalyst precursor may further comprise additional components if desired. For example, it may also comprise a promoter or modifier. The promoters may include alkaline earth salts such as magnesium, calcium, barium and/or strontium nitrate. The promoters may also include the oxides of alkali metal, alkaline earth metal or transition metals which are derivable from their aqueous soluble compounds, such as their salts, for example $LiNO_3$, $KNO_3$, $RbNO_3$, $Ba(NO_3)_2$, $Mg(NO_3)_2$, $Ca(NO_3)_2$, $Sr(NO_3)_2$, $Zr(NO_3)_2 \cdot xH_2O$, $Ce(NO_3)_3 \cdot xH_2O$ and $UO(NO_3)_2$. The promoters may be loaded onto the support in any manner, for example by impregnation, especially sequential impregnation or co-impregnation with the cobalt compound.

The modifiers may include rare earth modifiers such as transition metal or rare earth salts or oxides, for example lanthanum and/or cerium nitrate or acetate, or oxides of the d-block transition metals such as Mn, W, Nb and Vn. The modifiers may be derived from their aqueous soluble compounds such as salts, and may be impregnated into the catalyst support, followed by calcination in air at a temperature in the range from about 300° C. to about 1000° C. for about 1 to about 24 hours in air. The promoters and modifiers may be used singly or in a combination of two or more thereof.

The supported catalyst precursor may be formed using a sol gel method. This method is described, for example, in Gonzalez et al, Catalysis Today, 35 (1997), 293-317 and J. Livage, Catalysis Today, 41 (1998), 3 19. For example, in an initial "pregelation" step, an alkoxide or alcohol and a metal precursor may be hydrolyzed and condensed to form a gel, for example, in the presence of water. A cobalt compound may then be added in a subsequent "post gelation" step, the gel may then be dried and calcined.

The supported catalyst precursor may comprise from about 0.05 to about 30 wt % cobalt, and in one embodiment from about 0.5 to about 15 wt % cobalt. The supported catalyst precursor may comprise from about 0.5 to about 50 wt % of a cobalt compound; from 0 to about 10 wt % promoter; and from 0 to about 20 wt % modifier, or from about 0.01 to about 5 wt % modifier; based on the total weight of the supported catalyst precursor. The supported catalyst precursor may comprise from about 5 to about 40 wt % of a cobalt compound, from 0 to about 3 wt % promoter, and from 0 to about 3 wt % modifier.

The supported catalyst precursor may be activated with a gas comprising a hydrocarbon. The hydrocarbon may be any hydrocarbon. It may be saturated or unsaturated, for example containing from 1, 2 or 3 or more double and/or triple bonds. It may be linear, cyclic or branched. The hydrocarbon may also be aliphatic or aryl, or contain both aliphatic and aryl groups. The hydrocarbon may be a saturated or unsaturated hydrocarbon containing up to about 5 carbon atoms, and in one embodiment up to about 4 carbon-atoms. The hydrocarbon may comprise methane, ethane, acetylene, propane, propene, butane, or a mixture of two or more thereof.

The activating gas may comprise at least about 5 mol % of the hydrocarbon, and in one embodiment at least about 10 mol %, and in one embodiment at least about 20 mol %, and in one embodiment at least about 40 mol %. The gas comprising the hydrocarbon may comprise only the hydrocarbon or it may further comprise up to about 10 mol %, and in one embodiment up to about 20 mol %, and in one embodiment up to about 40 mol % of an inert gas such as nitrogen and/or argon. It may also comprise a reactive component, such as another component which may also activate the catalyst precursor. For example, the gas may also comprise hydrogen. The gas may comprise methane and/or ethane in combination with hydrogen. If hydrogen is used, any ratio of hydrocarbon to hydrogen may be used, for example, the ratio may be in the range from about 0.04:1 or 0.05:1 to about 100:1 on a molar basis, or from about 0.1:1 or about 0.5:1 to about 10:1.

The activation may be carried out by placing the supported catalyst precursor in an atmosphere of the activating gas. The activating gas may be passed over the supported catalyst precursor. The activation temperature may be about 300° C. or higher, for example from about 400° C. to about 1000° C., or from about 400° C. to about 800° C. The duration of activation may be at least about 30 minutes, and in one embodiment at least about 1 hour, for example, from about 1 to about 20 hours, and in one embodiment from about 2 to about 5 hours. The activation temperature may vary depending on the nature of the catalyst precursor and/or the hydrocarbon. Atmospheric pressure may be used for the activation step, although a reduced or elevated pressure may also be used.

The catalyst precursor may be activated in the reaction vessel in which it is intended to carry out the reaction using the activated catalyst, or it may be activated in a different vessel. The activated catalyst may undergo substantial oxidation when exposed to air. In order to stabilize the catalyst it may be treated in an atmosphere containing a small amount of oxygen, for example about 1% oxygen in an inert gas such as nitrogen or argon. The catalyst may be left in the activation reactor while bleeding in a small amount of oxygen. Thus, for example, the activated catalyst may be pacified by treatment in a reduced oxygen atmosphere, for example comprising less than about 20 mol % oxygen, or less than about 10 mol % oxygen, or less than about 5 mol % oxygen, or less than about 2 mol % oxygen, for at least about 30 minutes, or at least about 1 hour.

The Fischer-Tropsch catalyst may be prepared using the process disclosed in U.S. Pat. No. 7,304,012 B2, which is incorporated herein by reference. This process involves preparing a supported catalyst or catalyst precursor containing carbon. The process may comprise the steps of: (a) preparing a liquid mixture of (i) at least one catalyst support or catalyst support precursor; (ii) at least one metal-containing compound, wherein the metal is selected from V, Cr, Mn, Fe, Co, Ni, Cu, Mo and W, and (iii) at least one polar organic compound which acts as a solvent for the metal-containing compound, the liquid mixture comprising from 0 to about 20 wt % of water based on the total weight of the mixture; (b) converting the mixture to a paste or solid residue; and (c) combusting the residue in an oxygen-containing atmosphere to at least partially convert the organic compound to carbon and to form the supported catalyst or catalyst precursor.

In step (a), a liquid mixture may be prepared from at least three components: (i) a catalyst support or a catalyst support precursor; (ii) one or more metal-containing compound(s) and (iii) one of more polar organic compound solvents which act as solvent(s) for the metal-containing compound(s), optionally together with water.

All three components may be mixed together simultaneously. The components may be mixed together at room or elevated temperature, for example, at about 20 to about 200° C., and in one embodiment from about 40 to about 80° C., and in one embodiment from about 40 to about 60° C.

In an alternative embodiment, two of the three components may be mixed together in a preliminary step, before the third component is added to complete the liquid mixture. Components (ii) and (iii) may be mixed together in a preliminary step. These two components may form a clear solution. Thereafter, component (i) may be added to complete the liquid mixture which may contain solid particles if component (i) is a solid support. The liquid mixture may be formed at elevated temperature, for example, from about 20 to about 200° C., and in one embodiment from about 30 to about 80° C.

Component (i) may be a catalyst support or catalyst support precursor. A catalyst support may be in the form of one or more solid particles. The catalyst support precursor may initially be in liquid form or in the form of a solution. The support precursor may form a solid catalyst support in situ, for example, once the catalyst support precursor has been added to the liquid mixture. The catalyst support precursor may form a catalyst support in the conversion step (b) or combustion step (c).

The catalyst support may be an inert support or an active support. Examples of supports that may be used may include solid oxides, carbides, zeolites, carbon and boronitride. These may include alumina, modified alumina, spinel oxides, silica, modified silica, magnesia, titania, zirconia, a molecular sieve, a zeolite, beta-aluminate and forms of carbon. The alumina or modified alumina may be, for example, alpha-alumina, beta-alumina or gamma-alumina. Beta-alumina and spinel oxides such as barium hexaaluminate may be particularly useful. The carbon may be in the form of active carbon or carbon nanotubes. A zeolite may be used. The support may comprise pores or channels. The zeolites may include zeolites A, X, Y, ZSMs, MCMs or $AIPO_4$.

The catalyst support precursors may be derived from $Al(NO_3)_3.9H_2O$ or $Mg(NO_3)_2$. Catalyst precursors that may be used are described in further detail in the above-mentioned Gonzales et al, Catalysis Today, 35 (1997), 293-317, and J. Livage, Catalysis Today, 41 (1998), 3-19.

The catalyst support may be derived from a nitrate of, for example, a Group IIA or Group IIIA metal. For example, aluminium or magnesium nitrate may be used. The nitrate may be in a hydrated form. Examples may include $Al(NO_3)_3.9H_2O$ and $Mg(NO_3)_2.6H_2O$. In step (a), the nitrate may be mixed with an organic compound, such as urea and/or ammonium citrate, to form a clear solution. Water may optionally be added. To complete the liquid mixture, a metal-containing compound, such as cobalt nitrate, may be included in the mixture. During one of the subsequent conversion and combustion steps, a supported catalyst or supported catalyst precursor may be formed.

The catalyst may be porous. The particle size may be from about 0.1 μm to about 20 mm, or from about 0.2 μm to about 5 mm. The surface area may be greater than about 5 $m^2/g$, or greater than about 10 $m^2/g$, or greater than about 50 $m^2/g$, or greater than about 200 $m^2/g$. One or a mixture of two or more catalyst supports may be used.

Component (ii) of the liquid mixture may comprise one or more metal-containing compounds. The catalytically active component of the catalyst may be derived from this metal-containing compound. The metal in the metal containing compound may comprise V, Cr, Mn, Fe, Co, Ni, Cu, Mo, W, or a mixture of two or more thereof. It is also possible to incorporate a further metal, for example to act as a promoter or modifier such as, for example, at least one of Zr, U, Ti, Th, Hf, Ce, La, Y, Mg, Ca, Sr, Cs, Rb, Mo, W, Cr, Mg, rare earth metals, noble metals, or a mixture of two or more thereof. For example, the metal-containing compound may comprise at least one of V, Cr, Mn, Fe, Co, Ni, Cu, Mo or W and at least one metal selected from the lanthanide, actinide and transition metal series of the Periodic Table. The additional metal may be an f-block or d-block metal.

The additional metal may be one or more metals selected from noble metals such as Pd, Pt, Rh, Ru, Ir, Au, Ag and Os, and transition metal elements such as Ti, V, Cr, Mn, Fe, Co, Ni, Cu, Zn, Zr, Nb, Mo, Tc, Cd, Hf, Ta, W, Re, Hg, Tl and the 4f-block lanthanides such as La, Ce, Pr, Nd, Pm, Sm, Eu, Gd, Tb, Dy, Ho, Er, Tm, Yb and Lu. Of these metals, Pd, Pt, Ru, Ni, Co, Fe, Cu, Mn, Mo and W may be particularly useful.

The metal-containing compound may contain other elements. The metal-containing compound is in the form of a salt. Examples of the metal-containing salts may include nitrates, citrates, halides, alkoxides, phenoxides, acetates, benzoates, oxalates and acetylacetonates Component (iii) of the liquid mixture may be a polar organic compound. The organic compound may function as a solvent for component (ii) and may act as a solvent for compound (i). The organic compound may be any polar organic compound that is capable of undergoing combustion in the presence of an oxygen-containing atmosphere such as air. During combustion the organic compound may be converted to carbon which may be present either as elemental carbon or as a carbide, for example a carbide of the metal of the metal-containing compound (ii). Some or all of the organic compound may be converted to carbon, and it is also possible for some of the organic compound to be completely combusted such that the carbon is converted to carbon monoxide or carbon dioxide and is removed from the catalyst or catalyst precursor as a gas. The organic compound may be a compound that does not produce an ash, in particular an oxide ash, after the combustion step. The organic compound may be one that does not contain elements that have a tendency to form residues such as oxides after combustion. These elements may include, for example, metals, phosphorus and/or silicon.

Examples of the organic compounds that may be used include organic amines, organic carboxylic acids and salts thereof such as ammonium salts, alcohols, ammonium salts of phenoxides and alkoxides, amino acids and surfactants. The alcohols may be those containing from 1 to about 30 carbon atoms, or from 1 to about 15 carbon atoms. Examples of the alcohols that may be used may include methanol, ethanol and glycol. The carboxylic acid may be citric acid or oxalic acid. Other organic compounds may be compounds containing functional groups such as one or more hydroxyl, amine, amide, carboxylic acid, ester, aldehyde, ketone, imine or imide groups. These may include urea, hydroamines, trimethylamine, triethylamine, tetra methylamine chloride and tetraethylamine chloride. The organic compounds may include EDTA, urea and/or ammonium citrate The organic compound may be in the form of a liquid at room temperature or at the temperature at which the mixture is prepared. The organic compound may be heated before it is added to the mixture. The organic compound may also be in the form of a solid at room temperature or at the temperature at which the mixture is prepared, in which case the mixture may be heated after it is prepared to melt the organic compound and then dissolve the metal compound. Mixtures of organic compounds may be used. Water may also be added, for example to assist the dissolution of the metal compound(s).

When water is employed in the liquid mixture, the amount of water may need to be controlled. For example, certain catalyst support precursors, such as $Fe(NO_3)_3.9H_2O$ and $Al(NO_3)_3.9H_2O$ may have a tendency to form gels on coming into contact with effective amounts of water. Thus, the amount of water employed in step (a) should be kept to a minimum, to avoid the formation of a hydrolyzed gel. The amount of water may be sufficient to partially hydrolyze the catalyst precursor, but not sufficient to convert the catalyst precursor into a polymer. Typically up to about 20 wt % water may be used with respect to the total weight of the mixture.

Water may be added separately or may, for example, be present in one of the components added as water of crystallization or water of coordination.

The mixture may also comprise other components. These may include promoters and/or modifiers. The promoters may include alkaline earth salts such as magnesium, calcium, barium and/or strontium nitrate. The modifiers may include rare earth modifiers such as rare earth salts, for example lanthanum and/or cerium nitrate or acetate, or oxides of the d-block transition metals. Oxides of phosphorus, boron, gallium, germanium, arsenic and antimony may be used. The promoters and modifiers may be used singly or in a combination of two or more.

The mixture prepared in step (a) may be a liquid mixture. The term "liquid mixture" refers to the fact that the mixture is in the form of a homogeneous liquid, although it may comprise solid particles. For example, after the homogeneous liquid mixture of the organic compounds, optionally water, and metal compounds, has been formed, insoluble particles of the inert support may be added. For instance, if a catalyst support rather than a catalyst support precursor is present, the liquid may comprise solid support particles. The metal-containing compound should be able to contact the support or support precursor, and this may be achieved by the use of a liquid mixture.

The weight ratio of component (i):(ii):(iii) employed in step (a) may be about 0.1-80:1-90:1-99, or about 0.5-60:2-80:10-90. The weight ratios may be varied depending on the intended use of the final catalyst. The amount of organic compound may be determined by the atomic ratio of carbon in the organic compound to metal (C:M) in the dissolved metal containing compound. The atomic ratio may be at least 0.4:1, or about 1 to about 20:1.

After the liquid mixture is formed, it may be converted to a paste or solid residue in step (b). This may be achieved by heating the mixture. This heating step may be in addition to any heating required to melt the organic compound, although if previous heating is required that heating may simply be continued in step (b). The heating may transform the liquid mixture into a solid, for example by evaporating or decomposing the organic solvent. Any water that may be present in the liquid mixture may be evaporated. The temperature to which the mixture is heated may be any temperature above room temperature, for example from about 50° C. to about 250° C., and may be carried out for any time until a solid residue is formed, for example for about 1 to about 24 hours. A combination of drying steps may be used. The mixture may initially be dried at room temperature for from about 2 to about 10 hours, and subsequently dried at an elevated temperature, for example from about 100° C. to about 200° C., or about 120° C.

In step (c) the mixture may be combusted. The combustion step may be carried out in air. Alternatively, pure oxygen or oxygen in an inert atmosphere of, for example, nitrogen or another inert gas may be employed. This combustion step may be separate from the heating in step (b), or the two steps may be combined, for example by simply continuing to heat the mixture after the solvent has been removed.

The combustion temperature may be from about 200° C. to about 1000° C., or from about 400° C. to about 600° C. The combustion step may be performed for any period of time, for example, about 60 minutes or less, or about 30 minutes or less, or about 15 minutes or less, or from about 5 to about 15 minutes. The combustion step may convert the polar organic compound into carbon and volatiles. While not wishing to be bound by theory, it is believed that the combustion step may completely or partially change the metal-containing compound into a metal and/or one or more oxides, oxycarbides or carbide forms, or mixtures of two or more thereof. The combustion step may also convert the promoter and/or modifier to oxide forms if they are present.

The preparation of the Fischer-Tropsch catalyst may proceed by first mixing the metal containing compound(s) and polar organic compound(s). This mixture may be viscous and addition to a solid catalyst support may coat the external surface of the support, with only a limited penetration of "internal" surfaces such as pores. After the combustion step, a so-called "egg-shell" catalyst in which all or substantially all of the catalyst may be present on the surface of the support may be obtained. This process may provide a better and more even distribution of the catalyst on the surface of the support than when only water is used as the solvent.

The preparation of the Fischer-Tropsch catalyst may also proceed by first mixing the metal containing compound(s) with the organic compound(s) and then adding a soluble support. After combustion, the metal catalyst may be distributed on both the "external" and "internal" surfaces of the support. This process may provide a more homogeneous distribution of the catalyst throughout the support than with previously known catalysts.

The Fischer-Tropsch catalyst or catalyst precursor may be distributed in any desired way on the "external" surface or in the "internal" surfaces of the support. It may be distributed substantially throughout the support or only on the external surface of the support. The distribution of the active catalyst component or precursor thereof may be controlled.

The Fischer-Tropsch catalyst or catalyst precursor may contain carbon in all of its possible forms. For example it may be present as elemental carbon or in the form of a metal carbide or oxycarbide. The carbon content may be up to about 8 wt % based on the total weight of the catalyst precursor or catalyst, or from about 0.01 to about 8 wt %, or from about 0.01 to about 2 wt %.

The Fischer-Tropsch supported catalyst or catalyst precursor may comprise from about 0.5 to about 50 wt % catalyst or catalyst precursor, from 0 to about 10 wt % promoter and from 0 to about 5 wt % modifier, based on the total weight of the supported catalyst or catalyst precursor. The supported catalyst or catalyst precursor may comprise from about 5 to about 40 wt % catalyst or catalyst precursor, from 0 to about 3 wt % promoter, and from 0 to about 3 wt % modifier.

The Fischer-Tropsch supported catalyst precursor may be activated with hydrogen or hydrocarbon gas or vapor. The solvent may be removed by heating, such that the organic compound may be deposited in the pores of the catalyst support. The catalyst support may then be mixed with the metal-containing compound. Alternatively, the catalyst support may be kneaded with the metal-containing compound. This process may produce a supported catalyst or catalyst precursor in which the catalyst or catalyst precursor may be predominantly situated on the external surfaces of the porous particles.

The alcohol forming catalyst may comprise any catalyst suitable for converting synthesis gas to one or more alcohols. The alcohol-forming catalyst may comprise a catalyst metal of Nb, Ta, Mo, W, Tc, Re or a mixture of two or more thereof, in free form or combined form. The catalyst metal may be combined with a cocatalyst metal of yttrium, a lanthanide series metal, an actinide series metal, or a combination of two or more thereof, in free form or combined form. The alcohol forming catalyst may comprise RhAg, CuCo, CuThO$_x$ and/or CoMoS. The term "in free or combined form" means the metal component of interest may be present as a metal, alloy, compound, adduct or combination thereof. Representative compounds include hydroxides, oxides, sulfides, sulfates, halides, carbides, cyanides, nitrides, nitrates, phosphates, borides, silicides, silicates, oxyhalides, carboxylates such as acetates and acetylacetates, oxalates, carbonates, carbonyls, hydrides, metal-bridged and cluster compounds, compounds where the metal is part of an anionic or cationic species, and the like. The adducts are chemical addition products. Molecules of polar or electron-donating solvent, former solvent or ligands such as ammonia, aliphatic or aromatic amines, imines, amino alcohols, carboxylic acids, amino acids, di- and trialkyl- and triarylphosphines, -arsines and stibines and their oxides, thiols, amino thiols, and the like, may add to the catalyst metals with or without displacement. These catalysts are described in U.S. Pat. No. 4,762,858, which is incorporated herein by reference.

The alcohol forming catalyst may comprise a copper-based or copper-modified methanol synthesis catalyst, a copper/cobalt based or copper/cobalt modified Fischer-Tropsch catalyst, a precious metal (e.g., Rh) based catalyst, or a Mo or $MoS_2$ based catalyst. These catalysts are described in U.S. Pat. Nos. 4,122,110; 4,298,354; 4,492,773; and 4,882,360; and in Subramani et al., "A Review of Recent Literature to Search for Efficient Catalytic Process for the Conversion of Syngas to Ethanol," Energy & Fuels XXXX, xxxx, 000-000 (2007); which are incorporated herein by reference.

The alcohol forming catalyst may be used in combination with a dehydration catalyst to provide a synthesis gas to unsaturated hydrocarbon route. Examples of the dehydration catalyst that may be used include acidic oxides such as alumina, silica-alumina, zeolite, and silico-alumino-phosphate synthetic molecular sieves. These are disclosed in U.S. 2006/0020155A1 and US 2007/0244000A1, which are incorporated herein by reference. The alcohol forming catalyst and the dehydration catalyst may be mixed or combined together in the same reaction zone. Alternatively, the dehydration catalyst may be positioned downstream of the alcohol forming catalyst, either in the same microchannel reactor or in a separate microchannel reactor.

The SMR catalyst may comprise any SMR catalyst. The SMR catalyst may comprise La, Pt, Fe, Ni, Ru, Rh, In, Ir, W, and/or an oxide thereof, or a mixture of two or more thereof. In one embodiment, the SMR catalyst may further comprise MgO, $Al_2O_3$, $SiO_2$, $TiO_2$, or a mixture of two or more thereof. In one embodiment, the SMR catalyst may comprise 13.8%-Rh/6%-MgO/$Al_2O_3$ on a metal felt of FeCrAlY alloy prepared using wash coating of the FeCrAlY felt with a thickness of about 0.25 mm and about 90% porosity. In one embodiment, the SMR catalyst may be derived from an aqueous solution of $La(NO_3)_3 \cdot 6H_2O$. In one embodiment, the SMR catalyst may be derived from a solution of $Pt(NH_3)_4(NO_3)_2$. On one embodiment, the SMR catalyst may be derived from solutions of $La(NO_3)$ and $Rh(NO_3)$ which are deposited on one or more layers of $Al_2O_3$.

The combustion catalyst may comprise Pd, Pr, Pt, Rh, Ni, Cu, and/or an oxide thereof, or a mixture of two or more thereof. In one embodiment, the combustion catalyst may further comprise $Al_2O_3$, $SiO_2$, MgO, or a mixture of two or more thereof. In one embodiment, the combustion catalyst may be derived from a solution of $Pd(NO_3)_2$ which is deposited on a layer of $Al_2O_3$. In one embodiment, the combustion catalyst may comprise a layer of Pr and Pd using precursors in the form of nitrates, and a layer of Pt using a solution of Pt $(NH_3)_4(NO_3)_2$.

The hydrocracking catalyst may comprise any hydrocracking catalyst. These catalysts may include zeolite catalysts including beta zeolite, omega zeolite, L-zeolite, ZSM-5 zeolites and Y-type zeolites. The hydrocracking catalyst may comprise one or more pillared clays, MCM-41, MCM-48, HMS, or a combination of two or more thereof. The hydrocracking catalyst may comprise Pt, Pd, Ni, Co, Mo, W, or a combination of two or more thereof. The hydrocracking catalyst may include a refractory inorganic oxide such as alumina, magnesia, silica, titania, zirconia and silica-alumina. The hydrocracking catalyst may comprise a hydrogenation component. Examples of suitable hydrogenation components include metals of Group IVB and Group VIII of the Periodic Table and compounds of such metals. Molybdenum, tungsten, chromium, iron, cobalt, nickel, platinum, palladium, iridium, osmium, rhodium and ruthenium may be used as the hydrogenation component. These catalysts are described in U.S. Pat. No. 6,312,586 B1, which is incorporated herein by reference.

The Fischer-Tropsch, alcohol-forming, SMR, combustion and/or hydrocracking catalyst may be positioned in a single reaction zone or they may be positioned in more than one reaction zone in the process microchannels or combustion channel. The same or different catalyst may be used in each reaction zone. The catalyst may be a graded catalyst. In each reaction zone the length of one or more heat exchange zone(s) adjacent to or in thermal contact with the reaction zone may vary in their dimensions. For example, in one embodiment, the length of the one or more of these heat exchange zones may be less than about 50% of the length of each reaction zone. Alternatively, the one or more heat exchange zones may have lengths that are more than about 50% of the length of each reaction zone up to about 100% of the length of each reaction zone.

The Fischer-Tropsch, alcohol-forming, SMR, combustion and/or hydrocracking catalyst may have any size and geometric configuration that fits within the process microchannels. The catalyst may be in the form of particulate solids (e.g., pellets, powder, fibers, and the like) having a median particle diameter of about 1 to about 1000 µm (microns), and in one embodiment about 10 to about 500 µm, and in one embodiment about 25 to about 300 µm, and in one embodiment about 80 to about 300 µm. In one embodiment, the catalyst is in the form of a fixed bed of particulate solids.

The Fischer-Tropsch or alcohol-forming catalyst, SMR catalyst, combustion and/or hydrocracking catalyst may be in the form of a fixed bed of particulate solids (as shown in FIG. 15). The median particle diameter of the particulate solids may be small, and the length of each process microchannel may be relatively short. The median particle diameter may be in the range of about 1 to about 1000 µm, and in one embodiment about 10 to about 500 µm, and the length of each process microchannel may be in the range of up to about 500 cm, and in one embodiment about 10 to about 500 cm, and in one embodiment about 50 to about 300 cm.

Referring to FIG. 15, the catalyst 261, which is in the form of a bed of particulate solids, is contained in process microchannel 260. Reactants enter the fixed bed as indicated by arrow 262, undergo reaction, and product flows out of the fixed bed as indicated by arrow 263.

The Fischer-Tropsch catalyst, alcohol-forming catalyst, SMR catalyst, combustion catalyst and/or hydrocracking catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The catalyst may be supported on a honeycomb structure. The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow.

An example of a flow-by structure is illustrated in FIG. 16. In FIG. 16, the catalyst 266 is contained within process microchannel 265. An open passage way 267 permits the flow of fluid through the process microchannel 265 as indicated by arrows 268 and 269. The reactants contact the catalyst and undergo reaction to form product.

The Fischer-Tropsch catalyst, alcohol-forming catalyst, SMR catalyst, combustion catalyst, and/or hydrocracking catalyst may be supported on a flow-through support structure such as a foam, wad, pellet, powder, or gauze. An example of a flow-through structure is illustrated in FIG. 17. In FIG. 17, the flow-through catalyst 271 is contained within process microchannel 270, the reactants flow through the catalyst 271 as indicated by arrows 272 and 273, and undergo reaction to form the product.

The support structure for a flow-through catalyst may be formed from a material comprising silica gel, foamed copper, sintered stainless steel fiber, steel wool, alumina, or a combination of two or more thereof. In one embodiment, the support structure may be made of a heat conducting material, such as a metal, to enhance the transfer of heat to or from the catalyst.

The Fischer-Tropsch catalyst, alcohol-forming catalyst, SMR catalyst, combustion catalyst, and/or hydrocracking catalyst may be directly washcoated on the interior walls of the process microchannels or combustion channels, grown on the channel walls from solution, or coated on a fin structure. The catalyst may be in the form of a single piece of porous contiguous material, or many pieces in physical contact. In one embodiment, the catalyst may comprise a contiguous material and have a contiguous porosity such that molecules can diffuse through the catalyst. In this embodiment, the fluids flow through the catalyst rather than around it. The cross-sectional area of the catalyst may occupy from about 1 to about 99%, and in one embodiment about 10 to about 95% of the cross-sectional area of the process microchannels and/or combustion channels. The catalyst may have a surface area, as measured by BET, of greater than about 0.5 $m^2/g$, and in one embodiment greater than about 2 $m^2/g$.

The Fischer-Tropsch catalyst, alcohol-forming catalyst, SMR catalyst, combustion catalyst, and/or hydrocracking catalyst may comprise a porous support, an interfacial layer on the porous support, and a catalyst material on the interfacial layer. The interfacial layer may be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes. The porous support may have a porosity of at least about 5% as measured by mercury porosimetry and an average pore size (sum of pore diameters divided by number of pores) of about 1 to about 1000 microns. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may comprise $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 µm, and in one embodiment about 0.05 to about 5 µm.

In one embodiment adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may comprise a metal oxide. Examples of metal oxides that may be used include $\alpha$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. The interfacial layer may be used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 µm, and in one embodiment from about 1 to about 50 microns. The interfacial layer may be either crystalline or amorphous. The interfacial layer may have a BET surface area of at least about 1 $m^2/g$.

The Fischer-Tropsch catalyst, alcohol-forming catalyst, SMR catalyst, combustion catalyst, and/or hydrocracking catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i.e., interfacial layer) surface, in crevices in the support layer, and in open pores in the support layer.

The Fischer-Tropsch catalyst, alcohol-forming catalyst, SMR catalyst, combustion catalyst, and/or hydrocracking catalyst may be supported on an assembly of one or more fins positioned within the process microchannels. Examples are illustrated in FIGS. 18-20. Referring to FIG. 18, fin assembly 280 includes fins 281 which are mounted on fin support 283 which overlies base wall 284 of process microchannel 285. The fins 281 project from the fin support 283 into the interior of the process microchannel 285. The fins 281 may extend to and contact the interior surface of upper wall 286 of process microchannel 285. Fin channels 287 between the fins 281 provide passage ways for reactant and product to flow through the process microchannel 285 parallel to its length. Each of the fins 281 has an exterior surface on each of its sides. The exterior surface provides a support base for the catalyst. The reactants may flow through the fin channels 287, contact the catalyst supported on the exterior surface of the fins 281, and react to form product. The fin assembly 280a illustrated in FIG. 19 is similar to the fin assembly 280 illustrated in FIG. 18 except that the fins 281a do not extend all the way to the interior surface of the upper wall 286 of the microchannel 285. The fin assembly 280b illustrated in FIG. 20 is similar to the fin assembly 280 illustrated in FIG. 18 except that the fins 281b in the fin assembly 280b have cross sectional shapes in the form of trapezoids. Each of the fins may have a height ranging from about 0.02 mm up to the height of the process microchannel 285, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 285, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 285 may range from about 1 to about 50 fins per centimeter of width of the process microchannel 285, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 18 or 19, or a trapezoid as illustrated in FIG. 20. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); aluminum; titanium; nickel; platinum; rhodium; copper; chromium; alloys of any of the foregoing metals; monel; inconel; brass; polymers (e.g., thermoset resins); ceramics; glass; quartz; silicon; or a combination of two or more thereof. The fin assembly may be made of an $Al_2O_3$ or a $Cr_2O_3$ forming material. The fin assembly may be made of an alloy comprising Fe, Cr, Al and Y, or an alloy comprising Ni, Cr and Fe.

The Fischer-Tropsch catalyst, alcohol-forming catalyst, SMR catalyst, combustion catalyst, and/or hydrocracking catalyst may be in the form of a bed of particulates which may be graded in composition or graded with a thermally conductive inert material. The thermally conductive inert material may be interspersed with the active catalyst. Examples of thermally conductive inert materials that may be used include diamond powder, silicon carbide, aluminum, alumina, copper, graphite, and the like. The catalyst bed fraction may range from about 100% by weight active catalyst to less than about 50% by weight active catalyst. The catalyst bed fraction may range from about 10% to about 90% by weight active catalyst, and in one embodiment from about 25% to about 75% by weight. In an alternate embodiment the thermally conductive inert material may be deployed at the center of the catalyst or within the catalyst particles. The active catalyst may be deposited on the outside, inside or intermittent within a composite structure that includes the thermally conductive inert. The resultant catalyst composite structure may have an effective thermal conductivity when placed in a process microchannel or combustion channel that is at least about 0.3 W/m/K, and in one embodiment at least about 1 W/m/K, and in one embodiment at least about 2 W/m/K.

The Fischer-Tropsch catalyst, alcohol-forming catalyst, SMR catalyst, combustion catalyst, and/or hydrocracking catalyst bed may be graded only locally within the process microchannels or combustion channels. For example, a process microchannel may contain a catalyst bed with a first reaction zone and a second reaction zone. The top or bottom (or front or back) of the catalyst bed may be graded in composition whereby a more or less active catalyst is employed in all or part of the first or second reaction zone. The composition that is reduced in one reaction zone may generate less heat per unit volume and thus reduce the hot spot and potential for the production of undesirable by-products, such as methane in a Fischer-Tropsch reaction. The catalyst may be graded with an inert material in the first and/or second reaction zone, in full or in part. The first reaction zone may contain a first composition of catalyst or inert material, while the second reaction zone may contain a second composition of catalyst or inert material.

Different particle sizes may be used in different axial regions of the process microchannels or combustion channels to provide for graded catalyst beds. For example, very small particles may be used in a first reaction zone while larger particles may be used in a second reaction zone. The average particle diameters may be less than half the height or gap of the process microchannels. The very small particles may be less than one-fourth of the process microchannel height or gap. Larger particles may cause lower pressure drops per unit length of the process microchannels and may also reduce the catalyst effectiveness. The effective thermal conductivity of a catalyst bed may be lower for larger size particles. Smaller particles may be used in regions where improved heat transfer is sought throughout the catalyst bed or alternatively larger particles may be used to reduce the local rate of heat generation.

Relatively short contact times, high selectivity to the desired product and relatively low rates of deactivation of the catalyst may be achieved by limiting the diffusion path required for the catalyst. This may be achieved when the catalyst is in the form of a thin layer on an engineered support such as a metallic foam or on the wall of the process microchannel. This may allow for increased space velocities. The thin layer of catalyst may be produced using chemical vapor deposition. This thin layer may have a thickness in the range up to about 1 micron, and in one embodiment in the range from about 0.1 to about 1 micron, and in one embodiment in the range from about 0.1 to about 0.5 micron, and in one embodiment about 0.25 micron. These thin layers may reduce the time the reactants are within the active catalyst structure by reducing the diffusional path. This may decrease the time the reactants spend in the active portion of the catalyst. The result may be increased selectivity to the product and reduced unwanted by-products. An advantage of this mode of catalyst deployment may be that, unlike conventional catalysts in which the active portion of the catalyst may be bound up in an inert low thermal conductivity binder, the active catalyst film may be in intimate contact with either an engineered structure or a wall of the process microchannel. This may leverage high heat transfer rates attainable in the microchannel reactor and allow for close control of temperature. This may result in the ability to operate at increased temperature (faster kinetics) without promoting the formation of undesired by-products, thus producing higher productivity and yield and prolonging catalyst life.

The configuration of the SMR microchannel reactor 500, hydrocracking microchannel reactor 700 and/or Fischer-Tropsch or alcohol-forming microchannel reactor 200 may be tailored to match the reaction kinetics. Near the entrance or top of a first reaction zone of a process microchannel, the microchannel height or gap may be smaller than in a second reaction zone near the exit or bottom of the process microchannel. Alternatively, the reaction zones may be smaller than half the process microchannel length. For example, a first process microchannel height or gap may be used for the first 25%, 50%, 75%, or 90% of the length of the process microchannel for a first reaction zone, while a larger second height or gap may be used in a second reaction zone downstream from the first reaction zone. This configuration may be suitable for conducting Fischer-Tropsch or alcohol-forming reactions. Other gradations in the process microchannel height or gap may be used. For example, a first height or gap may be used near the entrance of the microchannel to provide a first reaction zone, a second height or gap downstream from the first reaction zone may be used to provide a second reaction zone, and a third height or gap may be used to provide a third reaction zone near the exit of the microchannel. The first and third heights or gaps may be the same or different. The first and third heights or gaps may be larger or smaller than the second height or gap. The third height or gap may be smaller or larger than the second height or gap. The second height or gap may be larger or smaller than the third height or gap.

The Fischer-Tropsch catalyst, alcohol-forming catalyst, SMR catalyst, combustion catalyst, and/or hydrocracking catalyst may be regenerated by flowing a regenerating fluid through the channels in contact with the catalyst. The regenerating fluid may comprise hydrogen or a diluted hydrogen stream. The diluent may comprise nitrogen, argon, helium, methane, carbon dioxide, steam, or a mixture of two or more thereof. The temperature of the regenerating fluid may be from about 50 to about 400° C., and in one embodiment about 200 to about 350° C. The pressure within the channels during this regeneration step may range from about 1 to about 40 atmospheres, and in one embodiment about 1 to about 20 atmospheres, and in one embodiment about 1 to about 5 atmospheres. The residence time for the regenerating fluid in the channels may range from about 0.01 to about 1000 seconds, and in one embodiment about 0.1 second to about 100 seconds.

When the catalyst is a Fischer-Tropsch catalyst, it may be regenerated by increasing the molar ratio of $H_2$ to CO in the reactant composition to at least about 2.5:1, and in one embodiment at least about 3:1, and flowing the resulting adjusted feed composition through the process microchannels in contact with the catalyst at a temperature in the range from about 150° C. to about 300° C., and in one embodiment in the range from about 180° C. to about 250° C., for a period of time in the range from about 0.1 to about 100 hours, and in one embodiment in the range from about 0.5 to about 20 hours, to provide the regenerated catalyst. The feed composition may be adjusted by interrupting the flow of all feed gases except hydrogen and flowing the hydrogen through the process microchannels in contact with the catalyst. The flow of $H_2$ may be increased to provide for the same contact time used for the reactant composition comprising $H_2$ and CO. The adjusted feed composition may comprise $H_2$ and is characterized by the absence of CO. Once the catalyst is regenerated, the Fischer-Tropsch process may be continued by contacting the regenerated catalyst with the original reactant composition comprising $H_2$ and CO.

The Fischer-Tropsch or alcohol-forming process microchannels, SMR process microchannels, combustion channels, and/or hydrocracking process microchannels may be characterized by having bulk flow paths. The term "bulk flow path" refers to an open path (contiguous bulk flow region) within the process microchannels or combustion channel. A contiguous bulk flow region allows rapid fluid flow through the channels without large pressure drops. In one embodiment, the flow of fluid in the bulk flow region is laminar. Bulk flow regions within each process microchannel or combustion channel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels or combustion channel.

The contact time of the reactants with the Fischer-Tropsch or alcohol-forming catalyst, SMR catalyst and/or combustion catalyst may range up to about 2000 milliseconds (ms), and in the range from about 10 to about 2000 ms, and in one embodiment from about 10 ms to about 1000 ms, and in one embodiment about 20 ms to about 500 ms. In one embodiment, the contact time may range up to about 300 ms, and in one embodiment from about 20 to about 300 ms, and in one embodiment from about 50 to about 150 ms, and in one embodiment about 75 to about 125 ms, and in one embodiment about 100 ms. In one embodiment, the contact time may be up to about 100 ms, and in one embodiment from about 10 to about 100 ms.

The space velocity (or gas hourly space velocity (GHSV)) for the flow of fluid in the Fischer-Tropsch or alcohol-forming process microchannels, SMR process microchannels and/or combustion channels may be at least about 1000 $hr^{-1}$ (normal liters of feed/hour/liter of volume within the process microchannels) or at least about 800 ml feed/(g catalyst) (hr). The space velocity may range from about 1000 to about 1,000,000 $hr^{-1}$, or from about 800 to about 800,000 ml feed/(g catalyst) (hr). In one embodiment, the space velocity may range from about 10,000 to about 100,000 $hr^{-1}$, or about 8,000 to about 80,000 ml feed/(g catalyst) (hr).

The liquid hourly space velocity (LHSV) for the flow of fluid in the hydrocracking microchannel reactor may be in the range from about 0.1 to about 100 hr$^{-1}$ (volume of feed/hr/volume of catalyst), and in one embodiment from about 1 to about 100 hr$^{-1}$, and in one embodiment from about 5 to about 100 hr$^{-1}$, and in one embodiment from about 10 to about 100 hr$^{-1}$, and in one embodiment from about 1 to about 50 hr$^{-1}$, and in one embodiment from about 5 to about 50 hr$^{-1}$.

The pressure within the Fischer-Tropsch or alcohol-forming process microchannels, SMR process microchannels and/or hydrocracking process microchannels may be up to about 100 atmospheres, and in one embodiment in the range from about 1 to about 100 atmospheres, and in one embodiment from about 1 to about 75 atmospheres, and in one embodiment from about 2 to about 40 atmospheres, and in one embodiment from about 2 to about 10 atmospheres, and in one embodiment from about 10 to about 50 atmospheres, and in one embodiment from about 20 to about 30 atmospheres.

The pressure drop of fluids as they flow in the Fischer-Tropsch or alcohol-forming process microchannels, SMR process microchannels, combustion channels, and/or hydrocracking process microchannels may range up to about 10 atmospheres per meter of length of channel (atm/m), and in one embodiment up to about 5 atm/m, and in one embodiment up to about 3 atm/m.

The Reynolds Number for the flow of fluid in the Fischer-Tropsch or alcohol-forming process microchannels, SMR process microchannels, combustion channels, and/or hydrocracking process microchannels may be in the range of about 10 to about 4000, and in one embodiment about 100 to about 2000.

The average temperature in the Fischer-Tropsch process microchannels may be in the range from about 150 to about 300° C., and in one embodiment in the range from about 200 to about 300° C.

The average temperature in the alcohol-forming process microchannels may be in the range from about 200 to about 500° C., and in one embodiment in the range from about 200 to about 350° C.

The average temperature in the SMR microchannels may be in the range from about 100 to about 400° C., and in one embodiment in the range from about 150 to about 350° C.

The average temperature in the hydrocracking process microchannels may be in the range from about 100° C. to about 700° C., and in one embodiment from about 250° C. to about 500° C., and in one embodiment from about 350° C. to about 450° C., and in one embodiment from about 370° C. to about 400° C.

The heat exchange fluid entering the heat exchange channels of the Fischer-Tropsch or alcohol-forming microchannel reactor 200 and, optionally, hydrocracking microchannel reactor 700 may be at a temperature of about 100° C. to about 400° C., and in one embodiment about 200° C. to about 300° C. The heat exchange fluid exiting the heat exchange channels may be at a temperature in the range of about 150° C. to about 450° C., and in one embodiment about 200° C. to about 350° C. The residence time of the heat exchange fluid in the heat exchange channels may range from about 1 to about 2000 ms, and in one embodiment about 10 to about 500 ms. The pressure drop for the heat exchange fluid as it flows through the heat exchange channels may range up to about 10 atm/m, and in one embodiment from about 1 to about 10 atm/m, and in one embodiment from about 2 to about 5 atm/m. The heat exchange fluid may be in the form of a vapor, a liquid, or a mixture of vapor and liquid. The Reynolds Number for the flow of the heat exchange fluid in heat exchange channels may be from about 10 to about 4000, and in one embodiment about 100 to about 2000.

The heat exchange fluid used in the heat exchange channels in the Fischer-Tropsch or alcohol-forming microchannel reactor 200 and, optionally, hydrocracking microchannel reactor 700 may be any heat exchange fluid suitable for cooling a Fischer-Tropsch exothermic reaction. These may include air, steam, liquid water, gaseous nitrogen, other gases including inert gases, carbon monoxide, oils such as mineral oil, and heat exchange fluids such as Dowtherm A and Therminol which are available from Dow-Union Carbide.

The heat exchange channels used in the Fischer-Tropsch or alcohol-forming microchannel reactor 200 and, optionally, in the hydrocracking microchannel reactor 700 may comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range from about 200° C. to about 300° C. is an example of an endothermic process that may be used. The incorporation of a simultaneous endothermic reaction to provide an improved heat sink may enable a typical heat flux of roughly an order of magnitude above the convective cooling heat flux.

The heat exchange fluid may undergo a partial or full phase change as it flows in the heat exchange channels of the Fischer-Tropsch or alcohol-forming microchannel reactor 200 and, optionally, in the hydrocracking microchannel reactor 700. This phase change may provide additional heat removal from the process microchannels beyond that provided by convective cooling. For a liquid heat exchange fluid being vaporized, the additional heat being transferred from the Fischer-Tropsch process microchannels and, optionally, from the hydrocracking process microchannels may result from the latent heat of vaporization required by the heat exchange fluid. In one embodiment, about 50% by weight of the heat exchange fluid may be vaporized, and in one embodiment about 35% by weight may be vaporized, and in one embodiment about 20% by weight may be vaporized, and in one embodiment about 10% by weight may be vaporized. In one embodiment, from about 10% to about 50% by weight may be vaporized.

The heat flux for heat exchange in the Fischer-Tropsch or alcohol-forming microchannel reactor 200, the SMR microchannel reactor 500, and/or hydrocracking microchannel reactor 700 may be in the range from about 0.01 to about 500 watts per square centimeter of surface area of the one or more heat transfer walls of the process microchannels (W/cm$^2$) in the microchannel reactor, and in one embodiment in the range from about 0.1 to about 250 W/cm$^2$, and in one embodiment from about 1 to about 125 W/cm$^2$. The heat flux for convective heat exchange in the microchannel reactor may be in the range from about 0.01 to about 250 W/cm$^2$, and in one embodiment in the range from about 0.1 to about 50 W/cm$^2$, and in one embodiment from about 1 to about 25 W/cm$^2$, and in one embodiment from about 1 to about 10 W/cm$^2$. The heat flux for phase change and/or an exothermic or endothermic reaction of the heat exchange fluid may be in the range from about 0.01 to about 500 W/cm$^2$, and in one embodiment from about 1 to about 250 W/cm$^2$, and in one embodiment, from about 1 to about 100 W/cm$^2$, and in one embodiment from about 1 to about 50 W/cm$^2$, and in one embodiment from about 1 to about 25 W/cm$^2$, and in one embodiment from about 1 to about 10 W/cm$^2$.

The control of heat exchange during the Fischer-Tropsch or alcohol-forming reaction processes, SMR process, and/or optionally the hydrocracking process may be advantageous for controlling selectivity towards the desired product due to the fact that such added cooling and/or heating may reduce or eliminate the formation of undesired by-products from undesired parallel reactions with higher activation energies.

The pressure within each individual heat exchange channel in the Fischer-Tropsch or alcohol-forming microchannel reactor 200 and, optionally, in the hydrocracking microchannel reactor 700 may be controlled using passive structures (e.g., obstructions), orifices and/or mechanisms upstream of the heat exchange channels or in the channels. By controlling the pressure within each heat exchange microchannel, the temperature within each heat exchange microchannel can be controlled. A higher inlet pressure for each heat exchange channel may be used where the passive structures, orifices and/or mechanisms let down the pressure to the desired pressure. By controlling the temperature within each heat exchange channel, the temperature in the Fischer-Tropsch or alcohol-forming process microchannels or hydrocracking process microchannels can be controlled. Thus, for example, each Fischer-Tropsch or alcohol-forming process microchannel may be operated at a desired temperature by employing a specific pressure in the heat exchange channel adjacent to or in thermal contact with the process microchannel. This provides the advantage of precisely controlled temperatures for each Fischer-Tropsch or alcohol-forming process microchannel. The use of precisely controlled temperatures for each Fischer-Tropsch or alcohol-forming process microchannel provides the advantage of a tailored temperature profile and an overall reduction in the energy requirements for the process.

In a scale up device, for certain applications, it may be required that the mass of the process fluid be distributed uniformly among the microchannels. Such an application may be when the process fluid is required to be heated or cooled down with adjacent heat exchange channels. The uniform mass flow distribution may be obtained by changing the cross-sectional area from one parallel microchannel to another microchannel. The uniformity of mass flow distribution may be defined by Quality Index Factor (Q-factor) as indicated below. A Q-factor of 0% means absolute uniform distribution.

$$Q = \frac{\dot{m}_{max} - \dot{m}_{min}}{\dot{m}_{max}} \times 100$$

A change in the cross-sectional area may result in a difference in shear stress on the wall. In one embodiment, the Q-factor for the hydrocracking microchannel reactor 700, SMR microchannel reactor 500 and/or Fischer-Tropsch or alcohol-forming microchannel reactor 200 may be less than about 50%, and in one embodiment less than about 20%, and in one embodiment less than about 5%, and in one embodiment less than about 1%.

The superficial velocity for fluid flowing in the Fischer-Tropsch or alcohol-forming process microchannels, SMR process microchannels, and/or hydrocracking process microchannels may be at least about 0.01 meters per second (m/s), and in one embodiment at least about 0.1 m/s, and in one embodiment in the range from about 0.01 to about 100 m/s, and in one embodiment in the range from about 0.01 to about 1 m/s, and in one embodiment in the range from about 0.1 to about 10 m/s, and in one embodiment in the range from about 1 to about 100 m/s.

The free stream velocity for fluid flowing in the Fischer-Tropsch or alcohol-forming process microchannels, SMR process microchannels, and/or hydrocracking process microchannels may be at least about 0.001 m/s, and in one embodiment at least about 0.01 m/s, and in one embodiment in the range from about 0.001 to about 200 m/s, and in one embodiment in the range from about 0.01 to about 100 m/s, and in one embodiment in the range from about 0.01 to about 200 m/s.

The conversion of CO in the Fischer-Tropsch or alcohol forming microchannel reactor may be about 40% or higher per cycle, and in one embodiment about 50% or higher, and in one embodiment about 55% or higher, and in one embodiment about 60% or higher, and in one embodiment about 65% or higher, and in one embodiment about 70% or higher. The term "cycle" is used herein to refer to a single pass of the reactants through the process microchannels.

The selectivity to methane in the Fischer-Tropsch (FT) product may be about 25% or less, and in one embodiment about 20% or less, and in one embodiment about 15% or less, and in one embodiment about 12% or less, and in one embodiment about 10% or less.

The yield of Fischer-Tropsch product may be about 25% or higher per cycle, and in one embodiment about 30% or higher, and in one embodiment about 40% or higher per cycle.

In one embodiment of the Fischer-Tropsch process, the conversion of CO is at least about 50%, the selectivity to methane is about 15% or less, and the yield of product is at least about 35% per cycle.

The nitrogen separator 300 may comprise a microchannel separator employing an ionic liquid as a liquid absorbent. The microchannel separator may comprise a thin film separator wherein the flow of the liquid absorbent (i.e., the ionic liquid) is retained or constrained within a channel or structure by the use of capillary forces that minimize the mixing or back mixing of a liquid and a gas (e.g., air) in a microchannel. The microchannel separator may comprise a device wherein a fluid mixture of the liquid absorbent and gas are co-fed either inside or outside of the microchannel device and flow in a co-flow arrangement. The fluid may flow into and out of surface features in the device. The microchannel separator may comprise a device wherein the gas and liquid absorbent flows in a co-flow arrangement and are mixed to create a high interfacial area by flowing past a series of obstructions in the form of a porous packed bed of rings, spheres, or other shapes. The microchannel separator may comprise a device wherein a thin contactor plate separates the phases to assist with countercurrent flow. The contactor plate may have sufficiently small apertures such that capillary pressure of the liquid retains the liquid on one side of the contactor plate and the gaseous stream on the other side of the contactor plate. The ionic liquid that may be used as the liquid absorbent may comprise one or more quaternary imidazolium salts, and/or one or more quaternary aromatic 5- or 6-membered-ring heterocyclic compounds such as imidazolium salts, pyridinium salts, and the like. These may include 1-butyl-3-methylimidazolium hexafluorophosphate, 1-octyl-3-methylimidazolium hexafluorophosphate, 1-butyl-3-methylimidazolium nitrate, 1-octyl-3-methylimidazolium tetrafluoroborate, 1-ethyl-3-methylimidazolium ethylsulfate, and/or N-butylpyridinium tetrafluoroborate. Ionic liquids that may be used are disclosed in U.S. Pat. Nos. 6,579,343 B2 and 6,623,659 B2, U.S. Patent Publication 2006/0251588 A1, and international publication WO 02/34863 A1, these patents and publications being incorporated herein by reference.

The temperature swing adsorption (TSA) or pressure swing adsorption (PSA) techniques may be used in the nitrogen separator 300. TSA and PSA processes employing microchannel technology that may be used for the foregoing separations are disclosed in U.S. Pat. Nos. 6,508,862 B1 and 6,652,627 B1, and U.S. Patent Publication US 2005/0045030 A1, which are incorporated herein by reference.

The ionic liquid separators, TSA separators and/or PSA separators discussed above may also be used in the line between the gasifier 110 and the microchannel separator 200 to separate out contaminant gases and materials (e.g. $CO_2$, sulfur compounds such as $H_2S$, particulate solids, and the like) from the synthesis gas formed in the gasifier 110.

Microchannel devices employing layers of nanofibers or nano-composite films may be employed in the line between the gasifier 110 and the microchannel reactor 200 to separate out contaminant materials from the synthesis gas. Nanofibers and nano-composite films that may be used are disclosed in U.S. Pat. Nos. 6,326,326 B1; 6,531,224 B1; 6,733,835 B2; 6,753,038 B2; 6,846,554 B2; and 7,122,106 B2; which are incorporated herein by reference.

The presence of contaminants such as sulfur, halogen, selenium, phosphorus, arsenic, and the like, in the synthesis gas flowing out of the gasifier 110 may be undesirable. The foregoing contaminants may be removed from the synthesis gas or have their concentrations reduced prior to conducting the reaction in the microchannel reactor 200. Techniques for removing or reducing the level of these contaminants are well known to those of skill in the art. For example, ZnO guard-beds may be used in the line between the gasifier 110 and the microchannel reactor 200 for removing sulfur impurities. The contaminant level in the synthesis gas may be reduced to a level of up to about 5% by volume, and in one embodiment up to about 1% by volume, and in one embodiment up to about 0.1% by volume, and in one embodiment up to about 0.05% by volume.

The pyrolysis process that is conducted in the pyrolysis reactor 400 may comprise heating the carbonaceous material in the absence of oxygen or any other reagent, except possibly steam. The pyrolysis process may comprise an anhydrous process. The pyrolysis process may comprise a fast or flash pyrolysis process wherein the carbonaceous material is heated at temperature in the range from about 350° C. to about 500° C. over a relatively short period of time of up to about 2 seconds, and in one embodiment in the range from about 0.5 to about 2 seconds. The pyrolysis process may be used to produce a liquid product which may be referred to as pyrolytic oil. The pyrolysis process may be conducted in an auger reactor, ablative reactor, rotating cone, fluidized bed or circulating fluidized bed.

The pyrolysis reaction that is conducted in an auger reactor involves the use of a feed of hot sand and carbonaceous material particles at one end of a screw. The screw mixes the sand and carbonaceous material and conveys it along as the pyrolysis process proceeds.

The ablative process involves projecting carbonaceous material particles at high speed against a hot metal surface. This can be achieved by using a metal surface spinning at high speed within a bed of carbonaceous material particles. As an alternative, the particles may be suspended in a carrier gas and introduced at high speed through a cyclone whose wall is heated.

The rotating cone process involves heating a mixture of sand and carbonaceous material particles and introducing the mixture into a rotating cone. Due to the rotation of the cone, the mixture of sand and carbonaceous material is transported across the cone surface by centrifugal force as the pyrolysis process proceeds.

With the fluidized bed reactor, carbonaceous material particles are introduced into a bed of hot sand fluidized by a gas. High heat transfer rates from the fluidized sand result in rapid heating of the carbonaceous material particles. Heat may be provided by heat exchanger tubes through which hot combustion gas may flow.

With the circulating fluidized beds, carbonaceous material particles are introduced into a circulating fluidized bed of hot sand. Gas, sand and carbonaceous material particles move together. The transport gas may be a recirculated product gas, although it may also be a combustion gas. High heat transfer rates from the sand provide for rapid heating of carbonaceous material particles. A separator may separate the product gases and vapors from the sand and char particles. The sand particles may be reheated in a fluidized burner vessel and recycled to the reactor.

The Fischer-Tropsch product formed in the microchannel reactor 200 may comprise a gaseous product fraction and a liquid product fraction. The gaseous product fraction may include hydrocarbons boiling below about 350° C. at atmospheric pressure (e.g., tail gases through middle distillates). The liquid product fraction (the condensate fraction) may include hydrocarbons boiling above about 350° C. (e.g., vacuum gas oil through heavy paraffins).

The Fischer-Tropsch product fraction boiling below about 350° C. may be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may be separated into a wax fraction boiling in the range of about 350° C. to about 650° C. after removing one or more fractions boiling above about 650° C. The wax fraction may contain linear paraffins of about 20 to about 50 carbon atoms with relatively small amounts of higher boiling branched paraffins. The separation may be effected using fractional distillation.

The Fischer-Tropsch product formed in the microchannel reactor 200 may include methane, wax and other heavy high molecular weight products. The product may include olefins such as ethylene, normal and iso-paraffins, and combinations thereof. These may include hydrocarbons in the distillate fuel ranges, including the jet or diesel fuel ranges.

Branching may be advantageous in a number of end-uses, particularly when increased octane values and/or decreased pour points are desired. The degree of isomerization may be greater than about 1 mole of isoparaffin per mole of n-paraffin, and in one embodiment about 3 moles of isoparaffin per mole of n-paraffin. When used in a diesel fuel composition, the product may comprise a hydrocarbon mixture having a cetane number of at least about 60.

The Fischer-Tropsch product may be further processed to form a lubricating base oil or diesel fuel. For example, the product made in the microchannel reactor 200 may be hydrocracked and then subjected to distillation and/or catalytic isomerization to provide a lubricating base oil, diesel fuel, aviation fuel, and the like. The Fischer-Tropsch product may be hydroisomerized using the process disclosed in U.S. Pat. Nos. 6,103,099 or 6,180,575; hydrocracked and hydroisomerized using the process disclosed in U.S. Pat. Nos. 4,943, 672 or 6,096,940; dewaxed using the process disclosed in U.S. Pat. No. 5,882,505; or hydroisomerized and dewaxed using the process disclosed in U.S. Pat. Nos. 6,013,171, 6,080,301 or 6,165,949. These patents are incorporated herein by reference for their disclosures of processes for treating Fischer-Tropsch synthesized hydrocarbons and the resulting products made from such processes.

The hydrocracking reaction conducted in the hydrocracking microchannel reactor 700 may involve a reaction between hydrogen and the Fischer-Tropsch product flowing from the microchannel reactor 200, or one or more hydrocarbons separated from the Fischer-Tropsch product (e.g., one or more liquid or wax Fischer-Tropsch hydrocarbons). The Fischer-Tropsch product may comprise one or more long chain hydrocarbons. In the hydrocracking process, a desired diesel fraction, for example, may be increased by cracking a $C_{23}$ fraction to mid range carbon numbers of $C_{12}$ to $C_{22}$. A wax fraction produced from the Fischer-Tropsch microchannel reactor 200 may be fed to the hydrocracking microchannel reactor 700 with excess hydrogen for a triple phase reaction. Under reaction conditions at elevated temperatures and pressures, a fraction of the liquid feed may convert to a gas phase, while the remaining liquid fraction may flow along the catalyst. In conventional hydrocracking systems, a liquid stream forms. The use of a microchannel reactor for the hydrocracking reaction enables unique advantages on a number of fronts. These may include kinetics, pressure drop, heat transfer, and mass transfer.

The Fischer-Tropsch hydrocarbon products that may be hydrocracked in the hydrocracking microchannel reactor 700 may comprise any hydrocarbon that may be hydrocracked. These may include hydrocarbons that contain one or more C—C bonds capable of being broken in a hydrocracking process. The hydrocarbons that may be hydrocracked may include saturated aliphatic compounds (e.g., alkanes), unsaturated aliphatic compounds (e.g., alkenes, alkynes), hydrocarbyl (e.g., alkyl) substituted aromatic compounds, hydrocarbylene (e.g., alkylene) substituted aromatic compounds, and the like.

The feed composition for the hydrocracking microchannel reactor 700 may include one or more diluent materials. Examples of such diluents may include non-reactive hydrocarbon diluents, and the like. The diluent concentration may be in the range from zero to about 99% by weight based on the weight of the Fischer-Tropsch product, and in one embodiment from zero to about 75% by weight, and in one embodiment from zero to about 50% by weight. The diluents may be used to reduce the viscosity of viscous liquid reactants. The viscosity of the feed composition in the hydrocracking microchannel reactor 700 may be in the range from about 0.001 to about 1 centipoise, and in one embodiment from about 0.01 to about 1 centipoise, and in one embodiment from about 0.1 to about 1 centipoise.

The ratio of hydrogen to Fischer-Tropsch product in the feed composition entering the hydrocracking microchannel reactor 700 may be in the range from about 10 to about 2000 standard cubic centimeters (sccm) of hydrogen per cubic centimeter (ccm) of Fischer-Tropsch product, and in one embodiment from about 100 to about 1800 sccm/ccm, and in one embodiment from about 350 to about 1200 sccm/ccm. The hydrogen feed may further comprise water, methane, carbon dioxide, carbon monoxide and/or nitrogen.

The $H_2$ in the hydrogen feed may be derived from another process such as a steam reforming process (product stream with $H_2$/CO mole ratio of about 3), a partial oxidation process (product stream with $H_2$/CO mole ration of about 2), an autothermal reforming process (product stream with $H_2$/CO mole ratio of about 2.5), a $CO_2$ reforming process (product stream with $H_2$/CO mole ratio of about 1), a coal gasification process (product stream with $H_2$/CO mole ratio of about 1), and combinations thereof. With each of these feed streams the $H_2$ may be separated from the remaining ingredients using conventional techniques such as membranes or adsorption.

The hydrocracked Fischer-Tropsch product may comprise a middle distillate fraction boiling in the range of about 260-700° F. (127-371° C.). The term "middle distillate" is intended to include the diesel, jet fuel and kerosene boiling range fractions. The terms "kerosene" and "jet fuel" boiling range are intended to refer to a temperature range of 260-550° F. (127-288° C.) and "diesel" boiling range is intended to refer to hydrocarbon boiling points between about 260 to about 700° F. (127-371° C.). The hydrocracked Fischer-Tropsch product may comprise a gasoline or naphtha fraction. These may be considered to be the $C_5$ to 400° F. (204° C.) endpoint fractions.

The desired product for the alcohol-forming process may comprise one or more alcohols having from 1 to about 10 carbon atoms, and in one embodiment from 1 to about 5 carbon atoms, and in one embodiment from 2 to about 5 carbon atoms. The product may comprise methanol. The product may comprise methanol, ethanol, 1-propanol, 2-propanol, 1-butanol, 2-butanol, 2-methyl-1-propanol, 2-methyl-2-propanol, 1-pentanol, 2-pentanol, or a mixture of two or more thereof. These alcohols and alcohol mixtures may be used as fuels and fuel supplements. For example, these alcohols can be added to gasoline to supplement the gasoline.

Example 1

A process simulation using Chem CAD is conducted. The process is illustrated in FIG. 28. Referring to FIG. 28, the process 600 involves the use of dryer 601, mixer 607, gasifier 610, tempering chamber 615, upper heater 620, quench chamber 625, scrubber 630, cyclone 635, condensers 640, 645 and 650, mixer 655, Fischer-Tropsch (FT) microchannel reactor 660, heat exchange steam circuit 663, separators 670 and 675, mixer 680, and fractionators 685 and 690. The process also employs the use of heat exchangers 636, 641, 646, 656, 673 and 674. These heat exchangers may be microchannel heat exchangers. Compressors 642, 647 and 652 are also employed in the illustrated process. The temperature, pressure, flow rate and composition of various flow streams employed in the process 600 are disclosed in the following Tables 1-3.

The operation of the process 600 illustrated in FIG. 28 will now be described. In the following description, temperatures and pressures of various flow streams are indicated within parentheses. The temperatures are in ° C. and the pressures are in bars. In some instances, these values have been rounded off from what was produced by the Chem CAD simulation. The full values produced by Chem CAD are shown in Tables 1-3. Municipal solid waste (MSW) with a water content of 70% by weight flows through line 602 (15° C., 1 bar) into dryer 601 wherein the MSW undergoes condensation. Separated water flows out of the dryer 601 through line 604 (89° C., 1 bar). Steam flows through line 603 (250° C., 25 bars) into the dryer 601, heats the MSW, and flows out of the dryer 601 through line 605 (225° C., 25 bars). Condensed MSW with a water concentration of 14.2% by weight flows through line 606 (89° C., 1 bar) into mixer 607 wherein it is combined fractionator light ends from line 687 (121° C., 18 bars) and fractionator bottoms from line 692 (121° C., 18 bars). The combined flow of condensed MSW, fractionator light ends and fractionator bottoms (which may be referred to as a combined carbonaceous feed) flows from mixer 607 through line 608 (94° C., 1 bar) to gasifier 610. Oxygen (15° C., 1 bar) flows through line 609 to gasifier 610. In gasifier 610, the combined carbonaceous feed and the oxygen are heated and undergo a gasification reaction to form synthesis gas. Ash is removed from the gasifier 610 as indicated by arrow 617.

The synthesis gas flows from the gasifier 610 through line 611 (1480° C., 1 bar) to tempering chamber 615. Water flows through lines 612 and 614 (15° C., 1 bar) to tempering chamber 615. Steam flows out of the tempering chamber 615 through line 619. The synthesis gas flows from tempering chamber 615 through line 616 (1013° C., 1 bar) to superheater 620. Steam flows through line 618 (225° C., 25 bars) to and through superheater 620, and then out of superheater 620 through line 621 (450° C., 25 bars). The synthesis gas flows from superheater 620 through line 622 (235° C., 1 bar) to and through quenching chamber 625. Water flows through lines 612 and 613 (15° C., 1 bar) to and through quenching chamber 625, and then out of quenching chamber 625 through line 627 (67° C., 1 bar). The synthesis gas flows from the quenching chamber 625 through line 626 (67° C., 1 bar) into scrubber 630. Contaminants are separated from the synthesis gas in the scrubber 630 and flow out of the scrubber through line 632 (67° C., 1 bar). The synthesis gas flows from scrubber 630 through line 631 (67° C., 1 bar) into cyclone 635. Solid particulates are separated from the synthesis gas in cyclone 635. The solid particulates are removed through line 638. The synthesis gas flows from cyclone 635 through line 637 (67° C., 1 bar) to and through heat exchanger 636, and then through line 637a (24° C., 1 bar) into condenser 640 where it is condensed. Water flows out of condenser 640 through line 644 (24° C., 1 bar). The synthesis gas flows from condenser 640 through line 643 (24° C., 1 bar) to and through compressor 642, and then from compressor 642 through line 643a (125° C., 2.6 bars) to and through heat exchanger 641. The synthesis gas flows from heat exchanger 641 through line 643b (24° C., 2.6 bars) to condenser 645 where it is condensed. Water is removed from the synthesis gas in condenser 645 and flows out of the condenser through line 648 (24° C., 2.6 bars). The synthesis gas flows from condenser 645 through line 649 (24° C., 2.6 bars) to and through compressor 647, and then from compressor 647 through line 649a (101° C., 5.5 bars) to and through heat exchanger 646. The synthesis gas flows from heat exchanger 646 through line 649b (24° C., 5.5 bars) to condenser 650 where it is condensed. Water flows out of the condenser 650 through line 651a (24° C., 1 bar). The synthesis gas flows out of condenser 650 through line 651 (24° C., 5.5 bars) to and through compressor 652.

The synthesis gas flows from compressor 652 through line 653 (234° C., 25 bars) to mixer 655. The synthesis gas flowing through line 653 has a $H_2$:CO ratio of 0.989. Hydrogen flows through line 654 (37° C., 15 bars) to mixer 655 wherein it is combined with the synthesis gas. The combined mixture of synthesis and hydrogen may be referred to as upgraded synthesis gas. The upgraded synthesis gas has a $H_2$:CO ratio of 1.896. The upgraded synthesis gas flows from mixer 655 through heat exchanger 656, and from the heat exchanger 656 through line 657 (220° C., 25 bars) to and through Fischer-Tropsch (FT) microchannel reactor 660 wherein the synthesis gas undergoes an exothermic FT reaction to form a FT product.

The FT microchannel reactor 660 is cooled by steam which flows through coolant steam loop 663. Steam enters the coolant steam loop 663 through line 664 (150° C., 26 bars) and flows into mixer 664a. Steam flows from mixer 664a through line 664b (222° C., 26 bars) to and through heat exchanger 668. The heat exchanger 668 is in thermal contact with the FT microchannel reactor 660 and exchanges heat with the FT microchannel reactor. The steam cools the FT microchannel reactor 660 as the synthesis gas is converted to the FT product in the FT microchannel reactor 660. Steam flows out of the heat exchanger 668 through line 664c (225° C., 25 bars) to vessel 666. Steam flows out of the vessel 666 through line 665 (225° C., 25 bars) and out of the coolant steam loop 663. Steam flows from the vessel 666 through line 664d (225° C., 25 bars) to and through pump 667. The steam flows from pump 667 through line 669 (225° C., 27 bars) to mixer 664a.

The FT product flows from the FT microchannel reactor 660 through line 661 (230° C., 18 bars) to separator 670 where it undergoes a separation. A gaseous FT product flows out of separator 670 through line 671 (230° C., 18 bars). A liquid FT product flows out of separator 670 through line 672 (230° C., 18 bars) to mixer 680. The gaseous FT product flows through heat exchanger 673 to line 671a (80° C., 18 bars). Coolant water flows from line 682 (30° C., 5 bars) to and through heat exchanger 673 and out of heat exchanger 673 through line 683 (34.2° C., 3.5 bars). The gaseous FT product flows through line 671a (80° C., 18 bars) to and through heat exchanger 674 and from the heat exchanger 674 to and through line 671b (35° C., 18 bars) to three-way separator 675. A gaseous mixture flows out of the three-way separator 675 through line 676 (35° C., 18 bars). This gaseous mixture may be referred to as an FT tail gas. A liquid mixture flows out of the three-way separator 675 through line 677 (35° C., 18 bars). This liquid mixture may be referred to as process condensate.

A liquid FT product flows from the three-way separator 675 through line 678 (35° C., 18 bars) to mixer 680 where it is combined with the liquid FT product from line 672. The combined liquid FT product flows from mixer 680 through line 681 (121° C., 18 bars) to fractionator 685 where the combined liquid FT product undergoes fractionation. A light ends product flows out of fractionator 685 through line 687 (121° C., 18 bars) to mixer 607. A liquid FT product flows from fractionator 685 through line 686 (121° C., 18 bars) to fractionator 690 wherein the liquid FT product undergoes fractionation. Liquid FT product flows out of fractionator 690 through line 691 (121° C., 18 bars). This liquid FT product may be referred to as synthetic fuel. A bottoms product flows out of fractionator 690 through line 692 (121° C., 18 bars) to mixer 607.

TABLE 1

| Stream No. | 602 | 606 | 608 | 611 | 616 | 622 | 626 | 631 |
|---|---|---|---|---|---|---|---|---|
| Temp C. | 15 | 89 | 93.9883 | 1480 | 1013.054 | 235 | 66.7115 | 66.7115 |
| Pres bar | 1 | 1 | 1 | 1 | 1 | 1 | 1 | 1 |
| Enth MW | −7.4219 | −3.2923 | −3.5602 | 0.14156 | −3.3517 | −5.2457 | −7.3836 | −7.5537 |
| Vapor mole fraction | 0.3192 | 0 | 0.17438 | 1 | 1 | 1 | 1 | 0.99112 |
| Total kmol/h | 98.1637 | 25.8081 | 28.1409 | 196.2389 | 240.0912 | 240.0912 | 266.6482 | 260.3062 |
| Total kg/h | 3559.074 | 2279.7353 | 2789.0026 | 3279.5127 | 4069.5129 | 4069.5129 | 4547.9342 | 4184.5017 |
| Total std L m3/h | 1.9979 | 0.4612 | 1.1084 | 6.6447 | 7.4347 | 7.4347 | 7.9131 | 7.4862 |
| Total std V m3/h | 2200.21 | 578.45 | 630.74 | 4398.43 | 5381.32 | 5381.32 | 5976.56 | 5834.41 |
| Flowrates in kmol/h | | | | | | | | |
| MSW | 22.1358 | 22.1358 | 22.1358 | 0 | 0 | 0 | 0 | 0 |
| Hydrogen | 0 | 0 | 0.0379 | 91.761 | 91.761 | 91.761 | 91.761 | 91.761 |

TABLE 1-continued

| Stream No. | 602 | 606 | 608 | 611 | 616 | 622 | 626 | 631 |
|---|---|---|---|---|---|---|---|---|
| Carbon Monoxide | 0 | 0 | 0.0495 | 92.8783 | 92.8783 | 92.8783 | 92.8783 | 92.8783 |
| Water | 51.4844 | 3.6677 | 3.9381 | 0.0002 | 43.8525 | 43.8525 | 70.4096 | 70.4096 |
| Carbon Dioxide | 0 | 0 | 0.0142 | 0 | 0 | 0 | 0 | 0 |
| Methane | 0 | 0 | 0.05 | 3.12116 | 3.2116 | 3.2116 | 3.2116 | 3.2116 |
| Ethane | 0 | 0 | 0.0086 | 0.0009 | 0.0009 | 0.0009 | 0.0009 | 0.0009 |
| Ethylene | 0 | 0 | 0.0191 | 1.3367 | 1.3367 | 1.3367 | 1.3367 | 1.3367 |
| Propane | 0 | 0 | 0.0187 | 0 | 0 | 0 | 0 | 0 |
| Propylene | 0 | 0 | 0.0002 | 0.0035 | 0.0035 | 0.0035 | 0.0035 | 0.0035 |
| N-Butane | 0 | 0 | 0.0037 | 0 | 0 | 0 | 0 | 0 |
| N-Pentane | 0 | 0 | 0.0093 | 0 | 0 | 0 | 0 | 0 |
| N-Dodecane | 0 | 0 | 0.154 | 0 | 0 | 0 | 0 | 0 |
| N-Tridecane | 0 | 0 | 0.1913 | 0 | 0 | 0 | 0 | 0 |
| N-Tetradecane | 0 | 0 | 0.1782 | 0 | 0 | 0 | 0 | 0 |
| N-Pentadecane | 0 | 0 | 0.1412 | 0 | 0 | 0 | 0 | 0 |
| N-Hexadecane | 0 | 0 | 0.1186 | 0 | 0 | 0 | 0 | 0 |
| N-Heptadecane | 0 | 0 | 0.102 | 0 | 0 | 0 | 0 | 0 |
| N-Octadecane | 0 | 0 | 0.1204 | 0 | 0 | 0 | 0 | 0 |
| N-Nonadecane | 0 | 0 | 0.0983 | 0 | 0 | 0 | 0 | 0 |
| N-Eicosane | 0 | 0 | 0.1801 | 0 | 0 | 0 | 0 | 0 |
| n-Docosane | 0 | 0 | 0.1402 | 0 | 0 | 0 | 0 | 0 |
| n-Tetracosane | 0 | 0 | 0.1197 | 0 | 0 | 0 | 0 | 0 |
| n-Hexacosane | 0 | 0 | 0.0845 | 0 | 0 | 0 | 0 | 0 |
| n-Octacosane | 0 | 0 | 0.0697 | 0 | 0 | 0 | 0 | 0 |
| N-Tricontane | 0 | 0 | 0.0513 | 0 | 0 | 0 | 0 | 0 |
| N-Dotriacontane | 0 | 0 | 0.054 | 0 | 0 | 0 | 0 | 0 |
| Hexatriacontane | 0 | 0 | 0.0478 | 0 | 0 | 0 | 0 | 0 |
| Hydrogen Chloride | 0 | 0 | 0 | 0.6119 | 0.6119 | 0.6119 | 0.6119 | 0.0612 |
| Ammonia | 24.5435 | 0.0046 | 0.0046 | 0.0001 | 0.0001 | 0.0001 | 0.0001 | 0 |
| Nitrogen | 0 | 0 | 0 | 0.265 | 0.265 | 0.265 | 0.265 | 0.0265 |
| Hydrogen Cyanide | 0 | 0 | 0 | 2.0347 | 2.0347 | 2.0347 | 2.0347 | 0.2035 |
| Hydrogen Sulfide | 0 | 0 | 0 | 0.0846 | 0.0846 | 0.0846 | 0.0846 | 0.0085 |
| Carbonyl Sulfide | 0 | 0 | 0 | 0.0042 | 0.0042 | 0.0042 | 0.0042 | 0.0004 |
| Carbon Disulfide | 0 | 0 | 0 | 0.0523 | 0.0523 | 0.0523 | 0.0522 | 0.0052 |
| Benzene | 0 | 0 | 0 | 3.9939 | 3.9939 | 3.9939 | 3.9939 | 0.3994 |

TABLE 2

| Stream No. | 653 | 654 | 651 | 661 | 672 | 671 | 676 |
|---|---|---|---|---|---|---|---|
| Temp C. | 233.7769 | 15 | 220 | 230 | 230 | 230 | 35 |
| Pres bar | 25.17 | 25.17 | 25.17 | 18.25 | 18.25 | 18.25 | 17.95 |
| Enth MW | -2.6217 | -0.006469 | -2.5101 | -5.5514 | -0.13693 | -5.4144 | -1.2426 |
| Vapor mole fraction | 1 | 1 | 1 | 0.99172 | 0 | 1 | 1 |
| Total kmol/h | 190.9299 | 84.3338 | 275.2637 | 146.281 | 1.2117 | 145.0693 | 78.2589 |
| Total kg/h | 2934.6853 | 170 | 3104.6854 | 3104.6994 | 308.7789 | 2795.9199 | 1198.5036 |
| Total std L m3/h | 6.2364 | 2.4286 | 8.665 | 5.0348 | 0.384 | 4.6508 | 2.9014 |
| Total std V m3/h | 4279.44 | 1890.23 | 6169.66 | 3278.69 | 27.16 | 3251.53 | 1754.07 |
| Flowrates in kmol/h | | | | | | | |
| Hydrogen | 91.761 | 84.3338 | 176.0948 | 33.7124 | 0.012 | 33.7004 | 33.6744 |
| Carbon Monoxide | 92.8783 | 0 | 92.8783 | 27.8635 | 0.0104 | 27.8531 | 27.8139 |
| Water | 1.0333 | 0 | 1.0333 | 63.7726 | 0.1997 | 63.5729 | 0.2657 |
| Carbon Dioxide | 0 | 0 | 0 | 0.9005 | 0.0007 | 0.8998 | 0.8806 |
| Methane | 3.2116 | 0 | 3.2116 | 12.9638 | 0.0056 | 12.9583 | 12.9137 |
| Ethane | 0.0009 | 0 | 0.0009 | 0.4203 | 0.0004 | 0.4198 | 0.4116 |
| Ethylene | 1.3367 | 0 | 1.3367 | 1.3367 | 0.0012 | 1.3355 | 1.3175 |
| Propane | 0 | 0 | 0 | 0.2926 | 0.0005 | 0.2921 | 0.2739 |
| Propylene | 0.0035 | 0 | 0.0035 | 0.0035 | 0 | 0.0035 | 0.0033 |
| N-Butane | 0 | 0 | 0 | 0.0203 | 0.0001 | 0.0203 | 0.0166 |
| N-Pentane | 0 | 0 | 0 | 0.0767 | 0.0003 | 0.0763 | 0.0457 |
| N-Hexane | 0 | 0 | 0 | 0.1415 | 0.001 | 0.1405 | 0.0465 |
| N-Heptane | 0 | 0 | 0 | 0.223 | 0.0024 | 0.2206 | 0.0319 |
| N-Octane | 0 | 0 | 0 | 0.2922 | 0.0047 | 0.2875 | 0.0165 |
| N-Nonane | 0 | 0 | 0 | 0.302 | 0.0074 | 0.2946 | 0.0057 |
| N-Decane | 0 | 0 | 0 | 0.2829 | 0.0103 | 0.2726 | 0.0018 |
| N-Undecane | 0 | 0 | 0 | 0.2698 | 0.0144 | 0.2553 | 0.0006 |
| N-Dodecane | 0 | 0 | 0 | 0.2568 | 0.02 | 0.2368 | 0.0002 |
| N-Tridecane | 0 | 0 | 0 | 0.2126 | 0.0237 | 0.189 | 0.0001 |
| N-Tetradecane | 0 | 0 | 0 | 0.1876 | 0.0293 | 0.1583 | 0 |
| N-Pentadecane | 0 | 0 | 0 | 0.1471 | 0.0316 | 0.1155 | 0 |
| N-Hexadecane | 0 | 0 | 0 | 0.1235 | 0.0376 | 0.0859 | 0 |
| N-Heptadecane | 0 | 0 | 0 | 0.1062 | 0.0396 | 0.0666 | 0 |
| N-Octadecane | 0 | 0 | 0 | 0.1254 | 0.0564 | 0.0691 | 0 |
| N-Nonadecane | 0 | 0 | 0 | 0.1024 | 0.0549 | 0.0475 | 0 |
| N-Eicosane | 0 | 0 | 0 | 0.1876 | 0.1242 | 0.0634 | 0 |

TABLE 2-continued

| Stream No. | 653 | 654 | 651 | 661 | 672 | 671 | 676 |
|---|---|---|---|---|---|---|---|
| n-Docosane | 0 | 0 | 0 | 0.1402 | 0.1105 | 0.0297 | 0 |
| n-Tetracosane | 0 | 0 | 0 | 0.1197 | 0.1068 | 0.013 | 0 |
| n-Hexacosane | 0 | 0 | 0 | 0.0845 | 0.0798 | 0.0046 | 0 |
| n-Octacosane | 0 | 0 | 0 | 0.0697 | 0.0677 | 0.0019 | 0 |
| n-Tricontane | 0 | 0 | 0 | 0.0513 | 0.0506 | 0.0007 | 0 |
| n-Dotriacontane | 0 | 0 | 0 | 0.054 | 0.0536 | 0.0004 | 0 |
| Hexatriacontane | 0 | 0 | 0 | 0.0478 | 0.0477 | 0.0001 | 0 |
| Methanol | 0 | 0 | 0 | 0.13 | 0.0005 | 0.1296 | 0.0051 |
| Ethanol | 0 | 0 | 0 | 0.5201 | 0.0023 | 0.5178 | 0.1664 |
| Isopropanol | 0 | 0 | 0 | 0.0033 | 0 | 0.0032 | 0.0007 |
| N-Propanol | 0 | 0 | 0 | 0.0325 | 0.0002 | 0.0323 | 0.0051 |
| HydrogenChloride | 0.0612 | 0 | 0.0612 | 0.0612 | 0.0001 | 0.0611 | 0.0598 |
| Nitrogen | 0.0265 | 0 | 0.0265 | 0.0265 | 0 | 0.0265 | 0.0265 |
| Hydrogen Cyanide | 0.2035 | 0 | 0.2035 | 0.2035 | 0.0006 | 0.2029 | 0.1449 |
| Hydrogen Sulfide | 0.0085 | 0 | 0.0085 | 0.0085 | 0 | 0.0084 | 0.0081 |
| Carbonyl Sulfide | 0.0004 | 0 | 0.0004 | 0.0004 | 0 | 0.0004 | 0.0004 |
| Carbon Disulfide | 0.0052 | 0 | 0.0052 | 0.0052 | 0 | 0.0052 | 0.0032 |
| Benzene | 0.3994 | 0 | 0.3994 | 0.3994 | 0.0031 | 0.3963 | 0.1184 |

TABLE 3

| Stream No. | 677 | 678 | 681 | 692 | 686 | 691 | 687 |
|---|---|---|---|---|---|---|---|
| Temp C. | 35 | 35 | 120.8143 | 120.8143 | 120.8143 | 120.8143 | 120.8143 |
| Pres bar | 17.95 | 17.95 | 17.95 | 17.95 | 17.95 | 17.95 | 17.95 |
| Enth MW | −5.0226 | −0.26163 | −0.39856 | −0.025453 | −0.37262 | −0.13048 | −0.24245 |
| Vapor mole fraction | 0 | 0 | 0 | 0.49977 | 0 | 0 | 0.2 |
| Total kmol/h | 63.402 | 3.4085 | 4.6202 | 0.4815 | 4.1387 | 2.2875 | 1.8512 |
| Total kg/h | 1145.1263 | 452.2904 | 761.0694 | 10.2715 | 750.7979 | 251.8024 | 498.9954 |
| Total std L m3/h | 1.1466 | 0.6028 | 0.9869 | 0.0164 | 0.9704 | 0.3397 | 0.6307 |
| Total std V m3/h | 1421.07 | 76.4 | 103.56 | 10.79 | 92.76 | 51.27 | 41.49 |
| Flowrates in kmol/h | | | | | | | |
| Hydrogen | 0.0001 | 0.0259 | 0.0379 | 0.0379 | 0 | 0 | 0 |
| Carbon Monoxide | 0 | 0.0391 | 0.0495 | 0.0495 | 0 | 0 | 0 |
| Water | 63.2365 | 0.0707 | 0.2704 | 0.2704 | 0 | 0 | 0 |
| Carbon Dioxide | 0.0057 | 0.0135 | 0.0142 | 0.0142 | 0 | 0 | 0 |
| Methane | 0.0001 | 0.0444 | 0.05 | 0.05 | 0 | 0 | 0 |
| Ethane | 0 | 0.0082 | 0.0086 | 0.0086 | 0 | 0 | 0 |
| Ethylene | 0 | 0.0179 | 0.0191 | 0.0191 | 0 | 0 | 0 |
| Propane | 0 | 0.0182 | 0.0187 | 0.0187 | 0 | 0 | 0 |
| Propylene | 0 | 0.0002 | 0.0002 | 0.0002 | 0 | 0 | 0 |
| N-Butane | 0 | 0.0036 | 0.0037 | 0.0037 | 0 | 0 | 0 |
| N-Pentane | 0 | 0.0306 | 0.0309 | 0.0093 | 0.0217 | 0.0217 | 0 |
| N-Hexane | 0 | 0.0941 | 0.0951 | 0 | 0.0951 | 0.0951 | 0 |
| N-Heptane | 0 | 0.1887 | 0.1911 | 0 | 0.1911 | 0.1911 | 0 |
| N-Octane | 0 | 0.271 | 0.2757 | 0 | 0.2757 | 0.2757 | 0 |
| N-Nonane | 0 | 0.2889 | 0.2963 | 0 | 0.2963 | 0.2963 | 0 |
| N-Decane | 0 | 0.2708 | 0.2811 | 0 | 0.2811 | 0.2811 | 0 |
| N-Undecane | 0 | 0.2547 | 0.2692 | 0 | 0.2692 | 0.2692 | 0 |
| N-Dodecane | 0 | 0.2366 | 0.2566 | 0 | 0.2566 | 0.1026 | 0.154 |
| N-Tridecane | 0 | 0.1889 | 0.2126 | 0 | 0.2126 | 0.0213 | 0.1913 |
| N-Tetradecane | 0 | 0.1583 | 0.1876 | 0 | 0.1876 | 0.0094 | 0.1782 |
| N-Pentadecane | 0 | 0.1155 | 0.1471 | 0 | 0.1471 | 0.0059 | 0.1412 |
| N-Hexadecane | 0 | 0.0859 | 0.1235 | 0 | 0.1235 | 0.0049 | 0.1186 |
| N-Heptadecane | 0 | 0.0666 | 0.1062 | 0 | 0.1062 | 0.0042 | 0.102 |
| N-Octadecane | 0 | 0.0691 | 0.1254 | 0 | 0.1254 | 0.005 | 0.1204 |
| N-Nonadecane | 0 | 0.0475 | 0.1024 | 0 | 0.1024 | 0.0041 | 0.0983 |
| N-Eicosane | 0 | 0.0634 | 0.1876 | 0 | 0.1876 | 0.0075 | 0.1801 |
| n-Docosane | 0 | 0.0297 | 0.1402 | 0 | 0.1402 | 0 | 0.1402 |
| n-Tetracosane | 0 | 0.013 | 0.1197 | 0 | 0.1197 | 0 | 0.1197 |
| n-Hexacosane | 0 | 0.0046 | 0.0845 | 0 | 0.0845 | 0 | 0.0845 |
| n-Octacosane | 0 | 0.0019 | 0.0697 | 0 | 0.0697 | 0 | 0.0697 |
| n-Tricontane | 0 | 0.0007 | 0.0513 | 0 | 0.0513 | 0 | 0.0513 |
| n-Dotriacontane | 0 | 0.0004 | 0.054 | 0 | 0.054 | 0 | 0.054 |
| Hexatriacontane | 0 | 0.0001 | 0.0478 | 0 | 0.0478 | 0 | 0.0478 |
| Methanol | 0.1205 | 0.0039 | 0.0043 | 0 | 0.0043 | 0.0043 | 0 |
| Ethanol | 0.0378 | 0.3136 | 0.3159 | 0 | 0.3159 | 0.3159 | 0 |
| Isopropanol | 0 | 0.0025 | 0.0025 | 0 | 0.0025 | 0.0025 | 0 |
| N-Propanol | 0.0003 | 0.0269 | 0.0271 | 0 | 0.0271 | 0.0271 | 0 |
| HydrogenChloride | 0.0002 | 0.0011 | 0.0012 | 0 | 0.0012 | 0.0012 | 0 |
| Hydrogen Cyanide | 0.0002 | 0.0578 | 0.0583 | 0 | 0.0583 | 0.0583 | 0 |
| Hydrogen Sulfide | 0.0001 | 0.0003 | 0.0003 | 0 | 0.0003 | 0.0003 | 0 |
| Carbon Disulfide | 0.0003 | 0.0017 | 0.0017 | 0 | 0.0017 | 0.0017 | 0 |
| Benzene | 0 | 0.2779 | 0.281 | 0 | 0.281 | 0.281 | 0 |

Example 2

A Fischer-Tropsch reaction is conducted in a microchannel reactor employing a fixed catalyst bed. The process is conducted at a high capacity (contact times on the order of about 290 to about 214 milliseconds) and provides for high CO conversions (up to about 80%). The reactor is operated with a two phase flow and shows little pressure drop variation, with a standard deviation less than 3% of the total pressure drop. The high CO conversions and stable pressure drops are also associated with low $CH_4$ selectivities, less than 15% for all cases, and less than 10% for most cases, coupled with high $C_6+$ hydrocarbon selectivities of greater than 75% for all cases and greater than 80% for most cases.

The microchannel reactor has two process repeat units interleaved between three coolant repeat units. Process microchannels in the process repeat units are in a cross-flow orientation to coolant channels in the coolant repeat units. This is shown in FIG. 29. The active reactor core has an area that is 15.2 cm (6 inches) by 15.2 cm (6 inches). The overall stack size of the reactor is 25.4 cm (10 inches) by 19.1 cm (7.5 inches) by 6.17 cm (2.43 inches). The coolant channels are formed from multiple shims which include flow distribution features. The process microchannels are formed from a copper waveform. This is shown in FIG. 30. This waveform has the dimensions of 19.1 cm (7.5 inches) by 15.2 cm (6 inches) by 3.18 mm (0.125 inch). The thickness of the waveform is 0.15 mm (0.006 inch). The resulting microchannel reactor has 276 process microchannels formed in two layers. Each of the process microchannels has the average dimensions of 0.95 mm (0.0375 inch) in width, 3.18 mm (0.125 inch) in height and 19.1 cm (7.5 inches) in length. Headers and footers are connected to the coolant channels and process microchannels to provide for connection to larger external piping.

A catalyst bed is loaded into the microchannel reactor as described below. The assembly is then enclosed within a process confinement shell (PCS). The catalyst bed contains SiC particles and particles of an FT catalyst.

The SiC particles are supplied by Atlantic Equipment Engineers of Bergen N.J., catalogue number SI-312. A Malvern Hydro 2000 G light scattering particle distribution analyzer is used to measure the volume average d(50) diameter for the SiC particles. The SiC particles have an average diameter of 281 microns. The packed apparent bulk density (PABD) for the SiC particles is 1.62 grams per cubic centimeter (g/cc) in triplicate, and the void fraction at PABD is 0.31.

The FT catalyst is supplied by Oxford Catalyst Limited. This catalyst comprises cobalt and a support. The volume averaged particle size for the catalyst particles is 261 microns as determined using the Malvern Hydro 2000 G analyzer. A later sieving of the catalyst shows most of the catalyst mass between 210 to 250 microns with more at higher mesh sizes than at lower mesh sizes. The PABD for the catalyst is 1.08 g/cc in triplicate. The void fraction for PABD packing is 0.362. Deionized water is added in 100 microliter aliquots using a pipette until the water breaks the surface. The wetted catalyst is placed on a vibrating table for 30 seconds at medium power to displace trapped air, settle the bed, and bring excess water to the surface. Excess water is removed using a pipette. The sample is allowed to dry in air. The sample is then dried at 200° C. for one hour at ambient pressure.

The volume of the reactor is determined by the addition of methanol at room temperature. 151.5 cc of methanol fills the reactor waveform channels to the top.

A 100 ppi foam that has a thickness of 0.635 cm (0.25 inches) is inserted in the bottom of the reactor.

The FT catalyst is added to the waveform and densified using vibration from a rubber covered mallet. The total mass added is 143.22 grams. The depth filled is measured at each waveform channel with measured length pins whose distance above the waveform opening is measured with a graded sheet and digital photography. The average difference of FT catalyst fill height and the desired fill height of 17.145 cm (6.75 inches) is 0.467 cm (0.184 inch) below the desired level. The standard deviation for the fill height is 0.483 cm (0.190 inch. The density of the packing, assuming the volume of the process waveform channels are the same throughout the packing height, is 1.068 g/cc, or 1.1% lower than the measured PABD of 1.08 g/cc. The total volume of the catalyst is 134.1 cc.

The SiC layer is added to the top of the reactor and densified to fill the reactor. A 100 ppi foam with a thickness of 0.635 cm (0.25 inch) is inserted in the top of the reactor.

The flow and composition of syn gas fed to the microchannel reactor is controlled using Brooks 5850E mass flow controllers. Hydrogen, carbon monoxide and nitrogen gases are supplied by Praxair, Matheson Tri-gas and Delille. These are fed through both activated carbon and molsieve 13X traps. A sample port is located downstream of the mixing point to measure the inlet gas composition. The gases are heated to >300° C. in a stainless steel microchannel heat exchanger, which is heated with nitrogen gas, before being fed to the microchannel reactor.

The inlet pressure is measured using a Yokogawa EJA430A-H model pressure transmitter. The process fixed bed pressure drop is measured by a Yokogawa model EJA110A-H differential pressure transmitter. The inlet and outlet streams are analyzed using an Agilent 3000A RGA refinery gas analyzer gas chromatograph (GC) with extra channel for higher hydrocarbons. Tail gas samples are collected through a sample port located downstream from the reactor and upstream from the first product collection tank. The sample conditioner consists of a Neptune SC-316 sample cooler and a Swagelok 300 cc condensate trap. Flow through the sample conditioner is set with a pressure regulator and needle valve and turned on only while sampling. Five to seven GC samples are collected for each gas measurement, with the first two discarded and the remainder averaged.

The product stream is routed through three collection vessels at elevated pressure, and cooled in stages to provide a rough separation of lighter hydrocarbon products from heavier hydrocarbon products along with an aqueous phase. A first drum is heated with two Watlow band heaters to a local surface temperature of 120° C. to 135° C. Aqueous phase and heavier hydrocarbon products are drained from the bottom and weighed. Gases leave the first drum at a temperature between 120° C. and 140° C. and are cooled to less than 30° C. in the first Sentry model 1253C57-EW6-H35X heat exchanger, which is cooled with Dow Dowfrost HD coolant. A second drum is at ambient temperature and is used to collect an aqueous phase and a clear liquid hydrocarbon phase. The remaining gases flow to a second model 1253C57-EW6-H35X heat exchangers, which is cooled to 10° C. with propylene glycol coolant and then to a third collection tank, which collects less than 1% of total condensate. After the third tank the tail gas reaches a pressure control device for the process side. This devices is a Kammer model 030000 globe valve. The product is measured with an American Meter Company 100 liter/revolution dry test meter equipped with a relay for signal transmission. A second tail gas sample port is located downstream of the dry test meter for additional sampling.

The reactor is heated and catalyst activation is carried out under a reducing atmosphere of hydrogen at 400° C. and near ambient pressure. The reactor is then cooled down and the start-up is initiated by increasing the pressure within the reactor to the operating pressure, gradually turning on the flow of coolant, as well as the flow of the reactant feed mixture, and increasing the reactor temperature. The reactant feed mixture contains $H_2$ and CO at an $H_2$:CO mole ratio of 2:1. The reactant feed mixture also contains 16.6% by volume $N_2$. At a contact time of 290 ms, the reactor temperature is gradually raised to 210° C. to reach a steady state CO conversion of greater than 70%.

The standard deviation of the pressure drop is high as the reaction conditions are established, and it then settles out to a lower value as the system stabilizes. Pressure drop at selected time-on-stream conditions illustrate stability over short and long periods of time:

At around 1500 hours on stream, the reactor operating conditions are set to an inlet $H_2$:CO ratio of 2.01, and 4% by volume $N_2$ in the feed at an inlet pressure of 350 psig and an inlet temperature of 222° C. and a contact time of 214 ms. These conditions are maintained for 190 hours. The reactor performance shows a steady CO conversion of 68.8±0.3%. The average selectivity to $CH_4$ is 13.3±0.1% and the selectivity to $C_6$+ hydrocarbons is 74.8±0.2%.

The reactor pressure drop is steady as evidenced by a low standard deviation in the pressure drop measurements. The average pressure drop during this operation is 1.75±0.01 psi.

The catalyst is re-reduced at around 1890 hours on stream and the reactor re-started to the target condition with an inlet $H_2$:CO ratio of 2.0, and 16.6% $N_2$ in the feed. The inlet pressure is 350 psig, and the average inlet temperature is 211° C. The contact time is 290 ms. This set of reaction conditions is maintained for 420 hours. The CO conversion in the reactor is initially high at around 75% and gradually stabilizes over the course of a few hundred hours to a steady value of 68.8±0.3%. The average selectivity to $CH_4$ is 8.9±0.1% and that to $C_6$+ hydrocarbons is 77.8±0.2%.

Corresponding to the stabilization of the CO conversion described above, the pressure drop increases initially and then stabilizes as the CO conversion drops to its final stable value. The reactor pressure drop during this operation remains steady as evidenced by the low standard deviation in the pressure drop measurements. The average pressure drop during this condition is 1.46±0.04 psi.

Prior to data being collected, a leak between the coolant side and the fixed bed (process) side is detected during normal pressure checking. From that time forward the coolant side is operated at a pressure higher than the process side so that any leaking would be liquid water or steam from the coolant side into the process side. Hence a larger standard deviation for the process side pressure drop (two to four fold) is seen here compared to the previous run.

The details of the performance of the microchannel reactor throughout its operational life is summarized below.

After the completion of the initial start-up, a target condition with $H_2$:CO ratio of 2:1 and 16.6% $N_2$ in the feed at an average reactor temperature of 210° C. and a contact time of 290 ms is reached which gives an average CO conversion of 71.7%. These process conditions are maintained from start-up to around 1140 hours on stream. The CO conversion stabilizes gradually to an average value of about 71.7% and the corresponding average $CH_4$ selectivity is 8.9%.

The contact time is then decreased to 214 ms and the reactor temperature gradually increased to 222° C. to increase the CO conversion to its previous steady value. At these conditions the average CO conversion is 71.9% with a 77.2% selectivity to $C_6$+ hydrocarbons. The corresponding steady state pressure drop is 1.843±0.004 psi.

At around 1500 hours on stream the feed dilution is then decreased to 4% by volume $N_2$, the reactor temperature is maintained at 222° C., and the average CO conversion is 68.8%. The corresponding average pressure drop is 1.75 psi.

The reactor conditions are then reverted to the initial start-up condition by decreasing the temperature to 210° C., increasing dilution with $N_2$ to 16.6% and increasing the contact time to 290 ms. The average CO conversion is 66.4%. This is about 5% lower the initial performance. This highlights a minimal catalyst deactivation with time on stream. The corresponding average pressure drop of 1.46±0.01 psi is higher than the 1.41±0.01 psi initially seen. This increase in pressure drop is commensurate with the decrease in conversion. The standard deviation of the pressure drop indicating the stability of the flow development in the process microchannels remains virtually unchanged during the 1880 hours on stream.

The catalyst is re-reduced at 1890 hours on stream with the catalyst spending a half hour above 400° C. and about 2 hours above 390° C. A cross-leak between the coolant and process sides is discovered after the reduction. During the start-up process the chiller pump fails causing an interlock shut down event. When the reactor reaches the target temperature, the CO conversion is only 39%, well below the previous values. The catalyst is reduced again.

The catalyst is then restarted to reach a condition with an $H_2$:CO ratio of 2:1 and 16.6% $N_2$ in the feed at an average reactor temperature of 210° C. and a contact time of 290 ms which corresponds to the first steady condition after the initial start-up. The initial CO conversion is slightly higher than the previous start-up but it steadies out at a slightly lower value of 69.5%. The corresponding average pressure drop is 1.47±0.04 psi. The standard deviation of the pressure drop increases compared to the original start-up of the reactor. This also corresponds to the increase in a deactivation rate for the catalyst. The increase in the standard deviation may be a result of the leak described above.

The contact time is then decreased to 214 ms and the reactor temperature gradually increased to 223° C. This results in an average CO conversion of 70.4% and a $C_6$+ selectivity of 76.0%.

The $H_2$:CO ratio is then changed to 1.5:1 and the contact time increased to 255 ms. The reactor pressure is then increased to 384 psig and the reactor temperature gradually increased to 228° C. leading to an average CO conversion of 60.9% at a 7.1% $CH_4$ selectivity. The pressure drop decreases as the CO conversion increases at the higher pressure.

The $H_2$:CO ratio is changed to 1.5, and the dilution with $N_2$ is increased to 40%. The reactor pressure is increased to 420 psig and the reactor temperature increased to 232° C. As the contact time is increased from 184 ms to 250 ms, the CO conversion increases from 56.1% to 64.0%. The corresponding pressure drop decreases from 2.256 psi to 1.545 psi. The pressure drop decreases as the contact time increases which reduces flow and increases CO conversion.

The reaction conditions are then reverted to an $H_2$:CO ratio of 2:1 with 16.6% $N_2$ in the feed. The average reactor temperature is 211° C. and the contact time is 290 ms. The CO conversion decreases to an average value of 59.6%. The average pressure drop is 1.52±0.04 psi. This is higher than that at the restart due to the catalyst deactivation.

The catalyst is then reduced again and restarted to the same reaction conditions of an $H_2$:CO ratio of 2:1, 16.6% $N_2$ in the feed, average reactor temperature of 211° C. and contact time of 290 ms. The CO conversion reaches a steady value of about 69.2% which is comparable to that attained after the previous reduction. The corresponding average pressure drop is 1.50±0.04 psi.

The standard deviation of the pressure drop, which is indicative of flow stability, indicates a stable flow in the process microchannels that remains virtually unchanged during the 1800 hours on stream.

While the invention has been explained in relation to various embodiments, it is to be understood that various modifications thereof may become apparent to those skilled in the art upon reading this specification. Therefore, it is to be understood that the invention includes all such modifications that may fall within the scope of the appended claims.

The invention claimed is:

1. A process for converting a carbonaceous material to a desired product comprising one or more hydrocarbons or one or more alcohols, the process comprising:
   (A) gasifying the carbonaceous material at a temperature of at least about 700° C. to form synthesis gas, the carbonaceous material comprising coal, oil, biomass, solid-waste, food resource, or a mixture of two or more thereof; and
   (B) flowing the synthesis gas in a microchannel reactor in contact with a catalyst to convert the synthesis gas to the desired product.

2. The process of claim 1 wherein the carbonaceous material comprises municipal solid waste, hazardous waste, refuse derived fuel, tires, trash, sewage sludge, animal waste, petroleum coke, trash, garbage, agricultural waste, corn stover, switch grass, wood cuttings, timber, grass clippings, construction demolition materials, plastic material, cotton gin waste, landfill gas, biogas, natural gas, or a mixture of two or more thereof.

3. The process of claim 1 wherein the carbonaceous material is gasified in a counter-current fixed bed gasifier, co-current fixed bed gasifier, fluidized bed gasifier, entrained flow gasifier, a molten metal reactor, or a plasma based gasification system.

4. The process of claim 1 wherein the carbonaceous material is gasified in the presence of a gasification agent.

5. The process of claim 4 wherein the gasification agent comprises steam, oxygen, air, or a mixture of two or more thereof.

6. The process of claim 1 wherein the carbonaceous material contacts steam and molten metal in a molten metal reactor and reacts to form the synthesis gas.

7. The process of claim 1 wherein the synthesis gas comprises $H_2$ and CO.

8. The process of claim 7 wherein the ratio of $H_2$ to CO is in the range from about 0.5 to about 4.

9. The process of claim 1 wherein the synthesis gas produced in step (A) comprises $H_2$ and CO, and prior to step (B), an additional amount of $H_2$ is added to the synthesis gas.

10. The process of claim 1 wherein the synthesis gas produced in step (A) further comprises solid particulates, the solid particulates being removed from the synthesis gas prior to step (B).

11. The process of claim 1 wherein the synthesis gas produced in step (A) further comprises water, at least part of the water being removed from the synthesis gas prior to step (B).

12. The process of claim 1 wherein the microchannel reactor comprises at least one process microchannel in thermal contact with a heat exchanger, the catalyst being in the process microchannel.

13. The process of claim 1 wherein the microchannel reactor comprises a plurality of process microchannels and a plurality of heat exchange channels, the catalyst being in the process microchannels.

14. The process of claim 1 wherein the microchannel reactor comprises a plurality of process microchannels and a plurality of heat exchange channels, the catalyst being in the process microchannels, each heat exchange channel being in thermal contact with at least one process microchannel, at least one manifold for flowing synthesis gas into the process microchannels, at least one manifold for flowing product out of the process microchannels, at least one manifold for flowing a heat exchange fluid into the heat exchange channels, and at least one manifold for flowing the heat exchange fluid out of the heat exchange channels.

15. The process of claim 1 wherein a plurality of the microchannel reactors are positioned in a vessel, each microchannel reactor comprising a plurality of process microchannels and a plurality of heat exchange channels, the catalyst being in the process microchannels, each heat exchange channel being in thermal contact with at least one process microchannel, the vessel being equipped with a manifold for flowing the synthesis gas to the process microchannels, a manifold for flowing the product from the process microchannels, a manifold for flowing a heat exchange fluid to the heat exchange channels, and a manifold for flowing the heat exchange fluid from the heat exchange channels.

16. The process of claim 15 wherein each microchannel reactor comprises from about 100 to about 50,000 process microchannels, and the vessel comprises from 1 to about 1000 microchannel reactors.

17. The process of claim 1 wherein the microchannel reactor comprises at least one process microchannel, the process microchannel having an internal dimension of width or height of up to about 10 mm.

18. The process of claim 1 wherein the microchannel reactor comprises at least one process microchannel, the process microchannel having a length of up to about 10 meters.

19. The process of claim 1 wherein the microchannel reactor comprises at leat one process microchannel and at least one heat exchange channel, the process microchannel and heat exchange channel being made of a material comprising: aluminum; titanium; nickel; copper; an alloy of any of the foregoing metals; steel; monel; inconel; brass; quartz; silicon; or a combination of two or more thereof.

20. The process of claim 1 wherein the microchannel reactor comprises at least one process microchannel, fluid flowing in the process microchannel contacting surface features in the process microchannel, the contacting of the surface features imparting a disruptive flow to the fluid.

21. The process of claim 1 wherein the microchannel reactor comprises at least one process microchannel and at least one heat exchange channel, the heat exchange channel comprising a microchannel.

22. The process of claim 1 wherein the catalyst used in step (B) is a Fischer-Tropsch catalyst, the reaction that is conducted in the microchannel reactor during step (B) is a Fischer-Tropsch reaction, and the desired product comprises one or more hydrocarbons.

23. The process of claim 22 wherein the Fischer-Tropsch catalyst comprises one or more of Co, Fe, Ni, Ru, Re, Os, and/or an oxide thereof, or a mixture of two or more thereof.

24. The process of claim 23 wherein the Fischer-Tropsch catalyst further comprises one or more metals from Group IA, IIA, IIIB or IIIB of the Periodic Table and/or an oxide thereof, a lanthanide metal and/or oxide thereof, an actinide metal and/or oxide thereof, or a mixture of two or more thereof.

25. The process of claim 23 wherein the Fischer-Tropsch catalyst further comprises one or more of Li, B, Na, K, Rb, Cs, Mg, Ca, Sr, Ba, Sc, Y, La, Ac, Ti, Zr, Ce or Th, and/or an oxide thereof, or a mixture of two or more thereof.

26. The process of claim 23 wherein the Fischer-Tropsch catalyst further comprises a support, the support comprising one or more of alumina, zirconia, silica, aluminum fluoride, fluorided alumina, bentonite, ceria, zinc oxide, silica-alumina, silicon carbide, molecular sieve, or a mixture of two or more thereof.

27. The process of claim 22 wherein the Fischer-Tropsch catalyst comprises a composition represented by the formula $$CoM^1_aM^2_bO_x$$

wherein
 $M^1$ is Fe, Ni, Ru, Re, Os, or a mixture of two or more thereof;
 $M^2$ is Li, B, Na, K, Rb, Cs, Mg, Ca, Sr, Ba, Sc, Y, La, Ac, Ti, Zr, Ce or Th, or a mixture of two or more thereof;
 a is a number in the range of zero to about 0.5;
 b is a number in the range of zero to about 0.5; and
 x is the number of oxygens needed to fulfill the valency requirements of the elements present.

28. The process of claim 22 wherein the Fischer-Tropsch catalyst comprises Co supported on alumina, the Co loading being at least about 5% by weight.

29. The process of claim 28 wherein the Fischer-Tropsch catalyst further comprises Re, Ru or a mixture thereof.

30. The process of claim 22 wherein the pressure in the microchannel reactor is in the range up to about 50 atmospheres.

31. The process of claim 22 wherein the temperature in the microchannel reactor is in the range from about 150 to about 300° C.

32. The process of claim 22 wherein the contact time within the microchannel reactor is up to about 2000 milliseconds.

33. The process of claim 22 wherein the conversion of CO in the microchannel reactor is in the range from about 10 to about 99%.

34. The process of claim 22 wherein the selectivity to methane in the desired product is up to about 25%.

35. The process of claim 22 wherein the desired product comprises one or more hydrocarbons boiling at a temperature of at least about 30° C. at atmospheric pressure.

36. The process of claim 22 wherein the desired product comprises one or more hydrocarbons boiling above a temperature of about 175° C. at atmospheric pressure.

37. The process of claim 22 wherein the desired product comprises one or more paraffins and/or one or more olefins of about 5 to about 100 carbon atoms.

38. The process of claim 22 wherein the desired product comprises one or more olefins, one or more normal paraffins, one or more isoparaffins, or a mixture of two or more thereof.

39. The process of claim 22 wherein the desired product is further processed using separation, fractionation, hydrocracking, hydroisomerizing, dewaxing, or a combination of two or more thereof.

40. The process of claim 22 wherein the desired product is further processed to form an oil of lubricating viscosity or a middle distillate fuel.

41. The process of claim 22 wherein the desired product is further processed to form a fuel.

42. The process of claim 1 wherein the catalyst used in step (B) is an alcohol-forming catalyst, the reaction that is conducted in the microchannel reactor during step (B) is an alcohol-forming reaction, and the desired product comprises one or more alcohols.

43. The process of claim 42 wherein the alcohol-forming catalyst comprises a catalyst metal of Nb, Ta, Mo, W, Tc, Re or a mixture of two or more thereof, in free form or combined form.

44. The process of claim 43 wherein the catalyst further comprises a cocatalyst metal of yttrium, a lanthanide series metal, an actinide series metal, or a combination of two or more thereof, in free form or combined form.

45. The process of claim 42 wherein the pressure in the microchannel reactor is in the range up to about 100 atmospheres.

46. The process of claim 42 wherein the temperature in the microchannel reactor is in the range from about 200 to about 500° C.

47. The process of claim 42 wherein the desired product comprises one or more alcohols having from 1 to about 10 carbon atoms.

48. The process of claim 42 wherein the desired product comprises methanol.

49. The process of claim 42 wherein the desired product comprises methanol, ethanol, 1-propanol, 2-propanol, 1-butanol, 2-butanol, 2-methyl-1-propanol, 2-methyl-2-propanol, 1-pentanol, 2-pentanol, or a mixture of two or more thereof.

50. The process of claim 1 wherein the catalyst is in the form of particulate solids.

51. The process of claim 1 wherein the microchannel reactor comprises one or more process microchannels, the catalyst being coated on interior walls of the process microchannels or grown on interior walls of the process microchannels.

52. The process of claim 1 wherein the catalyst is supported on a support having a flow-by configuration, a flow-through configuration, or a serpentine configuration.

53. The process of claim 1 wherein the catalyst is supported on a support having the configuration of a foam, felt, wad, fin, or a combination of two or more thereof.

54. The process of claim 1 wherein the catalyst is supported on a support in the form of a fin assembly comprising a plurality of parallel spaced fins.

55. The process of claim 1 wherein the microchannel reactor comprises at least one process microchannel, the process microchannel having at least one heat transfer wall and the heat flux for heat exchange within the microchannel reactor is in the range from about 0.01 to about 500 watts per square centimeter of surface area of the at least one heat transfer wall.

56. The process of claim 1 wherein the microchannel reactor comprises at least one process microchannel, the temperature at the entrance to the process microchannel being within about 80° C. of the temperature at the outlet of the process microchannel.

57. The process of claim 1 wherein the microchannel reactor comprises at least one process microchannel and at least one heat exchanger, the heat exchanger comprising at least one heat exchange channel in thermal contact with the at least one process microchannel, the process microchannel having fluid flowing in it in one direction, the heat exchange channel having fluid flow in a direction that is co-current or counter-current to the flow of fluid in the process microchannel.

58. The process of claim 1 wherein the microchannel reactor comprises at least one process microchannel and at least one heat exchanger, the heat exchanger comprising at least one heat exchange channel in thermal contact with the at least one process microchannel, the process microchannel having fluid flowing in it in one direction, the heat exchange channel having fluid flowing in it in a direction that is cross-current to the flow of fluid in the process microchannel.

59. The process of claim 1 wherein the microchannel reactor comprises at least one process microchannel and at least one heat exchanger, the at least one process microchannel being in thermal contact with at least one heat exchange channel, the length of the process microchannel and the length of the heat exchange channel being about the same.

60. The process of claim 1 wherein the microchannel reactor comprises at least one process microchannel and at least one heat exchanger, the heat exchanger comprising a heat exchange zone in thermal contact with the at least one process microchannel, the heat exchange zone comprising one or more heat exchange channels, the heat exchange channels extending lengthwise at right angles relative to the lengthwise direction of the process microchannel, the heat exchange zone extending lengthwise in the same direction as the process microchannel, the length of the heat exchange zone being shorter than the length of the process microchannel, the process microchannel having an entrance and an exit, the heat exchange zone being positioned at or near the process microchannel entrance.

61. The process of claim 1 wherein the microchannel reactor comprises at least one process microchannel and at least one heat exchanger, the heat exchanger comprising two heat exchange zones in thermal contact with the at least one process microchannel, each heat exchange zone comprising one or more heat exchange channels, the heat exchange channels extending lengthwise at right angles relative to the lengthwise direction of the process microchannel, the process microchannel having an entrance and an exit, the heat exchange zones extending lengthwise in the same direction as the process microchannel, the lengths of the heat exchange zones being shorter than the length of the process microchannel, the length of one of the heat exchange zones being shorter than the length of the other heat exchange zone, the heat exchange zones being positioned at or near the process microchannel entrance.

62. The process of claim 1 wherein the microchannel reactor comprises at least one process microchannel and at least one heat exchanger, a tailored heat exchange profile being provided along the length of the process microchannel, the local release of heat given off by the reaction conducted in the process microchannel being matched with cooling provided by the heat exchanger.

63. The process of claim 1 wherein the catalyst comprises a graded catalyst.

64. The process of claim 1 wherein the Quality Index Factor for the microchannel reactor is less than about 50%.

65. The process of claim 1 wherein the microchannel reactor comprises at least one process microchannel, the superficial velocity for fluid flowing in the process microchannel being at least about 0.01 m/s.

66. The process of claim 1 wherein the microchannel reactor comprises at least one process microchannel, the space velocity for fluid flowing in the process microchannel being at least about 1000 hr$^{-1}$.

67. The process of claim 1 wherein the microchannel reactor comprises at least one process microchannel, the pressure drop for fluid flowing in the process microchannel being up to about 10 atmospheres per meter.

68. The process of claim 1 wherein the microchannel reactor comprises at least one process microchannel, the Reynolds number for the flow of fluid in the process microchannel being in the range from about 10 to about 4000.

69. The process of claim 1 wherein steam is used as a heat exchange fluid in the microchannel reactor during step (B) and the carbonaceous material is gasified in the presence of a gasification agent during step (A), the steam from step (B) being used as the gasification agent during step (A).

70. The process of claim 1 wherein nitrogen is separated from air in a nitrogen separator prior to step (A) to provide an oxygen enriched air or purified oxygen and the carbonaceous material is gasified during step (A) in the presence of the oxygen enriched air or purified oxygen.

71. The process of claim 70 wherein the nitrogen is separated from the air in a microchannel separator using an ionic liquid as an absorbent liquid.

72. The process of claim 1 wherein the carbonaceous material is pyrolyzed prior to step (A) resulting in the formation of a pyrolytic oil, the pyrolytic oil being gasified during step (A).

73. The process of claim 1 wherein during step (A) synthesis gas is formed in a gasifier and a Fischer-Tropsch tail gas is produced during step (B), the Fischer-Tropsch tail gas being converted to synthesis gas in a steam methane reforming microchannel reactor, the synthesis gas from the steam reforming microchannel reactor being combined with the synthesis gas from the gasifier.

74. The process of claim 73 wherein the synthesis gas formed during step (A) contains carbon dioxide, the carbon dioxide being separated from the synthesis gas and combined with the Fischer-Tropsch tail gas in the steam methane reforming microchannel reactor.

75. The process of claim 1 wherein the synthesis gas formed during step (A) contains carbon dioxide, the carbon dioxide being separated from the synthesis gas prior to step (B).

76. The process of claim 1 wherein the carbonaceous material comprises polyethylene or polyvinyl chloride, and the synthesis gas formed during step (A) comprises an ethylene-rich synthesis gas.

77. The process of claim 1 wherein the synthesis gas that is formed during step (A) is cooled in one or more heat exchangers prior to step (B).

78. The process of claim 77 wherein the one or more heat exchangers are microchannel heat exchangers.

79. The process of claim 1 wherein the synthesis gas contains contaminants and prior to step (B) the contaminants are separated from the synthesis gas using a microchannel separator containing an ionic liquid.

80. The process of claim 1 wherein the synthesis gas contains contaminants and prior to step (B) the contaminants are separated from the synthesis gas using a temperature swing adsorption or a pressure swing adsorption microchannel separator.

81. The process of claim 1 wherein the synthesis gas contains contaminants and prior to step (B) the contaminants are separated from the synthesis gas using a microchannel separator containing nanofibers or a nano-composite film.

82. The process of claim 1 wherein the synthesis gas contains contaminants and prior to step (B)(I) the contaminants are separated from the synthesis gas using a ZnO guardbed.

83. The process of claim 1 wherein the carbonaceous material comprises a non-food carbonaceous material.

84. The process of claim 1 wherein the carbonaceous material comprises a food resource.

85. The process of claim 1 wherein the microchannel reactor comprises a plurality of process microchannels, the process microchannels being formed by positioning a waveform between planar sheets.

86. The process of claim 85 wherein the microchannel reactor further comprises a plurality of heat exchange channels in thermal contact with the process microchannels, the heat exchange channels being formed by positioning a waveform between planar sheets.

87. The process of claim 1 wherein the catalyst used in step (B) is a Fischer-Tropsch catalyst, the catalyst comprising cobalt and a support, the cobalt concentration being in the range from about 35% to about 60% by weight of the catalyst.

88. The process of claim 1 wherein the catalyst used in step (B) is a Fischer-Tropsch catalyst, the catalyst being prepared by activating a catalyst precursor comprising a cobalt compound and a support with a gas comprising at least about 5 mol % of hydrocarbon.

89. The process of claim 1 wherein the catalyst used in step (B) is a Fischer-Tropsch catalyst, the catalyst being prepared by (a) preparing a liquid mixture of (i) at least one catalyst support or catalyst support precursor, (ii) at least one metal-containing compound, wherein said metal comprises V, Cr, Mn, Fe, Co, Ni, Cu, Mo and/or W, and (iii) at least one polar organic compound which acts as a solvent for the metal-containing compound, the liquid mixture comprising 0 to about 20 wt % of water based on the total weight of the mixture; (b) converting the mixture to a paste or solid residue; and (c) combusting the residue in an oxygen-containing atmosphere to at least partially convert the organic compound to carbon and to form the supported catalyst or catalyst precursor.

90. The process of claim 89 wherein the metal comprises Co.

91. The process of claim 1 wherein the desired product produced in step (B) is a Fischer-Tropsch product, the process further comprising hydrocracking at least part of the Fischer-Tropsch product in a microchannel reactor.

92. The process of claim 91 wherein the microchannel reactor used to conduct the hydrocracking is the same microchannel reactor used for forming the Fischer-Tropsch product.

93. The process of claim 1 wherein the catalyst used in step (B) comprises an alcohol forming catalyst and a dehydration catalyst, the desired product comprising one or more unsaturated hydrocarbons.

94. The process of claim 1 wherein the microchannel reactor is constructed of stainless steel with one or more copper or aluminum waveforms being used for forming microchannels within the microchannel reactor.

* * * * *